Nov. 7, 1961 R. L. M. LE QUEAU 3,008,010

TELEPHONE SYSTEMS

Filed Dec. 19, 1955 18 Sheets-Sheet 1

Inventor
R. L. M. LE QUEAU
By [signature]
Attorney

Inventor
R.L.M. LE QUEAU
By R. P. Morris
Attorney

Nov. 7, 1961　　R. L. M. LE QUEAU　　3,008,010

TELEPHONE SYSTEMS

Filed Dec. 19, 1955　　18 Sheets-Sheet 3

*Inventor*
R.L.M. LE QUEAU
*By* [signature]
*Attorney*

Nov. 7, 1961 R. L. M. LE QUEAU 3,008,010

TELEPHONE SYSTEMS

Filed Dec. 19, 1955 18 Sheets-Sheet 4

Inventor
R.L.M. LE QUEAU
By R. F. Morris
Attorney

Nov. 7, 1961 R. L. M. LE QUEAU 3,008,010

TELEPHONE SYSTEMS

Filed Dec. 19, 1955 18 Sheets-Sheet 5

*Inventor*

R.L.M. LE QUEAU

*By* [signature]

*Attorney*

Inventor
R.L.M. LE QUEAU
By [signature]
Attorney

Inventor
R.L.M. LE QUEAU
By R. P. Morris
Attorney

Nov. 7, 1961 R. L. M. LE QUEAU 3,008,010

TELEPHONE SYSTEMS

Filed Dec. 19, 1955 18 Sheets-Sheet 8

*Inventor*
R.L.M. LE QUEAU
*By* [signature]
*Attorney*

*Inventor*

R. L. M. LE QUEAU

*By* [signature]

*Attorney*

Nov. 7, 1961 R. L. M. LE QUEAU 3,008,010

TELEPHONE SYSTEMS

Filed Dec. 19, 1955 18 Sheets-Sheet 10

Inventor
R.L.M. LE QUEAU
By [signature]
Attorney

Inventor
R.L.M. LE QUEAU
By [signature]
Attorney

Nov. 7, 1961

R. L. M. LE QUEAU 3,008,010

TELEPHONE SYSTEMS

Filed Dec. 19, 1955

18 Sheets-Sheet 12

Inventor

R.L.M. LE QUEAU

By [signature]

Attorney

Nov. 7, 1961 R. L. M. LE QUEAU 3,008,010

TELEPHONE SYSTEMS

Filed Dec. 19, 1955 18 Sheets-Sheet 13

*Inventor*
R.L.M. LE QUEAU
*By* [signature]
*Attorney*

Inventor
R.L.M. LE QUEAU
By R. F. Morris
Attorney

*Inventor*

R.L.M. LE QUEAU

*By* [signature]

*Attorney*

Inventor
R.L.M. LE QUEAU
By [signature]
Attorney

Inventor
R.L.M. LE QUEAU
By [signature]
Attorney

Inventor
R.L.M. LE QUEAU
By [signature]
Attorney

United States Patent Office 3,008,010
Patented Nov. 7, 1961

3,008,010
TELEPHONE SYSTEMS

Roger Louis Marie Le Queau, Paris, France, assignor to International Standard Electric Corporation, New York, N.Y., a corporation of Delaware Filed Dec. 19, 1955, Ser. No. 554,023
Claims priority, application France Dec. 22, 1954
20 Claims. (Cl. 179—27)

The present invention refers to telephone systems capable of connnecting subscribers of an inside system with one another or with subscribers of an outside system and of affording all or part of the inside-system subscribers the possibility of performing operations such as direct seizure of the outside system, double ringing (hold and recall), and transferring an outside call from one inside subscriber to another.

In systems of this type it is of interest to be able to increase the number of inside stations as well as the number of outside lines, and to do this by simple means, that is to say, by altering the existing equipment as little as possible. To meet this requirement, the system forming the object of this invention consists of a certain number of standard components, it being possible to increase the capacity of the system as required by the addition of new components. These components are divided into two classes. Those of one type, called "inside equipment," are used for connecting inside subscribers among themselves, each comprising the finders and final selectors handling the calls of a particular group of subscribers. The others, called "network equipment," are used to route calls to or from the outside network, each giving access to particular subscribers and to a certain number of outside lines. The number of subscribers served by a network equipment can of course be divided into groups served by different inside equipments; this happens particularly where the number of stations entitled to make outside calls (extensions) is small as compared to the total number of stations in the system. The network equipment intervenes only in the routing of incoming calls, a breakdown affecting all or part of the inside equipment in no way preventing the routing of said calls.

The invention has been especially designed for systems using cross-bar switches or "multi-selectors," composed of a plurality of "individual switches." As the number of calling subscribers served by an inside equipment is small, a single finder stage suffices to hunt for the calling line; on the other hand, the selection chain that is to give access to all the subscribers of the system may consist of two or more selector stages. The cord circuit that effects the link between the hunting chain and the selection chain may, for example, consist of a "feeding bridge" containing all the arrangements required for supplying the calling subscriber and/or the called subscriber.

One of the features of the invention consists in distributing the subscribers of the exchange in groups and in allocating to each group a particular "inside equipment," said equipment comprising a finder stage to serve calls coming from the subscribers in said group, one or more selection stages designed to select the group comprising the called subscriber and giving access to a final selection stage placed in the inside equipment serving said subscriber, a digit receiver common to a plurality of selectors of the first stage and temporarily associated with one of them in order successively to receive the various digits dialed by the calling subscriber, and a marker common to a plurality of receivers and temporarily associated with one of them in order to receive in a practically instantaneous manner the various selective combinations coming from said receiver and to control the positioning of all the successive selection stages, the addition of new groups of subscribers in the exchange being effected in simple fashion by installing inside equipment corresponding to these groups.

Another feature of the invention consists in providing two or more markers, placed in one of the inside equipments and common to the receivers of the whole system, only one of them becoming operative at a particular moment, this eliminating all risk of wrong connections that would arise from the simultaneous routing of two calls, while avoiding tying up the system if one of the markers breaks down.

Another feature of the invention consists in the fact that when a subscriber makes a call his line is marked calling on the banks of all the finders serving him, the call also being directed to all the available receivers and feeding bridges having access to that subscriber, arrangements being provided to select, from among these calling receivers and feeding bridges, first a receiver and then a feeding bridge served by said receiver, the finder associated with the selected feeding bridge finally being connected to the calling subscriber's line, said subscriber then being connected to said receiver through a finder and a feeding bridge without the marker having been switched in.

Another feature of the invention consists in that, when the marker has received from the receiver the various selective combinations that allow reaching the called subscriber, it sets in calling position the line or lines corresponding to the number dialed, as well as the final selectors serving that line, control members associated with the selectors of the first stage selecting one of said final selectors, the marker then testing the called subscriber's line and, if said line is free, controlling the establishment of the connection thereto through the selector of the first stage and the final selector.

Another feature of the invention is that, when the marker receives a number corresponding to grouped subscriber lines (PBX), it causes the switching in of a special finder that may be common to all the line groups, this finder selecting a free line in the group and marking said line on the banks of the final selectors, the call then being routed in accordance with the method defined in the preceding features.

Another feature of the invention consists in assigning to subscribers served by one and the same party line numbers taken from the general numbering scheme of the subscriber stations and differing only in one digit of a particular rank, the reception of this digit controlling the required modifications in the ringing-current sending circuits and thus allowing the called subscriber to be selected from among all those connected to one and the same party line.

Another feature of the invention consists in a network equipment capable of routing calls to and from the outside system, said equipment comprising outside lines each associated with one or more finders giving access to all or part of the extensions in the system, one or more double-call lines associated with each outside line, one or more director sets having access to all the outside lines, a receiver associated with each director set in order successively to receive the various digits dialed by the operator in order to reach an extension, a director marker capable of being reached both by the local receivers and by those of the director sets and controlling all the operations required for the routing of calls established either by direct seizure or through an operator.

Another feature of the invention is that, when an inside subscriber dials a number corresponding to the direct seizure of a particular group of outside lines, said number is sent from the local receiver to the director marker, which selects a free outside line in the group dialed and places the subscriber's line in ringing position on the banks of the outside finders serving it, the outside line seized then being connected to the subscriber through one of the finders associated therewith.

Another feature of the invention is that, when an inside subscriber connected to the outside system wishes to make a double call, he dials a suitable number, said number, upon being received at a particular equipment associated with the outside line, causing said equipment to be disconnected from the outside line in order to connect it to a double call line having access to the local selection chain, the subscriber thus being able to reach another inside subscriber through said selection chain.

Another feature of the invention is that, when a subscriber has dialed the full number of the inside subscriber he wishes to reach by way of double call, the local selection chain sends the outside line equipment an "end of dialing" signal, said equipment, owing to the reception of this signal, being in such a position that, when the calling subscriber dials a special number, said number, instead of being sent to the local selection chain, is interpreted by the outside line equipment as a signal intended to control the re-seizure of the outside system, said equipment being then disconnected from the double-call line and connected anew to the outside line.

Another feature of the invention is that, when the subscriber notices that he has dialed wrong the number of the subscriber he wishes to reach in double call, he hangs up for a moment, this causing the sending of a long pulse to the local selection chain, which releases, and to the outside-line equipment, which, owing to the release of the local selection chain, interprets that pulse as a "return to the outside system" order signal, so that, when the subscriber again removes his receiver, he is connected to the outside system and can begin again his double call operation.

Another feature of the invention is that, when the local selection chain is released because the subscriber has hung up, a time device is switched in and operates if the subscriber delays hanging up in order to begin again his double-ringing operation, the outside call then being routed to the director station.

Another feature of the invention is that, when a subscriber wants to transfer an outside call to a subscriber engaged in double-ringing, he hangs up without doing anything else, the outside-line equipment being disconnected from said subscriber and sending, through the local selection chain, an electrical characteristic over a wire individual to the station to be transferred, said station being marked calling on the banks of the finders of the outside-line equipment, this allowing said equipment to be connected to that station through one of the finders associated therewith, arrangements being provided to hold the director marker throughout the transfer period to prevent it from controlling another finder, something that would risk causing crosses and, consequently, faulty connections.

Another feature of the invention is that, when an inside subscriber connected to the outside system wants to call the local operator, he dials a number characterizing that operator and different from that used in the case of ordinary double-ringing, said number, upon being received at the equipment associated with the outside line, causing the operation at the operator's position of a ringing signal individual to the outside line involved, this enabling the operator to be connected to said line and thence to the subscriber, arrangements being then provided to disconnect the outside line.

Another feature of the invention is that, when the subscriber is connected to the local operator, he can connect himself anew to the outside system by dialing the same number as for an ordinary double call, said number being received at the director station and causing said station to be disconnected from the outside line equipment, the subscriber then being again connected to the outside system.

Another feature of the invention is that, when a subscriber connected to the local operator wants to transfer an outside call to said operator, he hangs up without doing anything else, the director station receiving because of this a long pulse and then controlling the disconnection of the subscriber from the outside system finder, the operator alone remaining connected to the outside line equipment.

The operator or operators have direct access to the outside line equipment; they can either call the outside system or receive calls coming therefrom and they are able to transfer an outside call to any extension of the inside system.

Another feature of the invention is that, when an operator wants to transfer an outside call to an extension, she connects herself by any suitable means to the receiver assigned thereto, said receiver receiving in succession the various digits of the called subscriber's number, then sending them in a practically instantaneous manner to the director marker, the latter then bringing the dialed line into calling position on the banks of the outside system finders, the outside line equipment seized by the operator being connected to the line thus marked calling through one of the finders associated therewith, then sending the ringing current to the subscriber, the transfer being effected after the subscriber answers and the operator is disconnected.

Another feature of the invention is that all the marking wires outgoing from the director marker and corresponding either to private stations or to nonexistent numbers are connected to a special device, so that, when the operator dials one of said numbers, said device operates and causes the release of the receiver and of the marker and gives the operator a suitable signal, service lines being provided moreover for ringing private stations.

During slack periods there is no operator; incoming calls are received at repeating ringers; one of those subscribers entitled to make direct outside calls removes his receiver, dials a suitable number and thereby finds himself connected to the calling outside line. He can then transfer the call to another extension in the system.

Another feature of the invention is that, when the system is in "light service" position and one of the inside subscribers dials the number characterizing the answer to outside calls, said number is sent from the local receiver to the director marker, which hunts for the calling outside line and places the subscriber in ringing position on the banks of the outside finders, the calling outside line then being connected to said subscriber through the finder or finders associated therewith.

In night service, all incoming calls are received at a special station, called "transfer station."

Another feature of the invention is that, when the transfer-station subscriber removes his receiver to answer an outside call, his operation is detected by special equipment that causes the seizure of the director marker and the marking of the station on the banks of the outside finders, said marker hunting for the calling outside line and said line being then connected to the transfer station through the finder or finders associated therewith.

Various other features of the invention will become apparent from the following description, given as a nonlimitative example with reference to the accompanying drawing, in which.

The general operation of the system will now be explained with reference to the diagram of FIG. 1.

Throughout what follows it will be assumed the switches used for establishing connections are crossbar switches or multi-selectors of a known type comprising a certain number of individual selectors. The selection of a given outgoing line is effected by means of members known as "selection bars." Each of these bars is associated with two selection magnets and can assume two operating positions depending upon the magnet energized. In taking one of these positions, the selection bar prepares the connection of an individual selector to two outgoing lines. The choice of one of these lines is effected by causing the operation of one or the other of the two magnets associated with a supplementary selection bar or "switching magnets" in accordance with a known principle. If $a$ be the number of selection bars, not counting the supplementary bar, there are $2a$ selection magnets and it is possible to select two series of lines, each comprising $2a$ lines. The choice of a series of lines is effected by one of the two magnets associated with the supplementary bar; the choice of the line within the series is effected by one of said $2a$ selection magnets.

The selection magnets only prepare the connection of an individual selector to a line, this connection being caused by a bar operated by an operating or connecting magnet individual to each individual selector. The connection is held so long as this magnet remains energized, regardless of the position of the selection magnet that prepared the connection.

In the descriptions that follow, the term "frame" will be used to denote the set of individual selectors of one and the same multi-selector and of the relays used for controlling these selectors.

Figure 1:
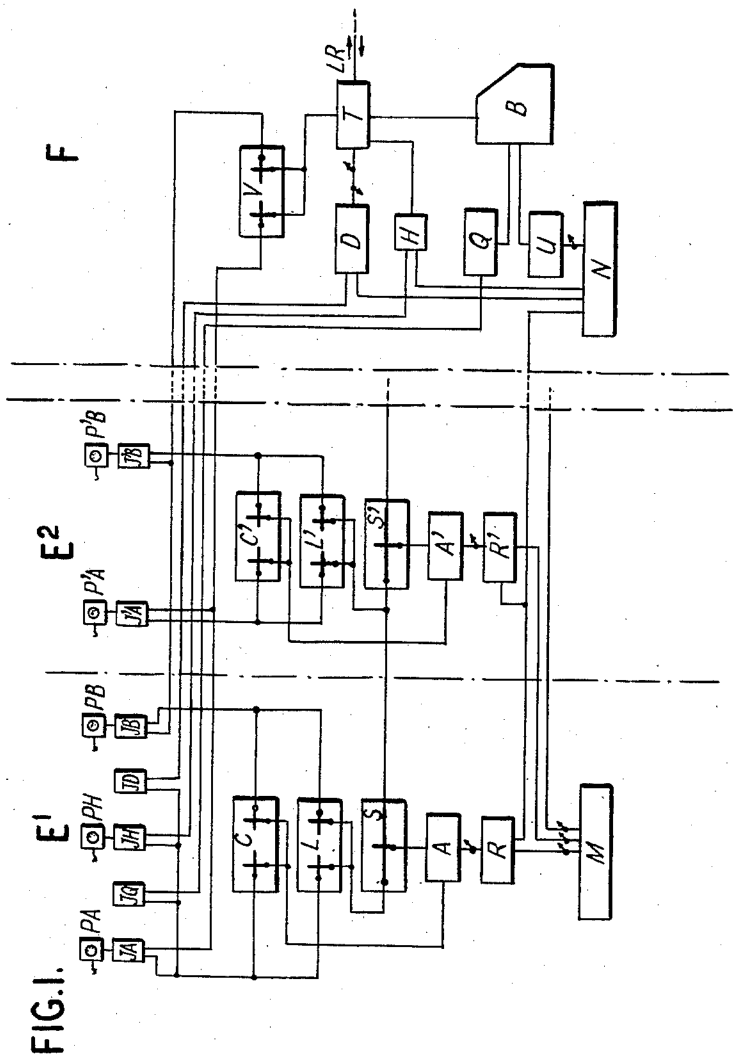
FIG. 1 is a wiring diagram used to explain the general operation of the system.

In the wiring diagram of FIG. 1 the multi-selectors are shown schematically by heavy dashes perpendicular to each other and enclosed within a thin-dash rectangle. Each heavy vertical dash represents an individual switch having access to a certain number of outgoing lines, each outgoing line being represented by a horizontal dash.

The private telephone system represented in the diagram of FIG. 1 consists of an automatic switchboard used for local calls among the various subscribers and comprising one, two or three equipments E1, E2, depending upon the capacity, the third, identical with E2, not being shown, and an equipment F for outside calls.

In the local automatic switchboard an equipment such as E1 is provided for a hundred subscribers and may comprise a certain number of connectors such as JA, JQ, JH, JD, JB. These connectors are connected to the banks of a frame of call finders C and of a frame of final selectors L; each finder C is associated with a feeding bridge A. Moreover, a frame of first selectors or fifties selectors S is provided between feeding bridges A and final selectors L; each feeding bridge A is associated with a fifties selector S. Each receiver R is common to a plurality of feeding bridges and serves only said bridges. The receivers have access to two markers M common to the whole system, that is to say, to the three equipments E1, E2 and E3.

Each receiver R has the function, after having caused the sending of the dialing tone to the calling subscriber, of receiving the dial pulses corresponding to the called party's number, of being connected to one of the two markers M and of sending it the digits received. The role of markers M is to mark the called party's line on the banks of final selectors L and to control the establishment of the connection. Only one call can be routed at a time; one or the other of the markers M is used for this purpose. If one of the two markers breaks down, the other remains in operation, this preventing the whole system from being out of order.

It will be noted that connectors JQ, JH, JD, whose functions will be described hereinafter, are connected to the first fifties of equipment L1, for the purpose of simplification. However, they can be distributed or connected to any other equipment whatever, such as E1, E2 or E3, the latter not being shown.

A certain number of party lines can be provided in the automatic switchboard, discrimination between these lines being made by having the call number of the second station comprise a different hundreds digit. If the number of the first station on a given party line is 241, the number of the second station would be 641, for example.

It is also possible to provide a certain number of party lines under one and the same number, in which case the call number of these lines may consist of one or three digits.

The equipment F provided to handle calls to the outside system allows some stations to have access thereto without passing through the operator (extensions entitled to direct seizure) or with the intervention of the operator (extensions not entitled to direct seizure).

This equipment comprises:

(1) One or more frames of outside call finders V, allowing extensions with or without direct seizure to have access to outside lines. These outside lines may be divided up into a plurality of groups, depending upon the operating possibilities of these various lines.

An allotter allows determining at will the extensions among the stations of the local automatic switchboard.

(2) Outside line equipment T associated with the various outside call finders V. (An outside-line equipment T is associated with one or more finders V each serving a certain number of extensions.) These extensions are multipled to finders V so that each of them has access to all the outside lines.

(3) Double-call equipments D associated with connectors such as JD and allowing extension subscribers connected to an outside subscriber to be connected to any subscriber of the local automatic switchboard.

(4) A director station B, of the type having neither plugs nor jacks, provided mainly to receive and route incoming calls. For this purpose it is associated with a special marker N through a receiver U.

Director station B is also intended to handle outgoing calls of the subscribers of extensions not entitled to direct seizure.

(5) A special marker N, capable of being seized by receivers R, R' . . . of the local automatic switchboard and by receiver U of equipment F and whose function is to mark extension lines on the frame or frames of outside finders V.

(6) Service lines Q to establish connections between the operator and the local automatic switchboard. A night-service equipment H, which allows routing outside calls to transfer-station PH through connector JH.

In the case of heavy outside traffic, provision is made for a plurality of director stations B instead of only one; a receiver U is then associated with each director station.

The various equipments previously mentioned are grouped into a unit providing for a given capacity as regards outside lines as well as extension lines. When the capacity of the system is greater than thus defined, one or more identical supplementary units are provided.

The general operation of the system will now be explained for the various cases of routing a call.

First the routing will be described of a call between two subscribers PA and PB connected to one and the same equipment E1.

When subscriber PA removes his handset, his line is marked calling on the banks of the frame of call finders C.

The call is directed to one of the receivers R available. This receiver thereupon determines the feeding bridge A and the finder C that must route the call and then controls the connection of the calling subscriber to feeding bridge A through finder C.

The receiver R selected then causes, through the associated feeding bridge A, the sending of the dialing tone to calling subscriber PA.

Subscriber PA dials the number of called subscriber PB. The pulse trains corresponding to that number are received and registered at receiver R. After reception of these pulse trains, receiver R is connected to one of the two markers M and sends it the digits received; this sending is done in the form of codes and instantaneously. This arrangement allows reducing the holding time of the marker to a minimum.

Marker M, having received the called subscriber's number, places in calling position all the final selectors L serving the subscribers of the fifties dialed and marks the called subscriber's line on the banks of the final selectors of the frame involved. Control members located in the fifties selector frame then select a final selector from among those in calling position. All members that must take part in the connection are now determined. If subscriber PB is free, marker M controls the connection of the feeding bridge to this subscriber through selectors S and L.

Receiver R releases, causing in turn the release of marker M. Feeding bridge A then causes ringing current to be sent to the ringer of station PB.

When subscriber PB removes his handset, he is connected to subscriber PA over the following circuit: station PB, connector JB, final selector L, selector S, feeding bridge A, call finder C, connector JA, station PA.

If subscriber PB is busy, the whole selection chain is released, with the exception of connector JA, the calling subscriber then receiving the busy tone in accordance with a known method.

If the called subscriber belongs to a hundred other than the one comprising the calling subscriber, to the hundred served by equipment E2, for example, the routing is done in accordance with the same method as in the preceding case, with the sole difference that a final selector L′ is used instead of a selector L.

The routing will now be described of a call originating at an extension entitled to make direct outside calls, originating at station PA, for example, and intended for an outside subscriber.

Subscriber PA, upon removing his handset, is connected to a receiver R, in accordance with the same method as for a call to a local subscriber.

Having received the dialing tone, he dials the digit assigned for direct seizure of the desired outside line group, digit 1, for example. Receiver R is then connected to special marker N. Marker N then determines a free outside equipment T available from among those of the line group dialed and marks the calling subscriber "calling" on the banks of one of the finders V associated with equipment T. The local selection chain is released, along with special marker N, and the calling subscriber is connected to outside line LR over the following circuit: station PA, connector JA, frame of outside call finders V, equipment T and outside line LR. Subscriber PA is connected to the outside line. If the latter is an automatic line, he receives the dialing tone from the outside system and dials the number of the wanted party.

The routing will now be described of an outside call from an extension, from station PB, for example, not entitled to make direct outside calls.

Calling subscriber PB then rings the operator by means of one of her service lines Q in accordance with the same method as for a local call; the sole difference is that the subscriber dials only a number comprising a single digit, digit 0 is the example described.

Subscriber PB is then connected to the director station over the following circuit: station PB, connector JB, call finder C, feeding bridge A, selector S, final selector L, connector JQ, service line Q, director station B. Subscriber PB gives the wanted number to the operator, who calls the wanted outside subscriber as will subsequently be described.

Ths subscriber of an extension, of extension PA, for example, can, while connected to an outside subscriber, be connected to any other subscriber of the PBX, to the subscriber of station PB, for example.

In order to perform that operation, known as a "double call," subscriber PA dials digit 2. This number is received at equipment T, which is disconnected from outside line LR in order to be connected to a double-call equipment D associated with a connector JD. Outside line LR remains held, while connector JD is brought into calling position on the banks of finders C of the local chain. The calling subscriber can reach the called subscriber in accordance with the same method as that described for a local call. The connecting circuit between the calling and the called subscribers is as follows: station PA, connector JA, outside call finder V, equipment T, equipment D, connector JD, finder C, feeding bridge A, selectors S and L, connector JB and subscriber PB.

Once the call to the local subscriber has ended, subscriber PA can either resume the outside call or transfer it to subscriber PB, on condition however that subscriber PB be entitled to such a call.

To resume the outside call, subscriber PA dials a suitable number, digit 1 in the example described; this digit is received at equipment T, the effect thereof being to release double-call equipment D and the whole inside chain and to connect station PA again to the outside line.

If, on the other hand, subscriber PA wants to transfer the outside call to subscriber PB while he is in double-call condition with him, he merely has to replace his handset. Equipment V is disconnected from connector JA of station PA.

Double-call equipment D sends a special signal to the equipment of the subscriber engaged in a double call, through the local selection chain. Owing to this, the equipment of the subscriber engaged in a double call is marked calling on the banks of one of the finders V associated with equipment T. Equipment T is thereupon connected to the subscriber's equipment through finder V, said subscriber being placed with respect to the outside line in the same condition as the first subscriber and can therefore in turn make a double call and, if need be, a transfer.

Equipment D and the local selection chain are released.

Director marker N has been marked busy by equipment D throughout the transfer period in order to prevent said marker from controlling other finders V at the same time.

When a subscriber of the local automatic switchboard connected to an outside subscriber wants to bring in the operator of director station B, he proceeds the same way as for a double-call operation but dials 0 instead of 2.

Equipment T, upon receiving that number, causes the light up of a ringing lamp at the director station. When the operator answers, she is connected to the calling subscriber through equipment T. The outside line is disconnected from the calling subscriber and held.

When the local subscriber wishes to re-seize the outside line, he dials digit 1. Director station B receives this number and is disconnected from equipment T. The subscriber is again connected to the outside line as before the double call.

If the subscriber wishes to transfer the call to the operator, he hangs up. This operation is detected by station B, which sends a suitable signal to equipment T. The latter causes finder V to be disconnected from the subscriber. The operator is then connected to the outside line through equipment T.

The director station has direct access to the outside lines, through equipment T, by operating a corresponding key.

All incoming calls are received at director station B through equipment T.

When an incoming call is received at director station B, the operator throws a listening key corresponding to the calling equipment. She is then connected to the outside subscriber, who gives her the number of the wanted inside subscriber.

In order to ring the inside subscriber, the operator performs an operation (depressing of the double-call key) that connects director station B to receiver U and that holds the outside line.

She dials the number of the wanted inside station, station PA, for example. The pulse trains are received at receiver U, which is connected to director marker N and sends it the digits received. This sending is instantaneous, as in the case of local receivers. Marker N marks the line of station PA on the banks of the frame of outside call finders V. If station PA is free, ringing current is sent to its ringer by equipment T through the frame of finders V. Receiver U and marker N release. When the subscriber of station PA answers, he is connected to the operator of director station B over the following circuit: station PA, connector JA, finder V, equipment T, director station B.

The operator signals the subscriber of station PA that there is an outside call for him and causes the call to be transferred by operating a key (holding-removal key).

The effect of that operation is to break the connection between director station B and equipment T and to establish a connection between station PA and the outside line through the frame of outside call finders V and equipment T.

If subscriber PA is busy, the operator of director station B can cut in by operating an offering key. Subscriber PA can either accept the outside call or put it off.

If subscriber PA accepts the outside call, he releases himself from his local call by hanging up; he is then rung as in the previous case and the rest of the operations develop as has been described.

If, on the other hand, subscriber PA cannot take the outside call immediately, the outside line is held on guard automatically even if the operator turns to another outside line in order to handle another call. When subscriber PA hangs up, the operations develop as have been previously described.

The routing of outside calls during slack periods will now be described.

There are two possibilities:

(1) Absence of operator.

(2) Night service.

In the first case, owing to the operation of a "reduced service" key, all incoming calls are received by all extensions entitled to make direct outside calls, over one or more repeating ringers located at suitable points of the system. Each of these local subscribers can then be connected to the calling outside line by dialing the digit 0. This digit is receeived at a receiver R in the manner already described. This receiver R is connected to director marker N, which hunts for the calling equipment T and marks the station of subscriber PA, for example, on the banks of the outside call finders V associated with the calling equipment T; equipment T is connected to the subscriber through finder V. The subscriber of station PA is then connected to the outside line as follows; station PA, connector JA, finder V, equipment T and outside line.

If the incoming call is not intended for the local subscriber of the extension that has answered, the latter transfers it to the proper party through the double-ringing operation previously described.

In the case of night service, a special key is depressed at director station B. Incoming calls are then routed from equipment T to special equipment H, itself associated with a night transfer station PH, through connector JH. Ringing current is sent to station PH by equipment H.

When the subscriber of station PH answers, equipment H causes the seizure of director marker N. The latter marks transfer station PH calling on the banks of one of the finders V associated with equipment T. Equipment T is connected to transfer-station PH and director marker N releases.

The station can answer the outside subscriber and transfer the call to a local extension through the double-call operation already described.

It will be noted, finally, that the ringing of local subscribers by the operator is done by means of service lines (equipment Q, connector JQ), the routing of the call being then the same as for an inside call, already described.

Figure 19:
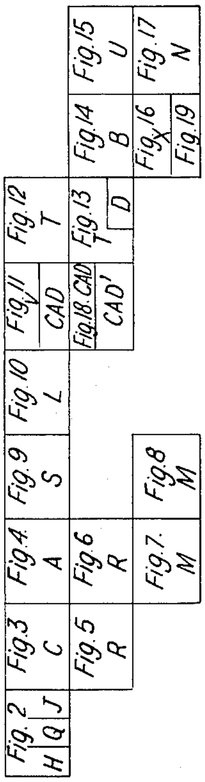
FIG. 19 shows how to associate FIGS. 2 to 18.
Figure 17:
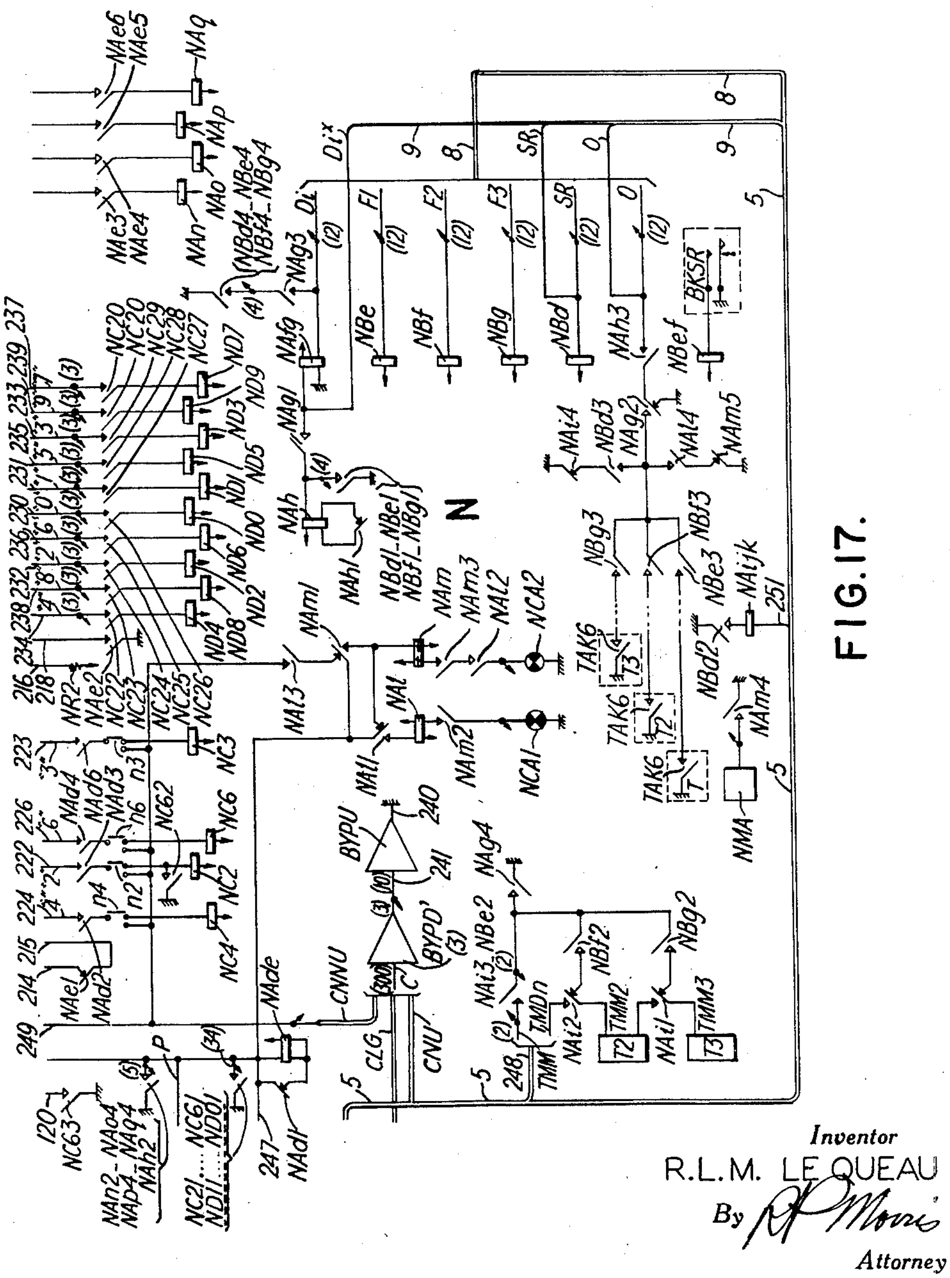
FIG. 17 is the circuit diagram of a director marker.

An embodiment in accordance with the spirit of the invention will now be described with reference to FIGS. 2 to 18, associated as shown in FIG. 19.

In the diagrams, the relays are represented by rectangles, the selection magnets by rectangles comprising a diagonal line and the connecting magnets by squares.

The relays are referenced by groups of capital and small letters. The first capital letter denotes the equipment to which the relay belongs. The small letter or letters denote the contact-spring assembly or assemblies associated with the relay. Each relay contact bears a reference consisting of the capital letter or the two capital letters forming part of the relay reference, of the small letter denoting the contact-spring assembly to which the contact belongs and of a digit. Thus, for example, reference AB*def* denotes a relay forming part of equipment A (feeding bridge—FIG. 4) comprising three contact-spring assemblies *d*, *e* and *f*; references AB*d*2, AB*e*1, AB*f*4, for example, denote the contacts of this relay that belong respectively to assemblies *d*, *e*, *f*.

The selection magnets or horizontal-bar magnets of the crossbar switches bear each a reference consisting of a capital letter denoting the equipment to which the magnet belongs, followed by one of the digits 1 to 14 and a capital B or H, these letters indicating the pivoting direction of the bar upward or downward. The contacts associated with these magnets bear the reference of the magnet to which they belong, followed by a digit. Thus, for example, reference C1B denotes the selection magnet of the first selection bar of the multi-selector belonging to equipment C (call finder frame) and causing the selection bar to rotate downward. Reference C1B1 denotes a contact associated with this magnet.

The references of the connecting magnets or vertical bar magnets consist of a group of capital letters whereof the first denotes the equipment to which the crossbar switch belongs. The contacts associated with these magnets are likewise denoted by having the reference of the magnet to which they belong followed by a digit. For example: magnet SVS, contact LVC2.

In order to simplify the drawing, not all similar members or circuits have been shown but only a limited number of them, their number being shown in parentheses. For example, where there are 16 connecting magnets, only one is shown. Likewise, certain relay sets connected up in a chain, that is, arranged so that the simultaneous energization or holding of these relays cannot occur, are shown only in part.

Generally, all members or member parts belonging to a given equipment are shown in the diagram of that equipment. However, in order to simplify the diagrams, certain equipments comprise relays or contacts belonging to other equipments; in that case, displaced relays or contacts are encircled by a dash and the equipment to which they belong can be readily determined by the first letter of their reference number.

In the detailed description that follows it will be assumed by way of example that the multi-selectors used comprise 13 selection bars, without counting the supplementary selection bar or switching bar, this corresponding to 26 selection magnets. These multi-selectors allow making a selection in two series of 26 lines each or a total of 52 lines. The 14th bar allows selecting the wanted line in one of the two series selected by one of the 13 selection bars.

The number of equipments used and the manner in which they are connected among themselves will now be given for the embodiment example described.

As has already been explained with reference to the diagram of FIG. 1, the system consists of an automatic switchboard for local calls and of an automatic switchboard for outside calls.

The system can be designed for local calls only. It then consists of a single automatic switchboard, such as E1 (FIG. 1) capable of serving 104 subscribers. Through the simple addition of equipments similar to E1, the capacity can be increased to 208 or to 316 subscribers.

When the system is connected to the outside network, it has added to it one equipment F, which may or may not allow direct seizure of outside lines, and one or two director desks B. This equipment allows connection to 8 outside lines, a number that can be doubled if need be. Access to a number of outside lines larger than 16 is obtained through the addition of one or more equipments such as F.

For each equipment, such as E1, 104 connectors, such as JA, are connected to a frame comprising 16 call finders C and to a frame comprising 16 final selectors L, eight of these members serving the first fifty subscribers and the other eight the second fifty subscribers. The 16 finders are respectively associated with 16 feeding bridges A. The 16 feeding bridges A are associated with 4 receivers R at the rate of two feeding bridges of each fifty subscribers per receiver. Receivers R have access to 2 markers M common to the 3 equipments E1, E2, E3, that is, in a maximum-capacity system, the 4×3=12 receivers are served by only 2 markers.

The outside call automatic switchboard comprises:

(1) One frame containing 16 outside finders V allowing 104 extensions entitled or not to make direct outside calls to have access to 8 outside lines. For 16 outside lines, there are 2 frames each containing 16 finders V.

(2) One outside line equipment T connected to finders V. Each equipment can be associated with one or the other of two consecutive finders, depending upon the fifties to be served.

(3) Two double-ringing equipments D respectively associated with two connectors such as JD.

(4) One special marker N connected both to receivers R of the local automatic switchboard and to receiver U.

There are two director stations B, associated with special marker N through a receiver U, at the rate of one receiver U per director station B.

It is to be clearly understood that these figures and this distribution are given as a nonlimitative example and that they can vary according to the capacity of the automatic switchboard and the traffic to be handled without departing from the scope of the invention.

First the case of a local call will be described.

It will be assumed that the various members that are going to be used in the course of the description are available. Under these conditions, all the relays or magnets are unoperated.

Figure 2:
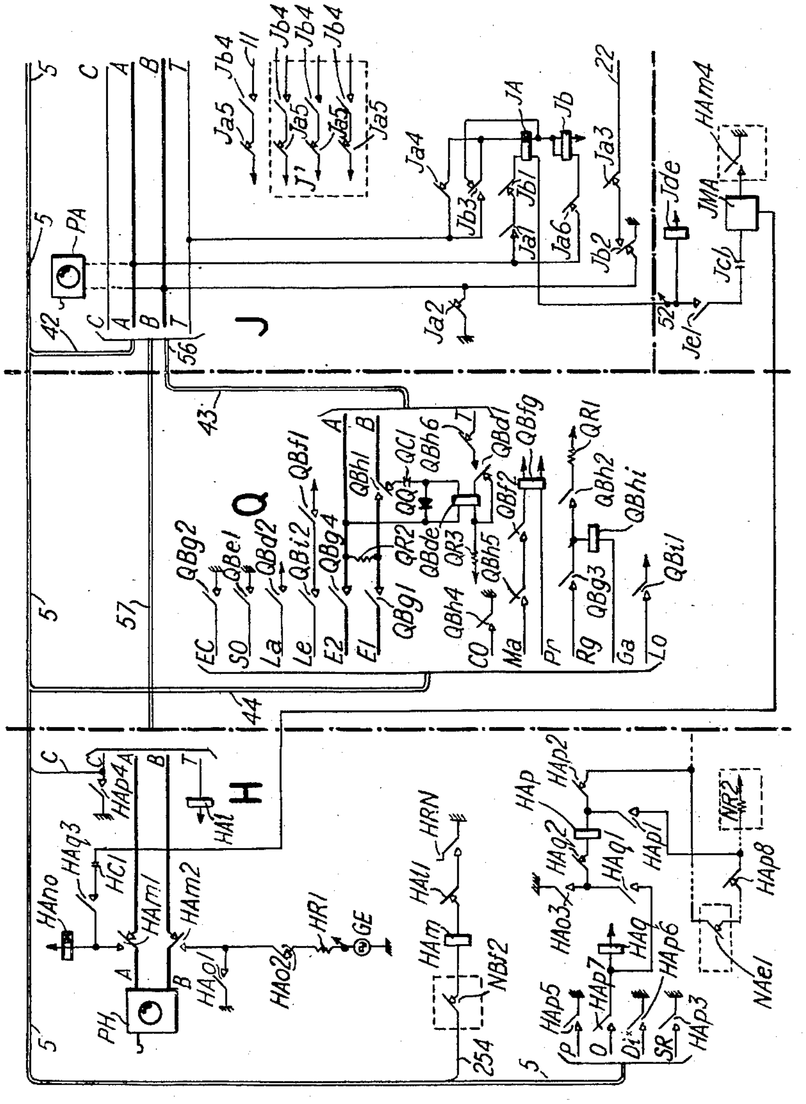
FIG. 2 shows, from left to right, circuit diagrams of the night service equipment, of a service line equipment and of a subscriber's connector.

The 104 connectors J of the subscribers of a hundred, such as that shown in the right-hand portion of FIG. 2, are connected as follows to the frame of call finders C of FIG. 3:

(*a*) To eight pilot relays, such as C*ab*, C*cd*, . . . at the rate of 13 connectors for one pilot relay. There are four pilot relays per fifties, but only the pilot relays of the first fifties, C*ab*, C*cd*, C*ef*, C*gh*, are shown. The 52 connectors of the fifties are distributed as follows: the first connector is connected to the first pilot relay C*ab*, the second connector to the second pilot relay C*cd*, the third connector to the third pilot relay C*ef*, the fourth connector to the fourth pilot relay C*gh*, the fifth connector to the first pilot relay C*ab*, and so on. This distribution can be schematized as shown by the following table:

| Pilot relays | Rank of connected connectors |
|---|---|
| C*ab* | 1-5-9-13-17 ........... 45-49 |
| C*cd* | 2-6-10-14 ............. 46-50 |
| C*ef* | 3-7-11-15 ............. 47-51 |
| C*gh* | 4-8-12-16 ............. 48-52 |

The 52 connectors of the second fifties are similarly connected to the other fourteen pilot relays, not shown.

It is quite obvious that these numbers characterizing the location of the subscriber connectors on the banks of the call finders bear no fixed relationship to the subscriber call numbers.

It will be noted that the odd-rank connectors are respectively connected to the first and to the third pilot relays C*ab* and C*ef*, while the even-rank connectors are connected to the second and to the fourth pilot relays C*cd* and C*gh*.

(*b*) Through the front contacts of the pilot relays to the 26 selection magnets C1B to C13B and C1H to C13H at the rate of four connectors per magnet, two connectors of the first fifties and two connectors of the second fifties. For each selection magnet and for each fifties the two connectors connected are consecutive, that is, a selection magnet serves, per fifties, one even-rank connector and one odd-rank connector. To selection magnets C1B to C13B are connected the connectors served by the first and the second pilot relays of each fifties (C*ab* and C*cd* for the first fifties, for example) and to magnets C1H to C13H the connectors served by the third and the fourth pilot relays (C*ef* and C*gh* for the first fifties, for example).

Only the connection of the connectors of the first fifties to the selection magnets is shown.

The connectors of the first fifties are served by the first eight call finders of the frame, while the connectors of the second fifties are served by the last eight call finders, the lines of the first 52 subscribers being multipled to the banks of the first eight call finders and the lines of the second fifties being multipled to the banks of the last eight call finders. The determination of the call finders of one of the two fifties is done by two relays, such as C*u*, whereof only one is shown, connected in series to the pilot relays serving one or the other fifties.

On the other hand, the determination of the calling line from among the two lines connected to one and the same selection magnet is done by the 14th bar of the frame, or switching bar, which is operated either in one direction, by magnet C14B, for the lines served by the even-rank connectors, or in the opposite direction, by magnet C14H, for the lines served by the odd-rank connectors.

Figure 3:
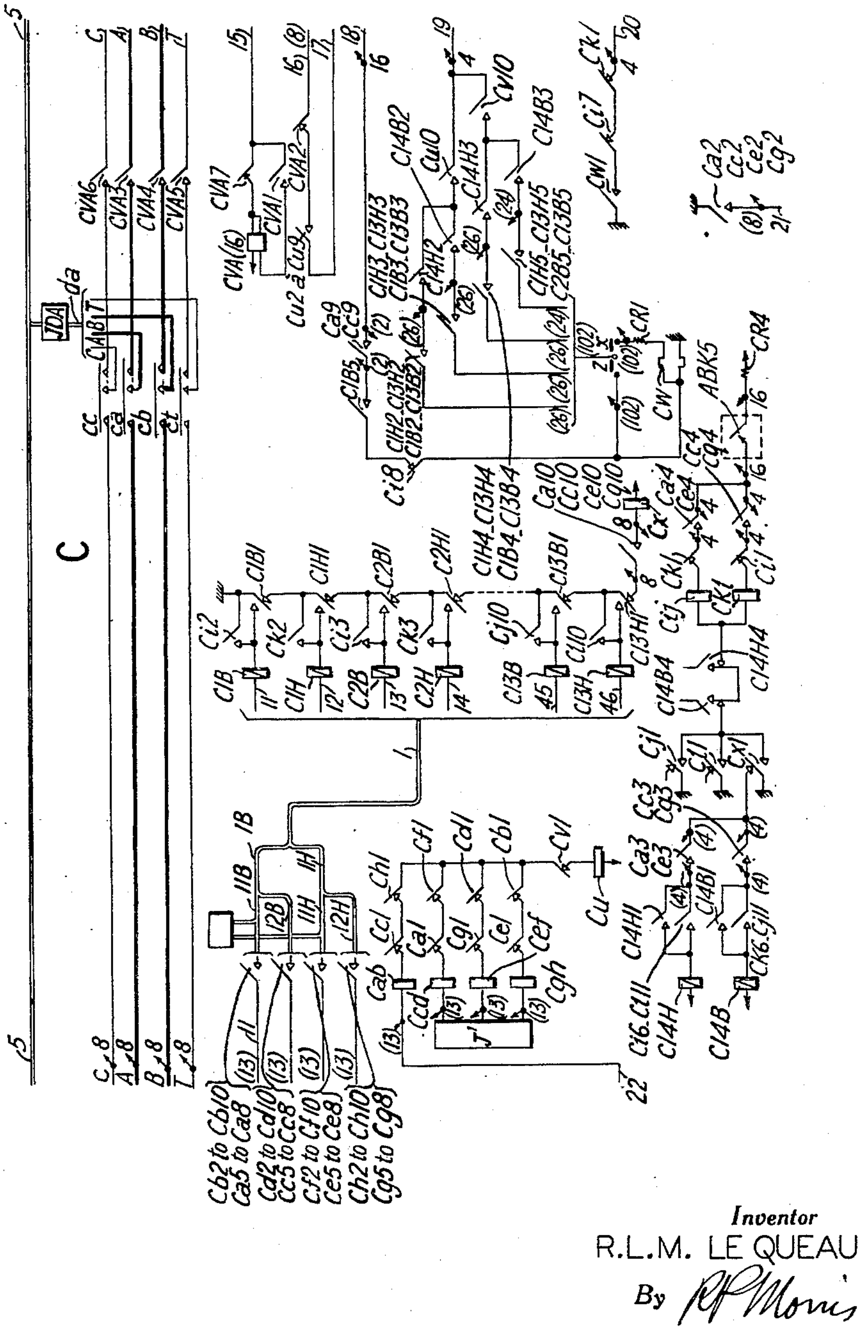
FIG. 3 is the circuit diagram of a call finder frame.
Figure 4:
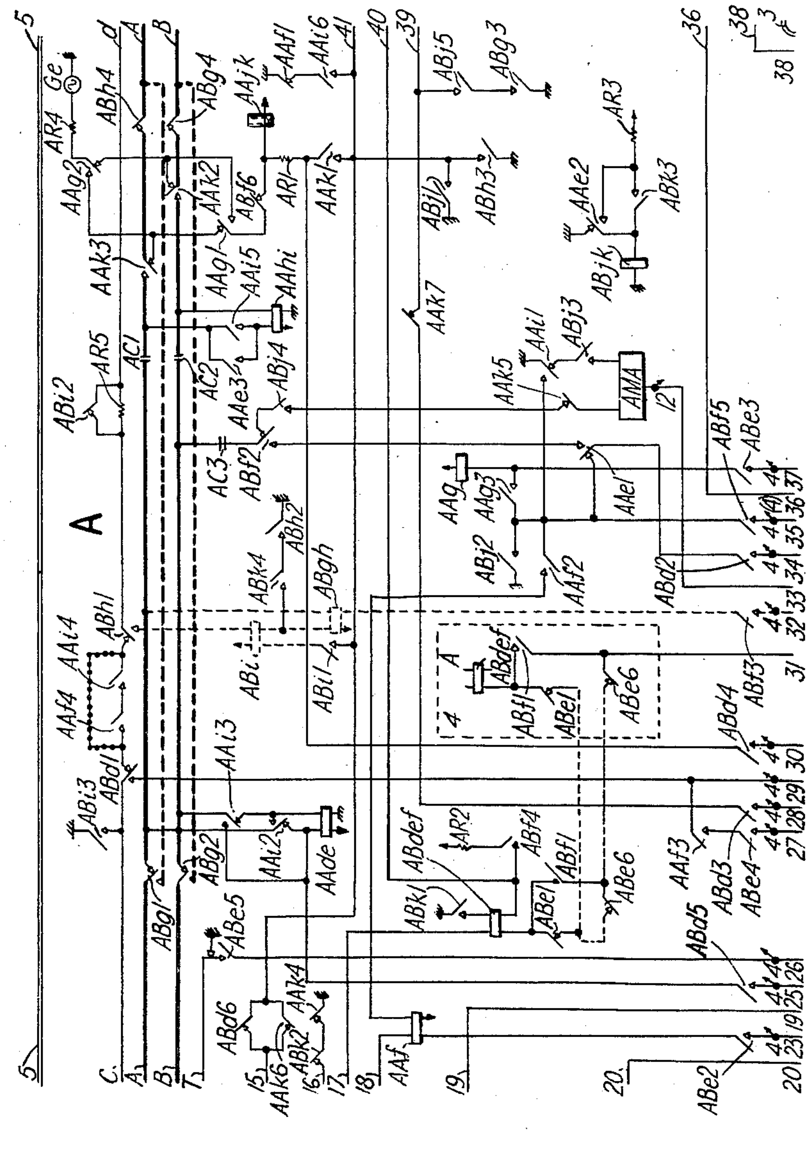
FIG. 4 is the circuit diagram of a feeding bridge.
Figure 5:
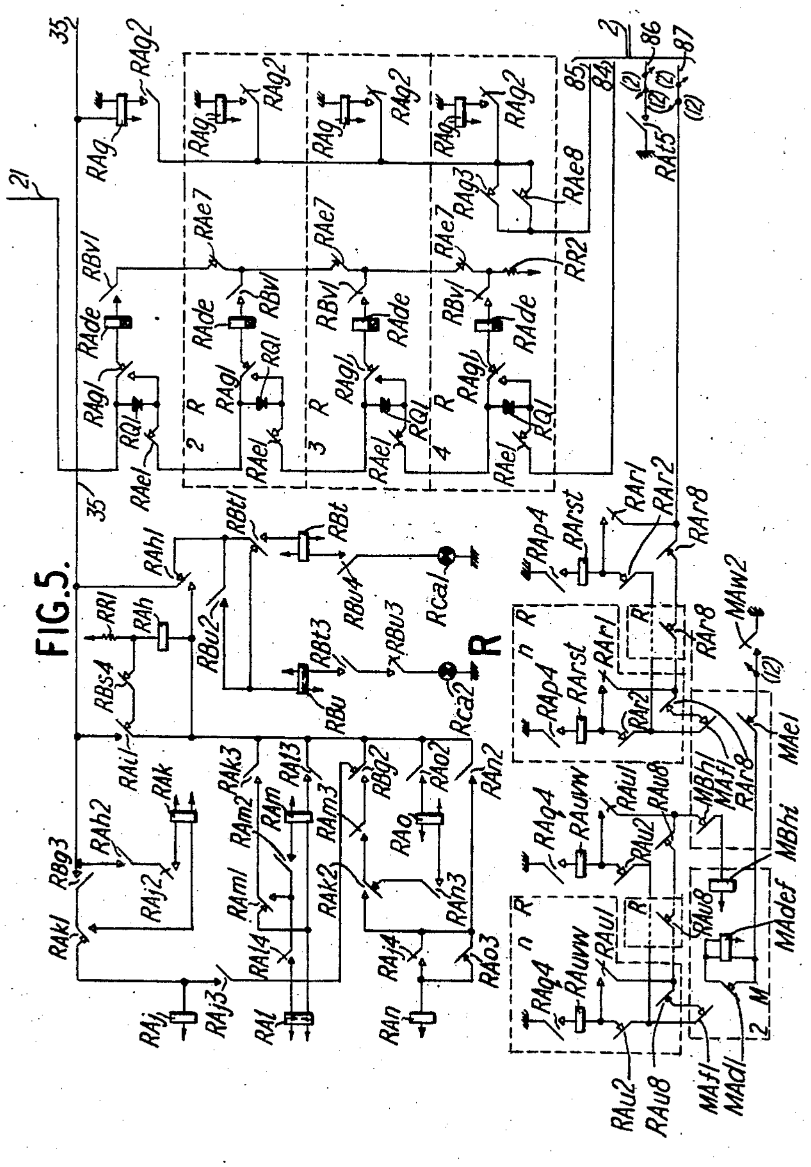
FIGS. 5 and 6 are the circuit diagram of a receiver.

It will further be assumed that connectors J of the calling subscriber, such as the subscriber of station PA, is connected to pilot relay C*ab* (FIG. 3).

The following circuit is completed when the subscriber removes his handset: battery, series windings of relay J*b*, back J*a6*, line wire A, station PA, line wire B, back J*a2*, ground. Relay J*b* energizes. It completes the following circuit over its front J*b2*: ground, front J*b2*, back J*a3*, wire 22, pilot relay C*ab*, back C*c1*, C*h1*, C*v1*, winding of relay *Cu*, battery. Relays *Cab* and *Cu* energize in series and pull p.

Relay *Cu* is connected in series to the 4 relays *Cab, Ccd, Cef, Cgh,* the energization of these five relays being placed under the control of relay *Cv* (not shown), which performs for the second fifties the same functions as relay *Cu* for the first fifties. This dependence is mutual, the energization of the four relays similar to *Cab* . . . and of relay *Cv* being possible only if relay *Cu* of the first fifties is unoperated. This arrangement is provided to prevent the simultaneous energization of pilot relays of different fifties.

Upon energizing, relay *Cab* opens over its back contacts *Ca*1 and *Cb*1, respectively, the energizing circuits of pilot relays *Ccd* and *Cgh* so that these relays, which do not control the same magnet, C14H or C14B, of the switching bar, cannot energize when relay *Cab* is operated.

Over its front *Ca*10 it completes the energizing circuit of relay *Cx*: battery, winding of relay *Cx*, front *Ca*10, back contacts of the 26 horizontal-bar selection magnets C13H1, C13B1, . . . C2H1, C2B1, C1H1, C1B1, ground. Relay *Cx* energizes.

There are eight contacts, such as *Ca*10, connected in parallel, each of these contacts belonging respectively to the eight pilot relays, such as *Cab, Ccd,* . . .

Upon energizing, relay *Cu* opens over its back *Cu*1 the energizing circuit of relay *Cv* of the second fifties as previously explained. It completes the following circuit over its front *Cu*2: ground, back contacts AA*k*4, AB*k*2 in the first of the eight feeding bridges serving the fifties involved, wire 16, back CVA2, front *Cu*2, wire 17, left-hand winding of relay AB*def* of said feeding bridge A, back AB*e*1, back contact in series AB*e*6 of the feeding bridge involved, back contacts AB*e*6 of the other three feeding bridges served by the same receiver, wire 31, windings in series of relay RB*vw*, battery. Over its contacts *Cu*3 to *Cu*9, relay *Cu* completes similar circuits for the other seven feeding bridges A serving the fifties involved. Only relays RB*vw* energize, relay AB*def* being unable to do so owing to the high resistance of the windings of relays RB*vw*.

As previously explained, the sixteen feeding bridges A are so connected to four receivers that two feeding bridges of the first fifties and two of the second fifties are connected to a receiver. Each of the eight circuits just described passes through a four-contact chain made up of back contacts AB*e*6, these contacts belonging respectively to the relays AB*def* of two feednig bridges connected to two finders of the first fifties and of two other feeding bridges, connected to two finders of the second fifties.

As it was assumed at the start that all the equipments were available, the relays RB*vw* of the four receivers R of the hundred energize. However, as will subsequently be explained, only one receiver is seized.

Upon energizing, relay *Cx* completes the following circuit over its front *Cx*1: ground, front *Cx*1, back C14B4 and C14H4, winding of relay *Cij*, back *Ck*1, front *Ca*4, back contacts AB*k*5 of the available feeding bridges of the hundred involved, resistance CR4, battery.

Relay *Cij* energizes. This relay indicates that the calling subscriber belongs to a group of thirteen odd-rank subscribers.

The two contacts *Ca*4, *Ce*4 are in parallel with the other two similar contacts belonging to the second fifties. It is the same for the front contacts *Cc*4 and *Cg*4 in the circuit of relay *Ck*1, which performs functions similar to those of relay *Cij*.

The four relays RB*vw* of the receivers, upon energizing, complete the circuits of their respective relays RA*de* in order to select a free receiver serving a free associated feeding bridge: ground, front *Ca*2, wire 21, back RA*g*1, winding of relay RA*de* of the 1st receiver, front RB*v*1 of the 1st receiver, back contacts RA*e*7 of the 2nd, 3rd and 4th receivers, resistance RR2 and battery, for relay RA*de* of the 1st receiver, and ground, front *Ca*2, wire 21, rectifier RQ1, back RA*e*1, back RA*g*1 of the 2nd receiver, winding of relay RA*de* of the 2nd receiver, front RB*v*1, back RA*e*7 of the 3rd and 4th receivers, resistance RR2 and battery for relay RA*de* of the 2nd receiver and likewise for the other relays RA*de* of the last two receivers.

Likewise, the circuit of relay MA*no* is completed as follows: ground, front CA2, rectifiers RQ1 and back contacts RA*e*1 of the four receivers, wire 84, cable 2, wire 84, winding of relay MA*no* and battery.

Relays RA*de* and relay MA*no* are slow-acting and do not energize immediately. Moreover, a single relay RA*de* will hold, and the other relays RA*de* and relay MA*no* will not then be able to energize or to hold, their energizing circuits being open.

There are eight parallel-connected contacts similar to front contact *Ca*2, these contacts belonging respectively one each to the eight pilot relays of the hundred: *Cab, Ccd,* . . . .

Upon energizing, relay *Cij* opens the energizing circuit of relay *Ck*1 over its back *Ci*1 in order to prevent its simultaneous energization with the similar relay *Cij*. Relay *Cij* controls the energization of selection magnets C1B to C13B, while relay *Ck*1 controls the energization of magnets C1H and C13H.

By its energization, relay *Cij* allows completing the energizing circuits of the 13 selection magnets C1B to C13B over its front contacts *Ci*2 to *Cj*10. Only the following circuit of magnet C2B is completed: ground, back contacts C1B1, C1H1, front *Ci*3, winding of magnet C2B, wire 13, cable 1, cable 1B, cable 11B, wire among the 13 of cable 11B belonging to the connector of calling subscriber PA, one of the front contacts *Ca*5 to *Ca*8, *Cb*2 to *Cb*10, wire 11, front J*b*4, back J*a*5, battery. Selection magnet C2B energizes.

Over its front *Cj*1, relay *Cij* completes a holding circuit for itself.

Selection magnet C2B upon energizing completes a holding circuit for itself over its front C2B1. Over its back C2B1, it opens the energizing circuit of relay *Cx*, which releases.

Upon releasing, relay *Cx* opens at *Cx*1 the energizing circuit of relay *Cij*, which holds over its front *Cj*1 as previously described. Over its back *Cx*1 it completes the following circuit: ground, back *Cx*1, front *Ca*3, *Ci*6, winding of magnet C14H, battery. Magnet C14H energizes.

There are four front contacts in parallel, such as *Ca*3, respectively belonging to two pilot relays of the first fifties and to two pilot relays of the second fifties. The same for the circuit of magnet C14B.

Over its front C14H1, magnet C14H completes a holding circuit for itself. Over its back C14H2 it causes the opening of the energizing circuit of relay *Cij*, which releases. A back-front contact has been provided for this latter contact in order to prevent the energizing circuit of relay *Cij* from being opened before the energization of magnet C14H.

Relay *Cij* upon releasing opens over its front *Ci*3 the energizing circuit of selection magnet C2B, but the latter holds over its front C2B1. Over its back *Ci*7 it prepares the seizure circuit of the feeding bridge.

In receivers R one of relays RA*de*, slow-acting, energizes. It will be assumed that it is relay RA*de* of the first receiver. Through the opening of its back RA*e*1, it opens the energizing circuit of the relays RA*de* of the next receivers in order to prevent the simultaneous seizure of several receivers; it also opens the energizing circuit of relay MA*no*, which cannot energize now. If it has had time to energize, it releases without having performed its function, which will be explained later.

It will be assumed that the line of station PA is a private line. In that case, connection *x* (FIG. 3) is established, while connections *y* (FIG. 11) and *z* (FIG. 3) are not.

Relay RA*de* completes the following circuit over its front RA*e*3: battery, left-hand winding of relay RA*f*, front RA*e*3, wire 19, front C*u*10, C14H2, C2B2, connection *x*, resistance CR1, windings in series of relay C*w*, ground. The values of the windings of relay C*w* are such that only the latter operates, relay RA*f* remaining unoperated.

Over its front RA*e*4, relay RA*de* short-circuits the high-resistance winding of relay RB*vw*, this causing the energization of the relay AB*def* of the two feeding bridges A associated with the receiver seized and serving the fifties involved. Since the energizing circuits of these two relays cut themselves off mutually, only one of them will be able to hold finally and will determine the feeding bridge that must hande the call.

Relay AB*def* upon energizing closes its front AB*f*1 in order to hold over the left-hand winding of relay RB*vw* of the associated receiver and opens its back contacts AB*e*1 and AB*e*6 in order to prevent the simultaneous connection of two feeding bridges to one and the same receiver. Over its front contacts AB*e*2, AB*d*5, AB*e*4, AB*d*3, AB*d*4, AB*f*3, AB*d*2, AB*f*5, AB*e*3, it connects the control wires of the feeding bridge to the receiver.

Relay C*w* completes the following circuit upon energizing: ground, front C*w*1, back C*i*7, C*k*7, wire 20, front RA*e*2, wire 25, front AB*d*5, left-hand winding of relay AA*de*, battery. Relay AA*de* energizes.

Relay AA*de* completes the circuit of holding relay AB*jk* over its front AA*e*2: ground, relay AB*jk*, front AA*e*2, resistance AR3, battery. Relay AB*jk* energizes.

Relay AB*jk* opens over its front AB*k*2 the availability circuit of the feeding bridge, or the energizing circuit of relays AB*def* and RB*vw*. Relay RB*vw* releases, while AB*def* holds over its right-hand winding: ground, front AB*k*1, right-hand winding of AB*def*, front AB*f*4, resistance AR2, battery. Over its front AB*k*3, AB*jk* completes a holding circuit for itself in order to prevent its release during the sending of the dialing pulse trains. Through the opening of its back AB*k*5 (FIG. 3), it opens one of the sixteen energizing circuits of relay C*ij* or C*kl* of the finder frame in order to prevent the starting of the finders if no feeding bridge is available. It completes the following circuit over its front AB*j*1: ground, front AB*j*1, back AA*k*6, wire 15, back CVA7, winding of connection magnet CVA, battery. Magnet CVA energizes. Over its front AB*j*3, relay AB*jk* causes the starting of ringing machine AMA for the sending of the dialing tone to the calling subscriber. Over its front AB*j*2 it applies a ground to wire 35 of the receiver over front AB*f*5, the effect of this being to complete the following circuits:

(*a*) Wire 35, left-hand winding of relay RA*g*, battery.

(*b*) Wire 35, back RA*h*1, RB*t*1, left-hand winding of relay RB*u*, battery.

Relays RA*g* and RB*u* energize.

The release of relay RB*vw* causes, through the opening of its front RB*v*1, the release of relay RA*de*.

Over its front RA*g*1, relay RA*g* transfers the starting chain to the next receiver, in this instance the second receiver. Over its front RA*g*2 it completes the following holding circuit for itself: ground, right-hand winding of relay RA*g*, front RA*g*2, back contacts in parallel RA*g*3 and RA*e*8 of the last receiver, wire 85, cable 2, wire 85, back MA*q*1, resistance MR1, battery. This holding circuit will be opened only upon the seizure of the last receiver, causing the release of relays RA*g* of the preceding receivers.

Connection magnet CVA upon energizing completes a holding circuit for itself over its front CVA1. Over its back CVA2 it opens at a second point the availability circuit of the associated feeding bridge. Over its front CVA3, CVA4, CVA5 and CVA6 it provides a metallic connection between calling line PA and feeding bridge A. Station PA is then supplied over the following circuit: ground, right-hand winding of relay AA*de*, back AA*i*3, AB*g*2, wire B, front CVA4, contact *cb*, wire B, loop of station PA, wire A, contact *ca*, front CVA3, wire A, back AB*g*1, AA*i*2, left-hand winding of relay AA*de*, battery. Further, the following circuit is completed over test wire T: ground, windings in series of relay RB*f*, wire 26, front AB*e*5, wire T, front CVA5, contact *ct*, wire T, back J*a*4, right-hand winding of relay J*a*, right-hand winding of relay B*j*, battery. Relays RB*f* and J*a* energize, but only relay RB*f* pulls up immediately, J*a* being a slow-acting relay.

Over its front RB*f*1, relay RB*f* short-circuits its lower high-resistance winding to prevent dropping the potential on the test wire.

Relay RB*u* completes, over its front RB*u*5, the dialing-tone sending circuit: calling machine AMA (FIG. 4), wire 33, condenser RC1, front RB*u*5, back RB*q*4, wire 34, front AB*d*2, AA*e*1, AB*f*2, condenser AC3, back AB*g*2, wire B, front CVA4, contact *cb*, loop of station PA, wire A, contact *ca*, front CVA3, wire A, back AB*g*1, AA*i*2, left-hand winding of relay AA*de*, battery. Upon receiving the dialing tone, the subscriber of station PA can dial.

Relay J*a* upon energizing opens over its back J*a*2 the energizing circuit of relay J*b*, which holds over its right-hand winding. Over its front J*a*3, it opens the energizing circuit of pilot relay C*ab* and of relay C*u*, which release. Through the opening of its back J*a*5, it opens the energizing circuit of selection magnet C2B, which releases. Over its back J*a*6, the battery through the windings of relay J*b* is disconnected from the line of station PA.

Upon releasing, relay C*ab* opens over its contact C*a*3 the energizing circuit of switching magnet C14H, which releases.

Upon releasing, relay C*u* opens over its front C*u*10 the energizing circuit of relay C*w*, which releases.

At this point of the operation, the frame of finders C is again in the condition in which it was originally, with the exception however of the connection magnet of one of the eight finders CVA serving the fifties comprising calling subscriber PA, this magnet remaining energized to the end of the call. The relays energized are the following:

J*a* and J*b* of connector J;

AA*de*, AB*def* and AB*jk* in feeding bridge A;

RA*g*, RB*f* and RB*u* in receiver R.

Having received the dialing tone, the calling subscriber will dial the number of the wanted party.

First will be described how the dialing pulses are sent from station PA to feeding bridge A and then sent to and registered in receiver R.

The breaks made by the dail in the circuit of supply relay AA*de* described above cause relay AA*de* to beat at the rate of the pulses. These pulses are sent to the receiver through back AA*e*1, which, at each falling back of relay AA*de*, completes the circuit of relay RB*g*: ground, front AB*j*2, back AA*e*1, front AB*d*2, wire 34, winding of relay RB*g*, battery. Relay RB*g* thus energizes for each falling back of relay AA*de*, or, in other words, relay RB*g* energizes for each break caused by the dial.

These various pulses are reecived at the six relays RA*j*, RA*k*, RA*l*, RA*m*, RA*n* and RA*o*.

The operation of these relays will now be explained for the registering of a train of ten pulses capable of being sent by the dial.

At the first pulse sent, relay RB*g*, energizing, completes the following circuit over its front RB*g*1: ground, front RB*g*1, winding of relay RA*i*, resistance RR4, battery. Relay RA*i* energizes. It completes the following circuit over its front RB*g*3: battery, winding of relay RA*j* (FIG. 5), back RA*k*1, front RB*g*3, general holding ground on wire 35 through front AB*f*5, and AB*j*2 in feeding bridge A. Relay RA*j* energizes.

Relay RA*i*, which is the first series relay, completes a holding circuit for itself over its front RA*i*2. This relay holds throughout the sending of the pulse train, the consecutive short-circuitings of its winding caused by the beating of relay RB*g* being too short to cause its release. The following circuit is completed over its front RA*i*1: ground on wire 35, front RA*i*1, winding of relay RA*h*, resistance RR1 and battery. Relay RA*h* energizes.

Relay RA*j* upon pulling up prepares the energizing circuit of relay RA*k*, over its front RA*j*2. Over its front RA*j*3 it prepares a holding circuit for itself.

Relay RA*h* upon pulling up opens over its back RA*h*1 the energizing circuit of relay RB*u*, which releases, while over its front RA*h*1 it completes a holding circuit for itself. Like relay RA*i*, this second series relay RA*h* holds throughout the sending of the pulse train. Over its front RA*h*2 it prepares the energizing circuit of relay RA*k*. Over its front RA*h*3 it prepares the circuit that registers the number dialed.

The release of relay RB*u* has the effect of opening definitively the dialing-tone sending circuit by the return to normal of front contact RB*u*5, the sending of this tone having stopped upon the sending of the first pulse, the circuit being momentarily opened by the dial contacts and the opening of front contact AA*e*1.

At the end of the first break, that is to say, of the first pulse, relay RB*g* releases.

Relay RB*g* completes the following holding circuit for relay RA*j* over its back RB*g*2: ground on wire 35, front RA*h*1, back RB*g*2, front RA*j*3, winding of relay RA*j*, battery. Over its front RB*g*3 it opens the energizing circuit of relay RA*j*, which holds over the circuit just described, while over its back RB*g*3 it completes the circuit of relay RA*k*: ground on wire 35, back RB*g*3, front RA*h*2, RA*j*2, upper winding of relay RA*k*, battery. Relay RA*k* energizes.

Over its front contact RA*k*1, relay RA*k* prepares a holding circuit for itself through its lower winding. Through its front contact RA*k*3, relay RA*k* completes the following circuit: ground on wire 35, front contacts RA*h*1, RA*k*3, back contact RA*m*1, lower winding of differential relay RA*l*, battery. Relay RA*l* energizes.

Relay RA*l* prepares a holding circuit for itself over its front RA*l*3, while over its front RA*l*4 it prepares an energizing circuit for itself through its upper winding.

Therefore, when the first pulse ends, the following receiving relays are energized: RA*j*, RA*k* and RA*l*.

Relay RB*g* energizes at the beginning of the second pulse.

Over its front RB*g*2, relay RB*g* opens the holding circuit of relay RA*j*, which releases. Over its front RB*g*3 it completes the holding circuit of relay RA*k* through its lower winding before opening the energizing circuit of this relay over its back RB*g*3.

At the end of the second pulse, relay RB*g* releases again.

Through the opening of its front RB*g*3, it opens the holding circuit of relay RA*k*, which releases.

Over its back RA*k*1, relay RA*k*, upon releasing, prepares anew the energizing circuit of relay RA*j*. Over its front RA*k*3, it short-circuits the lower winding of relay RA*m*, which pulls up, in series with the lower winding of relay RA*l*.

Over its front RA*m*1, relay RA*m* prepares the energizing circuit of the upper winding of RA*l*. Over its front RA*m*2, it prepares a holding circuit for itself through its upper winding.

When the second pulse ends, relays RA*l* and RA*m* are energized.

Relay RB*g* energizes at the beginning of the third pulse.

Over its front contact RB*g*3, the energizing circuit of relay RA*j* is completed as previously described for the first pulse, and relay RA*j* energizes.

Over its front RA*j*2, relay RA*j* prepares the energizing circuit of RA*k*, while over its front RA*j*3 it prepares a holding circuit for itself.

Relay RB*g* releases at the end of the third pulse.

Over its back RB*g*2 it completes the holding circuit of relay RA*j*, while over its back RB*g*3 it completes the energizing circuit of relay RA*k*, which energizes.

Relay RA*k* prepares a holding circuit for itself over its front RA*k*1. Over its front RA*k*2 it prepares the energizing circuit of relay RA*n*. Over its front RA*k*3 it completes the holding circuit of relay RA*m* and the energizing circuit of relay RA*l* through its upper winding. This latter circuit is as follows: ground on wire 35, front RA*h*1, RA*k*3, RA*m*1, RA*l*4, upper winding of differential relay RA*l*, battery. Differential relay RA*l* being balanced, it releases.

The reception of the third pulse is therefore characterized by the energization of relays RA*j*, RA*k* and RA*m*.

Relay RB*g* pulls up at the beginning of the 4th pulse. It causes, as already described for the second pulse, the release of relay RA*j* and the holding of relay RA*k*.

It completes the following circuit over its front RB*g*2: ground on wire 35, front RA*h*1, RB*g*2, RA*m*3, RA*k*2, back RA*o*3, winding of relay RA*n*, battery. Relay RA*n* energizes.

It completes a holding circuit for itself over its front contact RA*n*2: ground on wire 35, front contacts RA*h*1, RA*n*2 and RA*o*3, winding of relay RA*n*, battery. Over its front contact RA*n*3 it prepares the energizing circuit of relay RA*o*.

Relay RB*g* releases at the end of the fourth pulse and causes the release of relay RA*k* as already described.

Relay RA*k* prepares the energization of relay RA*j* over its front RA*k*1. Over its front RA*k*3, it opens the holding circuit of relay RA*m*, which releases.

The reception of the fourth pulse is therefore translated into the energization of relay RA*n* alone.

Relay RB*g* energizes at the beginning of the fifth pulse.

Relay RB*g* causes the energization of relay RA*j*, as at the beginning of the third pulse.

Relay RB*g* releases at the end of the fifth pulse.

Relay RA*k* energizes in known fashion. Over its front RA*k*3 it causes the energization of differential relay RA*l* through its lower winding as described for the first pulse.

The reception of the fifth pulse is therefore characterized by the energization of relays RA*j*, RA*k*, RA*l* and RA*n*.

Relay RB*g* energizes at the beginning of the sixth pulse, causing the release of relay RA*j*.

Relay RB*g* releases at the end of the sixth pulse, causing the release of relay RA*k*.

Upon releasing, relay RA*k* removes the short-circuit from the lower winding of relay RA*m*, which energizes.

Over its front RA*m*1, relay RA*m* prepares the energizing circuit of differential relay RA*l* through its upper winding. Over its front RA*m*2 it prepares a holding circuit for itself. Over its front RA*m*3 it prepares the energizing circuit of relay RA*o*.

One the sixth pulse has been received, therefore, relays RA*l*, RA*m* and RA*n* are energized.

Relay RB*g* energizes at the beginning of the seventh pulse, causing the energization of relay RA*j* in known fashion.

Relay RB*g* completes the following circuit over its front RB*g*2: ground on wire 35, front RA*h*1, RB*g*2, RA*m*3, back RA*k*2, front RA*n*3, lower winding of relay RA*o*, battery. Relay RA*o* energizes.

Over its front RA*o*2, relay RA*o* completes a holding circuit for itself through its upper winding. Over its back RA*o*3 it opens the energizing circuit of RA*n*, but the latter holds due to the closing of front RA*j*4.

Relay RB*g* releases at the end of the seventh pulse.

Relay RA*k* energizes as described before. It completes the following circuit over its front RA*k*3: ground on wire 35, front RA*h*1, RA*k*3, RA*m*1, RA*l*4, upper winding of differential relay RA*l*, battery. Relay RA*l* being balanced, it releases, while relay RA*m* holds over RA*m*2, RA*m*1 and the circuit previously described.

The reception of the seventh pulse is therefore characterized by the energization of relays RA*j*, RA*k*, RA*m*, RA*n* and RA*o*.

Relay RB*g* energizes at the beginning of the eighth pulse, causing the release of relay RA*j*.

Over its front RA*j*4, relay RA*j*, upon releasing, opens the energizing circuit of RA*n*, which releases.

Relay RB*g* releases at the end of the eighth pulse, causing the release of RA*k* in known fashion.

Over its front RA*k*3, relay RA*k*, upon releasing, opens the holding circuit of RA*m*, which releases.

The reception of the eighth pulse is therefore characterized by the pulling up of relay RA*o* alone.

Relay RB*g* energizes at the beginning of the ninth pulse and in known fashion causes the energization of relay RA*j*.

At the end of the ninth pulse, relay RB*g*, releasing, causes the energization of relay RA*k*.

Over its front RA*k*3, relay RA*k* completes the energizing circuit of differential relay RA*l* through its lower winding as already described. Relay RA*l* energizes.

The reception of the ninth pulse is therefore translated into the energization of relays RA*j*, RA*k*, RA*l* and RA*o*.

Relay RB*g* energizes at the beginning of the tenth pulse, this causing the release of relay RA*j*.

Relay RB*g* releases at the end of the tenth pulse, causing the release of relay RA*k* in known fashion.

Upon releasing, relay RA*k*, through its front RA*k*3, removes the short-circuit from the lower winding of relay RA*m*, which energizes in series with the lower winding of relay RA*l*.

The reception of the tenth pulse is therefore characterized by relays RA*l*, RA*m* and RA*o* being energized.

As has just been described, each digit from 1 to 0 sent by the subscriber's dial and received at receiver R is characterized by the pulling up of one or more of relays RA*j*, RA*k*, RA*l*, RA*m*, RA*n* and RA*o*. Out of these six relays, relays RA*k*, RA*m*, RA*n* and RA*o*, over their respective front contacts RA*k*4, RA*m*4, RA*n*1, RA*o*1, respectively prepare the energization of registering relays RB*h*, RB*i*, RB*j* and RB*k* for the first received digit or hundreds digit, RB*l*, RB*m*, RB*n* and RB*o* for the second received digit or tens digit, and M*s*, M*t*, M*u* and M*v* in one of the two markers for the third received digit or units digit, this number being sent directly to the marker without any registering in the receiver.

The table on the next page shows the receiving relays that energize for each of the ten dial pulses and, opposite them, the hundreds-digit and the tens-digit registering relays that energize in harmony with the digits received.

It will be assumed that the number of the called station is 205. The calling subscriber will dial the digit 2, which will be re-received at the receiver as has just been described.

At the end of the first pulse train, relay RB*g*, remaining unoperated, short-circuits for a sufficiently long period, over its back RB*g*1, the winding of the relay RA*i*, which releases slowly.

Over its front RA*i*2, relay RA*i* opens its holding circuit upon releasing. It completes the following circuit over its back RA*i*3: ground on wire 35, back RA*i*3, front RA*h*3, RA*m*4, back RB*q*3, winding of relay RB*i*, battery. Relay RB*i* energizes. Over its back RA*i*1 it short-circuits the winding of relay RA*h*, which releases slowly.

Relay RB*i* upon energizing prepares the following circuit over its front RB*i*4: battery, winding of relay RB*i*, front RB*i*4, lower winding of relay RB*pq*, ground on wire 35. Relay RB*pq* cannot pull up, being short-circuited by the energizing circuit of relay RB*i*; it will pull up only when relay RA*h*, upon releasing, opens this circuit through its front RA*h*3. Over its front RB*i*1, relay RB*i* prepares the placing of a ground on wire 67 characterizing the marking of the hundreds digit 2.

When relay RA*h* releases, relay RB*pq* pulls up, as has just been described. The holding circuit of the receiving relays is opened over its front RA*h*1 and relays RA*l* and RA*m* release. Over its front RA*h*1 it completes anew the energizing circuit of relay RB*u*, which energizes. The second role of this relay will be explained subsequently.

Relay RB*pq* upon energizing completes a holding circuit for itself over its front RB*q*1, through its upper winding. Through the play of its contacts RB*q*2, RB*q*3, RB*p*1 and RB*p*2, it isolates hundreds-digit registering relays RB*h*, RB*i*, RB*j* and RB*k* and prepares the energizing circuits of tens-digit registering relays RB*l*, RB*m*, RB*n* and RB*o*. Over its back RB*q*4 it opens the dialing-tone sending circuit, which would have been completed over front RB*u*5 at the time of energization of this latter. Over its front RB*p*3 it short-circuits its lower winding, this allowing the holding, on a free ground, of registering relay RB*i*.

Upon the sending of the second train of ten pulses characterizing the digit 0, the second digit of the wanted party's number, relay RB*g* energizes from the beginning of the first pulse, causing, as already described, the pulling up of relays RA*i* and RA*h*.

At the end of the reception of these ten pulses, relays RA*m* and RA*o* will be energized, as previously described and as appears from the operating table of the counting relays.

Upon the release of the first series relay RA*i*, short-circuited for a long period by the release of relay RB*g*, tens-digit registering relays RB*m* and RB*o* pull up, front contacts RA*m*4 and RA*o*1 being closed.

| Pulses | Receiving relays | Registering relays | |
|---|---|---|---|
| | | Hundreds | Tens |
| 1 | RA*k*— | RB*h*— | RB*l*— |
| 2 | —RA*m*— | —RB*i*— | —RB*m*— |
| 3 | RA*k*—RA*m*— | RB*h*—RB*i*— | RB*l*—RB*m*— |
| 4 | —RA*n*— | —RB*j*— | —RB*n*— |
| 5 | RA*k*— —RA*n*— | RB*h*— —RB*j*— | RB*l*— —RB*n*— |
| 6 | —RA*m*—RA*n*— | —RB*i*—RB*j*— | —RB*m*—RB*n*— |
| 7 | RA*k*—RA*m*—RA*n*—RA*o* | RB*h*—RB*i*—RB*j*—RB*k* | RB*l*—RB*m*—RB*n*—RB*o* |
| 8 | —RA*o* | —RB*k* | —RB*o* |
| 9 | RA*k*— —RA*o* | RB*h*— —RB*k* | RB*l*— —RB*o* |
| 0 | —RA*m*— —RA*o* | —RB*i*— —RB*k* | —RB*m*— —RB*o* |

The same as for relay RB*pq*, relay RB*rs* energizes upon the release of relay RA*h*.

Over their front contacts RB*m*1 and RB*o*1, the tens-digit registering relays prepare the application of a ground to wire 75 characterizing the tens digit 0.

Relay RB*rs* upon energizing completes a holding circuit for itself through its upper winding over its front RB*s*1. Through the play of its contacts RB*s*2, RB*s*3, RB*r*1 and RB*r*2, it disconnects the tens-digit registering relays and prepares the reception of the units digit at relays M*s*, M*t*, M*u* and M*v* of the marker. Over its back RB*s*4 it will allow relay RA*h* to hold for the sending of the units digit. Over its front RB*r*3 it short-circuits its energizing winding to allow the holding of registering relays RB*m* and RB*o* by the free ground on wire 35. Over its front RB*r*4 it prepares the energizing circuit of seizure relay RA*pq* of one of the two markers M.

If the calling party then dials the units digit 5 of the number 205, relay RB*g* energizes, causing series relays RA*i* and RA*h* to energize.

The reception of the five pulses occurs as previously described, and at the end of the fifth pulse the receiving relays RA*k* and RA*n* used for the re-sending of digit 5 are energized.

Relay RB*g* remaining unoperated, it causes the release of RA*i*.

Relay RA*i* completes the following circuit over its back RA*i*3: ground on wire 35, back RA*i*3, front RA*h*3, RB*r*4, upper winding of relay RA*pq*, battery. Relay RA*pq* energizes.

Relay RA*pq* completes the following holding circuit for itself over its front RA*p*1: ground on wire 35, front RA*p*1, lower winding of relay RA*pq*, battery. Over its front RA*p*4 and RA*q*4, it completes respectively the energizing circuits of relays RA*rst* and RA*uvw*:

(*a*) Circuit of relay RA*rst*: ground, front RA*p*4, winding of relay RA*rst*, back RA*r*2, back MA*f*1 of the first marker M, chain of back contacts RA*r*8 of all the receivers R comprised in the system (12 receivers in the example described), wire 87, cable 2, wire 87, back MB*h*1 of the second marker similar to M, winding of relay MB*hi*, battery.

(*b*) Circuit of relay RA*uvw*: ground, front RA*q*4, winding of RA*uvw*, back RA*u*2, back MA*f*1 of the second marker similar to M, chain of back contacts RA*u*8 of all the receivers comprised in the system (12 receivers in the example described), back MB*h*1 of the first marker M, winding of relay MB*hi* of the second marker similar to M, battery.

These two circuits being completed simultaneously, relay RA*rst* and RA*uvw* of the receiver, relay MB*hi* of the first marker and relay MB*hi* of the second marker should energize. However, it will be noted that these circuits are mutually dependent; each relay MB*hi* comprises a contact that, upon its energization, opens the energizing circuit of the other. This arrangement prevents the simultaneous seizure of two markers.

It will be assumed that relay MB*hi* of the first marker energizes before relay MB*hi* of the second marker. In that case, over its back MB*h*1, the first marker opens the circuit of relay MB*hi* of the second marker and, hence, the energizing circuit of relay RA*uvw*.

It will also be noted that none of the seizure circuits of a marker can be completed unless some one of the *n* receivers in the system has already been connected to one of the two markers, owing to the chain of back contacts RA*r*8 and RA*u*8.

Relay RA*rst* energizes in series with relay MB*hi*. Over its front RA*r*1, relay RA*rst* completes a common holding circuit for itself and for relay MB*hi*. Over its back RA*r*2 it opens its energizing circuit, while over its back RA*r*8 it opens the energizing circuit of relays RA*rst* of all the receivers in the system. Over its front RA*t*1 to RA*t*4, RA*r*3, RA*r*4, RA*r*5, RA*r*7, RA*s*1 to RA*s*7, RA*t*7 and RA*t*8 it establishes the connection of the marking and control wires from receiver R to marker M. Over its front RA*t*9 (FIG. 6) it applies a ground to wire 36, to prepare the energizing circuit of hundreds relays S*ab*, S*cd* and S*ef* (FIG. 9) and of the bar selection magnets in the fifties-selector frame. It will be noted that wire 36 is multipled to contacts RA*t*9 (and RA*w*9) of the four receivers of the equipment of the hundreds involved. Finally, over its front RA*t*5, it completes the following circuit: ground, front RA*t*5 (FIG. 5), wire 86, cable 2, wire 86, back MA*e*1 of the second marker, back MA*d*1, upper winding of relay MA*def*, battery. The lower winding of relay MA*def* being short-circuited, this relay does not energize immediately.

This slowing down is wasted in the case under consideration, since it has been assumed that all the relays were in normal position at the beginning of the call. But where the release of the marker has not been completed after the routing of a previous call, this slowing down will give the marker's relay time to release.

Relay MB*hi* upon energizing opens over its back MB*h*1, as has already been explained, the energizing circuit of relay MB*hi* of the second marker. Over its front MB*h*2, it prepares the energizing circuit of the relay marking the fifties in the final-selector frame. Over its front MB*i*2, it causes the energization of a relay in ringing machine AMA, this relay, not shown, short-circuiting the sending rate of the ringing A.C. in order to allow the immediate sending of this current to the called subscriber the moment his line is connected to the calling station's feeding bridge.

It will be noted that actually one or two ringing machines have been provided for the whole system, but more are shown in the diagrams in order to simplify them.

Figure 9:
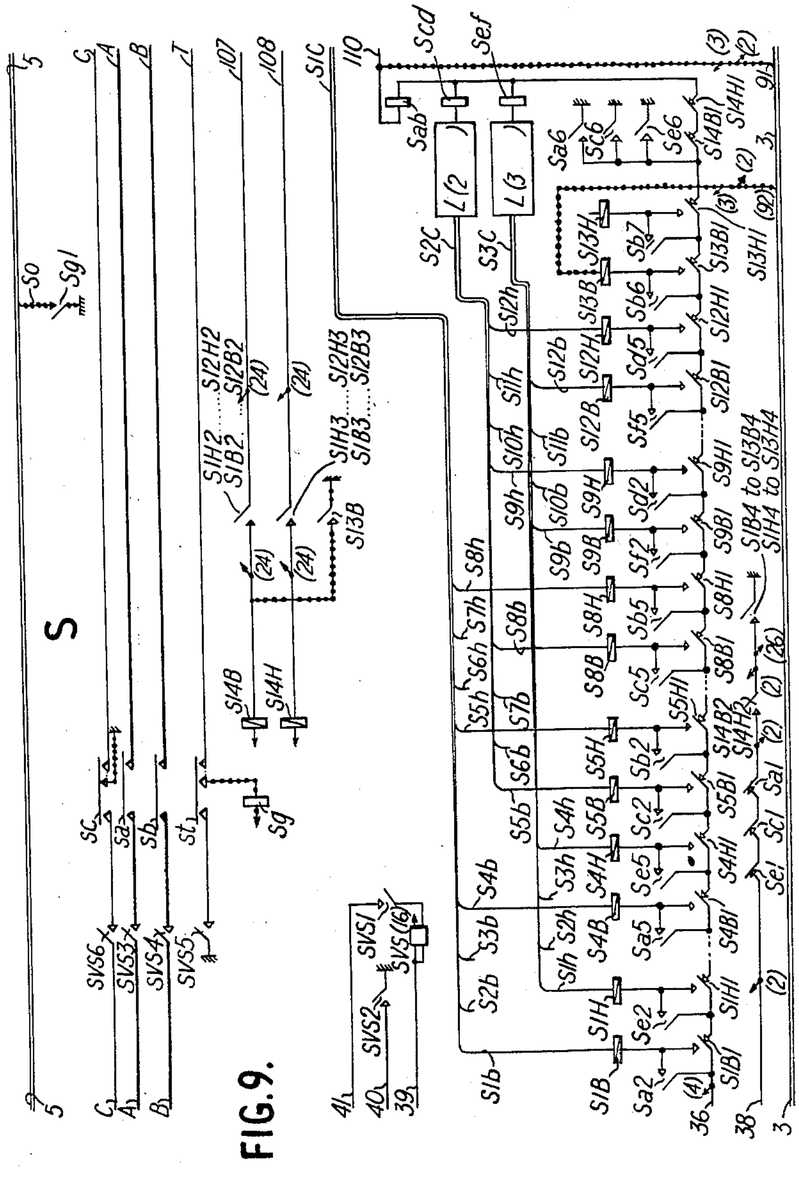
FIG. 9 is a circuit diagram of a fifties selector.

As already explained at the beginning of the description, there is, per hundreds equipment, a frame of 16 fifties selectors intended to connect the feeding bridge A seized by the calling subscriber to one of the final selectors giving access to the called subscriber. As will be seen by referring to FIG. 9, showing the fifties-selector frame of a hundreds equipment, selection magnets S1B to S4B and S5H to S8H are connected to the 16 final selectors L of the first hundreds equipment, selection magnets S5B to S8B and S9H to S12H are connected to the 16 final selectors serving the subscribers of the second hundreds group, and selection magnets S1H to S4H and S9B to S12B are connected to the 16 final selectors belonging to the third hundreds group.

Each fifties-selector selection magnet is connected, for each hundreds group, to two final selectors each serving a different fifties.

When relay MA*def* pulls up after the delay imposed on its energization, it removes the short-circuit from its lower winding over its back MA*d*1 so that it will not be slow-releasing. Over its front MA*d*2 to MA*d*4, MA*d*6 to MA*d*11, MA*e*2 to MA*e*11, MA*f*2 to MA*f*5, it connects the marking and control wires from receiver R to marker M. Over its back MA*e*1 and MA*f*1 (FIG. 5), respectively, it opens the energizing circuits of relays MA*def* and MB*hi* of the second marker in order to prevent the latter from being seized simultaneously with the first marker. Over its front MA*f*9, it prepares a holding circuit for itself under the control of the frame of final selectors L.

Owing to the connection of the receiver to the marker, the circuit of the tens-digit marking relay is completed: battery, winding of relay M*r*, front MA*e*7, wire 75 characterizing tens-digit 0, front RB*o*1, RB*m*1, back RB*l*1, front RA*t*6, ground. Relay M*r* pulls up.

Moreover, the units digit or digit 5, which has been received at the receiver, is sent directly to relays M*s*, M*t*, M*u* and M*v*. It will be recalled that the reception of this digit is characterized by the energization of receiving relays RA*k* and RA*n*. The following two circuits are completed:

(*a*) Ground on wire 35 (FIG. 6), back RA*i*3, front

RA*h*3, RA*k*4, RB*q*2, RB*s*2, RA*s*4, wire 80, front MA*f*2, winding of relay M*s*, battery.

(*b*) Ground on wire 35, back RA*i*3, front RA*h*3, RA*n*1, RB*p*1, RB*r*1, RS*s*6, wire 82, front MA*f*4, winding of relay M*u*, battery.

Relays M*s* and M*u* energize.

The "0" tens-digit marking relay M*r* upon energizing completes a holding circuit for relay MA*def* over its front M*r*10. Over its front M*r*9, it completes the circuit of the relay MA*h* identifying the called subscriber as belonging to the second fifties. Relay MA*h* energizes.

Relays M*s* and M*u* upon energizing likewise complete each a holding circuit for relay MA*def* over their front M*s*3 and M*u*4, respectively.

Finally, through a combination of front contacts not shown of relays M*r*, M*s* and M*u*, a ground is applied over front MA*f*6 to one of the 26 wires issuing from contact pyramid MPY. This contact pyramid is designed in known fashion and is not shown.

The 26 wires issuing from contact pyramid MPY are respectively connected over the front contacts of the connecting relay L*efg* (FIG. 10) of the frame of final selectors L, to the 26 selection magnets L1B to L13B and L1H to L13H. Moreover, these wires are multipled to the 26 wires of the second marker and to the selection magnets similar to L1B–L13B and L1H–L13H of the frames of final selectors L of the second and third hundreds.

In each hundreds, each selection magnet selects four subscriber lines, these four lines consisting of two consecutive lines belonging to the first fifties and two consecutive lines belonging to the second fifties, the respective units digit of the two lines of the first fifties being the same as that of the lines of the second fifties.

Thus, in the example under consideration, it will be assumed that the wire marked by contact pyramid MPY belongs to magnet L12B (FIG. 10), not shown, which for hundreds 2 selects lines 54 and 55, belonging to the first fifties, and lines 04 and 05, of the second fifties.

In the final-selector frame, the lines of subscribers comprised in the first fifties are connected to the banks of the first eight final selectors of the multi-selector and the lines of the second fifties to the banks of the other eight selectors.

The determination of the fifties comprising the called subscriber is done in marker M by relay MA*g* for the first fifties and by relay MA*h* for the second fifties, the energization of these relays depending upon the tens digit sent to the marker and registered by one of relays M*i* to M*r*. In the example under consideration it has been seen that the "0" tens digit sent by the receiver has first caused the energization of relay M*r* and then of relay MA*h*.

In the frame of final selectors L, the determination of the fifties comprising the called subscriber is done by relay L*ab* for the first fifties and by relay L*cd* for the second fifties.

Discrimination between two consecutive subscriber lines of each fifties is made by the 14th switching selection bar. This discrimination is prepared in marker M by units-digit registering relay M*s*. Reference to the preceding table giving the various receiving relays energized for the pulses sent will show that relay RA*k* is energized for all the odd-rank pulses and unoperated for all the even-rank pulses. A ground is therefore applied, over front RA*k*4, to relay M*s* of the marker for all the odd units-digits. Relay M*s* therefore is not energized for the even units-digits. Depending upon whether relay M*s* is energized or not, a ground is applied to wire 99 over its front M*s*2 or to wire 98 over its back M*s*2, this causing in the frame of final selectors L the energization of magnet L14H, for the odd units-digits, or of magnet L14B, for the even units-digits.

In the case under consideration, the units digit being the digit 5, relay M*s* is energized and a ground is applied to wire 99, thus preparing the energization of magnet L14H in the frame of final selectors L.

When relay MA*h* pulls up, it completes the following circuit over its front MA*h*1: ground, back RB*h*1 (FIG. 6), front RB*i*1, back RB*k*1, RB*j*1, removable connection *c*2, front RA*t*7, wire 67 characterizing the marking of hundreds 2, front MA*d*10, MB*h*2, wire 42, front MA*h*1, wire 94, cable 3, wire 94 (FIG. 10), winding of relay L*cd*, back contacts of all the selection magnets L14B1, L14H1, L1B1, L1H1, . . . , L13B1, L13H1, resistance LR3, battery. Relay L*cd* energizes.

Over its front MA*h*4, relay MA*h* completes a supplementary holding circuit for relay MA*def*, the latter being required to release last.

In the final-selector frame, relay L*cd* upon energizing completes the following holding circuit for itself over its front L*d*8: battery, resistance LR3, front L*d*8, winding of relay L*cd*, wire 94, and the previously-described energizing circuit up to the ground in the receiver over back RB*h*1. Over its front L*d*1 it completes the circuit of relay L*efg*. Over its front contacts L*c*1 to L*c*8 it prepares the energizing circuit of selection magnets S1B to S4B (FIG. 9) and S5H to S8H of the frame of fifties selectors S capable of connecting one of the final selectors to one of the fifties selectors. Over its front L*c*9 it prepares the energizing circuit of magnet S14H, thus telling the fifties-selector frame that the final selector to which the called subscriber is connected belongs to the second fifties. Over its front L*d*2 it prepares the test circuit of the called subscriber's station. Over its front 1*d*7 it completes the following circuit: battery, resistance LR2, front L*d*7, wire 110, winding of relay S*ab*, back contacts of all the selection magnets of the fifties-selector frame S14H1, S14B1, S13H1, S13B1, S12H1, S12B1, . . . , S9H1, S9B1, S8H1, S8B1, . . . , S5H1, S5B1, S4H1, S4B1, . . . , S1H1, H1B1, wire 36, front RA*t*9, ground Relay S*ab* energizes.

Relay L*efg* upon energizing completes over its front L*f*1 a holding circuit for relay MA*def* so that this relay will not be able to release before the end of the selection operations: ground, front L*f*1, wire 106, cable 3, cable 4 (FIG. 7), wire 106, front MA*f*9, windings in series of relay MA*def*, battery. Over one of its 26 front contacts L*e*1 to L*e*10, L*f*2 to L*f*10, L*g*2 to L*g*8, the following circuit for magnet L12B, which serves the called subscriber's line, is completed: battery, winding of magnet L12B (not shown), front of relay L*efg*, wire L12*b* (not shown), cable *mpy*, cable 3 (FIG. 8), cable *mpy*, front contacts of relays M*r*, M*s* and M*u* in contact pyramid MPY, front MA*f*6, ground. Selection magnet L12B pulls up. Over its front L*g*10, relay L*efg* completes the following circuit for switching-bar magnet L14H to make a choice between the two consecutive lines 04, 05 selected by magnet L12B of odd-rank line 05: battery, winding of magnet L14H, front L*g*10, wire 99, cable 3 (FIG. 8), wire 99, front M*s*2, MA*f*7 and ground. Magnet L14H energizes.

Upon energizing, relay S*ab*, over its front contacts S*a*2 to S*a*5 and S*b*2 to S*b*5, completes the energizing circuits of the selection magnets of the frame of fifties selectors S serving the final selectors L of the first hundreds group.

Each selection magnet, such as S1B, selects two final selectors L respectively serving the first and the second fifties. The choice of the final selector of the wanted fifties is made by the 14th selection bar or switching bar, which is operated downward by the energization of magnet S14B, for the first fifties, or upward by the energization of magnet S14H, for the second fifties.

Figure 10:
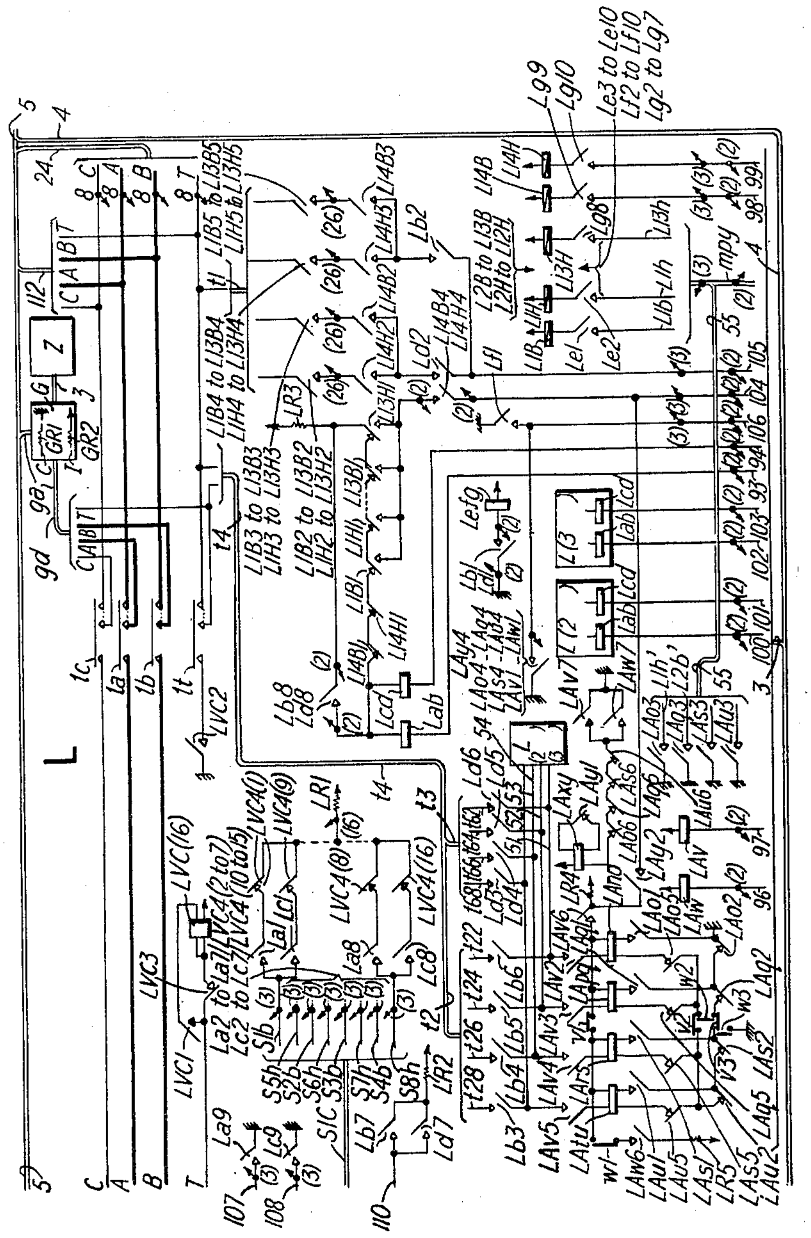
FIG. 10 is a circuit diagram of a final selector frame.

The energization of the selection magnets S1B to S4B and S5H to S8H assigned to the selection of the final selectors of the 100's involved is predicated on the availability of these finals. This availability is characterized by the closing of the back contact LVC4 associated with each connection magnet LVC of the sixteen finals. Only four of these contacts are shown in FIG. 10; the number in parentheses after the contact's reference number shows the rank of the final selector to which the contact belongs.

It will be noted that to selection magnet S1B of the frame of fifties selectors S are assigned the first final serving the first fifties and the first final, namely, the ninth of the frame, serving the second fifties. The second final serving the first fifties and the second final, namely, the tenth of the frame, serving the second fifties are selected by magnet S5H of the fifties-selector frame and so on. This distribution is similar for the other squipments S and L of the other two hundreds. It will further be noted that wires S1*b* to S4*b* and S5*h* to S8*h* are multipled respectively to selection magnets S1B to S4B and S5H to S8H of the fifties-selector frame of the second and third hundreds.

In the example described it has been assumed from the beginning that all the members were in normal position. All the energizing circuits of the eight selection magnets S1B to S4B and S5H to S8H are then completed, respectively by front contacts S*a*2 to S*a*5 and S*b*2 to S*b*5, but only magnet S1B will hold, as will subsequently be explained.

The energizing circuit of magnet S1B is as follows: ground, front RA*t*9 (FIG. 6), wire 36, front S*a*2, winding of magnet S1B, wire S1*b*, cable S1C, wire S1*b*, front L*c*1, back LVC4 of the ninth final selector, resistance LR1, battery. Magnet S1B energizes.

Relay S*ab* completes the following holding circuit for itself over its front S*a*6; ground, front S*a*6, back S14B1, S14H1, winding of relay S*ab*, wire 110, front S*d*7, resistance LR2, battery.

Selection magnet L12B and switching-bar magnet L14H of the final-selector frame upon energizing complete the following circuit over their respective front contacts L12B1 (not shown) and L14H4: battery, resistance LR3, back L13H1, L13B1, . . . , front L12B1 (not shown), L14H4, wire 104, cable 3 (FIG. 8), wire 104, front MA*f*10, left-hand winding of relay MB*de*, ground. Relay MB*de* does not energize immediately, being made slow-acting due to the short-circuiting of its right-hand winding. Over their front L12B2 and L14H2, the following called-subscriber's test circuit is completed: ground, front MA*f*8 (FIG. 8), windings in series of relay MA*i*, wire 105, cable 3 (FIG. 10), wire 105, front L*d*2, L14H2, L12B2, cable *t*1, wire T individual to the called subscriber, cable 24, cable 5, cable 42 (FIG. 2), wire T, back J*a*4 in the called subscriber's connector, back J*b*3, right-hand winding of relay J*b*, battery. Relay MA*i* alone energizes, relay J*b* being unable to do so owing to the high resistance of the winding of relay MA*i*.

In the frame of fifties selectors S, selection magnet S1B upon energizing opens over its back S1B1 the energizing circuit of the other magnets. Over its front S1B1 it completes a holding circuit for itself by the switching of front S*a*2. Over its front S1B3 the circuit of switching magnet S14H is completed as follows: battery, winding of magnet S14H, front S1B3, wire 108, front L*c*9, ground. Magnet S14H energizes. Over its front S1B4 it prepares the circuit over which the marker will be told that the selection has ended, so as to cause the energization of connection magnet SVS of the fifties selector S associated with the seized feeding bridge A.

Magnet S14H energizing, it opens over its back S14H1 the holding circuit of relay S*ab*, which releases. Over its front S14H2, it prepares the circuit that must tell the marker that the connection must be made as previously described.

Relay MA*i* upon energizing prepares over its front MA*i*2 the energizing circuit of magnet SVS of the fifties selector S associated with feeding bridge A. Over its front MA*i*3 it short-circuits its high-resistance right-hand winding, this causing the energization of relay J*b* of the called-subscriber's connector.

Subscriber relay J*b* (FIG. 2) upon energizing removes the short-circuit from the right-hand winding of relay J*a*, which energizes after a brief delay.

Relay S*ab* (FIG. 9) upon releasing completes the following circuit over its back S*a*1: ground, front S1B4, S14H2 back S*a*1, S*c*1, S*e*1, wire 38 (FIG. 7), front MA/2, back MB*k*1, wire 50, front RA*t*4, wire 28, front AB*d*3, back AA*k*7, wire 39, upper winding of connection magnet SVS, battery. The fifties-selector connection magnet SVS associated with feeding bridge A energizes.

Magnet SVS completes the following holding circuit for itself over its front SVS1: battery, windings in series of magnet SVS, front SVS1, wire 41, front AB*j*1, ground. At its front SVS2 it short-circuits the right-hand winding of relay AB*def* over the following circuit: ground, front SVS2, wire 40, right-hand winding of relay AB*def*, front AB*k*1, ground. Relay AB*def* will release only with a certain delay. Over its front SVS3, SVS4, SVS6, it establishes a metallic connection of wires A, B, C of feeding bridge A to final selector L. Over its front SVS5 it completes the following circuit: ground, front SVS5, contact *st*, wire T, back LVC3, winding of magnet LVC of the final selector chosen, battery.

Over its front LVC1 and its back LVC3, magnet LVC completes a holding circuit for itself through its two windings in series. Over its front LVC2 it applies a ground to the called-subscriber's test wire to mark the line busy and to hold relays J*a* and J*b* of the subscriber's connector. Over its back LVC4 (9) it marks final selector L busy and causes the release of selection magnet S1B.

The called-subscriber's line is therefore connected metallically to the feeding bridge A of the calling-subscriber's line through fifties selector S and final selector L.

Relay AB*def*, which had been short-circuited by the energization of magnet SVS, releases after a certain delay. Over its front AB*e*2, AB*d*5, AB*e*5, AB*e*4, AB*d*3, AB*d*1, AB*d*4, AB*f*3, AB*d*2, AB*f*5, AB*e*3, it disconnects feeding bridge A from receiver R. Owing to this, the circuits of the following relays being open, these relays release: RB*f*, RA*h*, final-digit-sent receiving relays RA*j*, RA*k*, RA*l*, RA*m*, hundreds-digit registering relay EB*i* and tens-digit registering relays RB*m* and RB*o*, hundreds-digit and tens-digit registering control relays RB*pq* and RB*rs*, relay RA*pq*. Over its front-back contact AB*e*5, the ground that had been applied to wire T through relay RB*f* is held, thus preventing the release of relays J*a* and J*b* of the calling-subscriber's connector.

Over its back AB*f*6, relay AB*def* closes the circuit sending the ringing current to the called-subscriber's set. This circuit is as follows: ground, A.C. generator G*e*, resistance AR4, back AA*g*2, AA*k*2, AB*g*4, wire B, front SVS4, contact 1*b*, wire B, cable 24, cable 5, cable 42 (FIG. 2), wire B, ringer of called-subscriber's station PA, wire A, cable 42, cable 5, cable 24 (FIG. 10), wire A, contact 1*a*, wire A, contact *sa*, front SVS3, wire A, back AB*h*4, AA*k*3, AA*g*1, AB*f*6, winding of relay AA*jk*, battery. Relay AA*jk*, not being sensitive to alternating current, remains unoperated. The called subscriber is rung.

For his part, the calling subscriber receives the ringing tone over the following circuit, which is completed over back AB*f*2: ringing machine AMA, back contact AA*k*5, front contact AB*j*4, back AB*f*2, condenser AC3, lower line wire, back contact AB*g*2, wire B, front contact CVA4, contact *cb*, wire B, station PA, wire A, contact *ca*, front contact CVA3, wire A, back contacts AB*g*1, AA*i*2, left-hand winding of relay AA*de*, battery.

Figure 7:
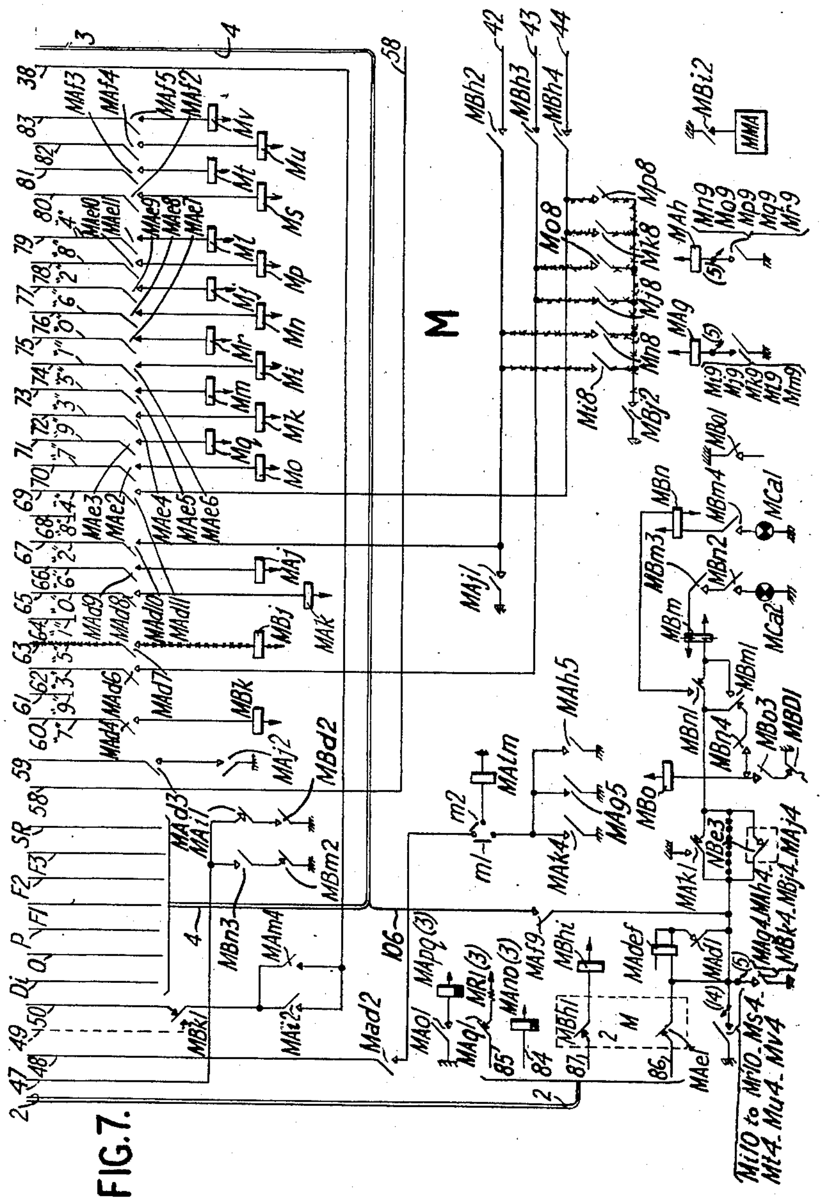
FIGS. 7 and 8 are the wiring diagram of a marker used for establishing local connections.

The receiver's relay RA*pq* upon releasing opens over its front RA*p*4 (FIG. 5) the circuit of relays RA*rst* and MB*hi* (FIG. 7). These two relays release.

Over its various front contacts RA*t*1 to RA*t*4, RA*r*3 to RA*r*5, R*ar*7, RA*s*1, RA*s*2, RA*t*8, RA*t*7, RA*s*3 to RA*s*7, relay RA*rst* upon releasing disconnects the various wires between the receiver and the marker. Over its front RA*t*5 it opens the energizing circuit of relay MA*def*, which holds over the various holding circuits completed by the relays still energized in the marker.

Receiver R is thus released. All its relays have returned to normal, except for its relay RAg, which holds as previously described, in order to allow the seizure of the second receiver when next used.

In marker M, the connecting wires to the receiver being open, tens-digit and units-digit marking relays Mr, Ms and Mu release. Over their front contacts Mr10, Ms3 and Mu4, they open three holding circuits of relay MAdef, which still holds as previously explained. Over its front Mr9, relay Mr opens the energizing circuit of relay MAh, which releases. Over the front contacts in contact pyramid MPY of relays M, Ms, and Mu, selection magnet L12B in the frame of final selectors L releases.

The hundreds-2 marking wire being open, it causes the release of relay Lcd in the frame of final selectors L.

In the frame of fifties selectors S, magnet S1B upon releasing causes, through the opening of its front S1B3, the release of magnet S14H.

In the frame of final selectors L, relay Lcd upon releasing opens over its front Ldl the energizing circuit of relay Lefg, which releases. Over its front Ld2, it opens the called-subscriber's test circuit, this causing the release of test relay MAi in marker M.

Selection magnet L12B upon releasing opens over its front L12B1 (not shown) the circuit of relay MBde (FIG. 8), which, being slow-acting, has not had time to energize.

Relay Lefg upon releasing opens over its front Lf1 the last holding circuit of marker relay MAdef. This relay releases, releasing the marker. Over its front Lg10, the circuit of magnet L14H is opened and the magnet releases.

At this point of the operation, the receiver and the marker are free and can be used for another call; the calling-subscriber's line is connected to the called-subscriber's line through the calling-subscriber's connector J, a call finder C, a feeding bridge A, a fifties selector S, a final selector L and the called-subscriber's connector. The various frames of finders C, of fifties selectors S and of final selectors L can, like receiver R and marker M, be used again for another call. The only relays energized besides relays Ja and Jb of the subscribers' connectors and the three connection magnets CVA, SVS and LVC are in feeding bridge A: the relays AAde supplying the calling subscriber and the relay ABjk holding the call at the calling subscriber's end.

The called subscriber being rung, he removes his handset, this causing the energization of relay AAjk through his station's loop.

Relay AAjk completes the following holding circuit for itself over its front AAk1: battery, winding of relay AAjk, resistance AR1, front AAk1, ABj1, ground. Through the opening of its back AAk2 and AAk3, it breaks the ringing-current sending circuit and disconnects itself from the line wires. Over its front AAk2 and AAk3, it completes the talking circuit between the called and the calling subscribers through the two condensers AC1 and AC2 and causes the energization of the relay AAhi supplying the called subscriber. The energizing circuit of relay AAhi is as follows: ground, right-hand winding of relay AAhi, front AAk2, back ABg4, wire B, previously described circuit through the called-subscriber's station, wire A, back ABh4, front AAk3, AAe3, left-hand winding of relay AAhi, battery. Over its back AAk4 it makes a break in the feeding-bridge's availability circuit. This circuit is already open at back ABk2; but, since relay ABjk must release before AAjk, it is necessary to place the feeding-bridge's availability under the control of the relay that must release last. By the opening of its back AAk5, the ringing-tone sending circuit is broken.

Relay AAhi upon energizing opens over its back AAi1 the starting circuit of ringing machine AMA. Over its contacts AAi2 and AAi3 it reverses the supply polarities on the line wires at the calling subscriber's end. Over its front AAi5 it completes a holding circuit for itself through the called-subscriber's loop, while over its front AAi6 it completes the following three holding circuits:

(a) Holding circuit for relay AAjk: battery, winding of relay AAjk, resistance AR1, front AAk1, AAi6, back AAf1, ground.

(b) Holding circuit for connection magnet CVA of call finder C: ground, back AAf1, front AAi6, back ABd6, wire 15, front CVA1, windings in series of magnet CVA, battery.

(c) Holding circuit for connection magnet SVS of fifties selector S: ground, back AAf1, front AAi6, wire 41, front SVS1, windings in series of magnet SVS, battery.

If the called subscriber hangs up first, his supply relay AAhi releases, its circuit being opened by the removal of the line-wire loop.

If the calling subscriber hangs up first, his supply relay AAde releases. Over its front AAe2 it opens the energizing circuit of relay ABjk, which, moreover, is short-circuited over back AAe2. Relay ABjk releases with a certain delay.

Relay ABjk upon releasing prepares over its back ABk2 the feeding-bridge's availability circuit. Over its front ABj1 it opens the holding circuit of relay AAjk, but the latter holds over: ground, back AAf1, front AAi6, AAk1, resistance AR1, winding of relay AAjk, battery.

When the subscribers have hung up, the holding circuit of AAjk and of magnets CVA, SVS are open and this relay and these magnets release.

Relay AAjk upon releasing re-applies ground over its back AAk4 to the feeding-bridge's availability circuit.

Connection magnet CVA upon releasing disconnects finder C from feeding bridge A over its front CVA1, CVA3, CVA4, CVA5 and CVA6. Owing to this, relays Ja and Jb of the calling-subscriber's connector J release.

Connection magnet SVS upon releasing disconnects selector S from feeding bridge A over its front SVS2, SVS3, SVS4, SVS6. Over its front SVS5 it opens the holding circuit of connection magnet LVC of final selector L, which releases.

Magnet LVC upon releasing removes the ground from test wire T over its front LVC2, this causing the release of relays Ja and Jb of the called-subscriber's connector J.

At the end of the release, all the relays and magnets are back in normal position, with the exception of relay RAg (FIG. 5), as has been previously explained.

The case where the called party is busy will now be explained.

In that case, no availability battery will be found on test wire T of his connector J, and the marker's test relay MAi cannot energize.

When slow-acting relay MBde (FIG. 8), which has been energized at the same time as relay MAi, as has been described, pulls up, it completes the following circuit over its front MBd2 (FIG. 7): ground, front MBd2, back Mai1, wire 47, front RAt1, resistance RR2, wire 30, front ABd4, resistance AR1, winding of relay AAjk, battery. Relay AAjk energizes.

Over its back AAk6, relay AAjk opens the holding circuit of connection magnet CVA of the calling-subscriber's call finder C. Magnet CVA releases.

Owing to the release of magnet CVA, which opens its front CVA3, CVA4, CVA5, CVA6, the calling-subscriber's call finder C. Magnet CVA releases.

Owing to the release of magnet CVA, which opens its front CVA3, CVA4, CVA5, CVA6, the calling-subscriber's connector J is disconnected from feeding bridge A. The holding ground of relays Ja and Jb of the calling-subscriber's connector J being removed, only relay Jb releases, relay Ja holding over the following circuit: ground, back Jb2, loop in calling-subscriber's station PA, front Ja1, back Jb1, left-hand winding of relay Ja, winding of relay Jde, battery. Relay Jde energizes.

Over its front Jel, relay Jde completes the circuit sending the busy tone to the calling subscriber: ringing machine JMA, condenser JC1, front J*el* and circuit previously described.

Further, the disconnection of connector J and of feeding bridge A has caused the release of supply relay AA*de*, which over its back AA*e*2 short-circuits for a long period general holding relay AB*jk*, which releases in turn.

Over its front AB*k*1, relay AB*jk* opens the holding circuit of relay AB*def*, which releases.

The release of relay AB*def* causes receiver R to be disconnected from feeding bridge A. The receiver is released, this causing the release of the other seized members as previously described.

The case will now be discussed where the called subscriber belongs to a hundred other than that comprising the calling subscriber.

In that case, the hundreds digit of the called-subscriber's number can be digit 3, for a subscriber belonging to the second hundred, or digit 4, for a subscriber belonging to the third hundred.

Consequently, a ground is applied by the receiver after the reception of the first digit either to wire 62, characteristic of the hundreds-digit 3, or to wire 69, characteristic of the hundreds-digit 4. This ground will cause the energization of one or the other of relays L*ab*, L*cd* in the frame of final selectors L of the 100's comprising the called subscriber, depending, as in the previous case, on whether the called subscriber belongs to the first or to the second fifties.

One or the other of these two relays, over their respective front contacts L*b*7 or L*d*7, not shown but included in the rectangles "L— (2nd hundreds)" and "*L*— (3rd hundreds)" of FIG. 9, will cause in the frame of fifties selectors S of the 100's comprising the calling subscriber the energization either of relay S*cd* or of relay S*ef*. Moreover, the various selection magnets of the fifties-selector frame belonging to the 100's comprising the calling subscriber, namely, S5B to S8B, S9H to S12H, for a called subscriber belonging to the second 100's, and S1H to S4H, S9B to S12B, for a called subscriber belonging to the third 100's, and switching magnets S14B and S14H are likewise energized through the relays L*ab* or L*cd* belonging to the final-selector frame of the 100's comprising the called party.

The rest of the operation is identical with the general case described.

In what case and how the subscribers of the system can be rung by means of a number whose hundreds digit is the digit 5 will now be described.

It has been seen that there were 104 connectors as a maximum per hundreds equipment. Since in a standard system some connectors are used for service lines or "double-call" lines, there are seldom more than 100 subscriber connectors, which consequently can be assigned a number having one and the same hundreds digit. It may happen however that more than 100 connectors are available per 100's, such being the case, for example, in a wholly-private system. The surplus connectors are then used as subscriber connectors and are assigned a hundreds digit, the digit 5, for example. In a maximum-capacity system there may be 12 stations over the 300 stations. The numbers of these stations are: 510—511—560—561 for the first 100's, 520—521—570—571 for the second 100's and 530—531—580—581 for the third 100's. In that case, connection *c*5 is established in the receiver (FIG. 6) and *x* connections are provided.

When a subscriber desires to ring one of those numbers, digit 5 is sent to the receiver, which in a manner already described causes the application of a ground to wire 63, characteristic of hundreds-digit 5.

Upon connection of marker M to receiver R (energization of relay MA*def*) (FIG. 7), the energizing circuit of relay MB*j* is completed and relay MB*j* energizes.

Over its front MB*j*2 relay MB*j* applies a ground to the wire 42, 43 or 44 characterizing the hundreds equipment comprising the called party. Discrimination of this hundreds equipment is made by the tens digit of the called-subscriber's number. For example, for called-subscriber No. 510, the sending of the tens digit 1 by the receiver causes the energization of relay M*i*. Relay M*i*, over its front M*i*8, allows applying the ground of front MB*j*2 to wire 42, characterizing the equipment of the first hundreds.

Moreover, in contact pyramid MPY back contacts (not shown) of relay MB*j* break the marking of the selection magnets used for the marking of standard subscriber-lines in the hundreds involved; in addition, over one of its front contacts, relay MB*j* directs the marking to the selection magnet specially assigned to these particular lines.

Over its front MB*j*3 relay MB*j* further completes a holding circuit for relay MA*def* as described and for the reasons given before.

In the description of a general case, such as has just been given, it has been assumed that all the members or equipments were free. Various busy-condition cases will now be discussed.

It has already been explained that the sixteen feeding bridges of a hundreds equipment were associated with four receivers R at the rate of two feeding bridges for each fifties per receiver. Further, the four receivers R are used one after another by means of the chain of relays RA*g*, shown in FIG. 5.

Where no free receiver capable of handling the call has free feeding bridges, two relays MA*no* and MA*pq* (FIG. 7) are provided to allow the release of the relays RA*g* of the receivers used previously, thus allowing the use of preceding receivers having free feeding bridges.

For example, if it is the fourth receiver's turn to use the feeding bridges, the relays RA*g* of the first three receivers are energized and hold over the following circuit: ground, right-hand windings of relays RA*g*, front contacts RA*g*2 of the first three receiver, back contacts in parallel RA*g*3 and RA*e*8 of the last receiver, wire 85, cable 2, wire 85, back MA*q*1, resistance MR1, battery.

Because the four feeding bridges connected to the fourth receiver are busy, relay RB*vw* (FIG. 6) cannot energize. Since its front RB*v*1 (FIG. 5) is open, relay RA*de* remains unoperated. The ground applied to wire 21 by the frame of call finders C then completes the following circuit: ground on wire 21, front RA*g*1 and back RA*e*1 of the first three receivers R, rectifier RQ1, back RA*e*1 in the fourth receiver, wire 84, cable 2, wire 84, winding of relay MA*no*, battery. Relay MA*no* energizes.

When relay MA*no*, which is slow-acting, pulls up, it completes the circuit of relay MA*pq*, over its front MA*o*1. Relay MA*pq* energizes.

Relay MA*pq*, likewise slow-acting, pulls up with a certain delay. Over its back MA*q*1 it opens the holding circuit of relays RA*g* of the first three receivers.

Over their back contacts RA*g*1, relays RA*g* upon releasing transfer the ground of wire 21 to the respective relays RA*de*. If the first receiver comprises at least one free feeding bridge out of the two that are connected to its and that serve the called-subscriber's fifties, its relay RA*de* energizes as has been described for the general case.

The two relays MA*no* and MA*pq* have been made slow-acting in order to allow seizure of the last receiver, in the example under consideration, in case a feeding bridge to which it is connected and capable of serving the calling subscriber should become free.

Of course, one relay MA*no* and one relay MA*pq* are provided for the four receivers of one and the same hundreds.

Where all the receivers are busy, something that can very seldom happen and then only for an extremely short period, the routing of the call is simply stopped; it will be resumed normally as soon as one of the recivers becomes free.

Likewise, no receiver can be connected to the marker during the latter's holding time. The rounting of the call is held up temporarily and is resumed as soon as the marker again becomes free. This stopping period can be only very short, the holding time of a marker being of the order of 200 milli-seconds.

The case will now be discussed where the marker fails to operate properly.

Upon seizure of the marker, the ground applied by the receiver to wire 86 (FIG. 7) for the energization of connection relay MA*def* likewise completes the following circuit for differential relay MB*m*: ground on wire 86, back MA*e*1 of the second marker unoperated, back MA*k*1, MB*n*1, lower winding of relay MB*m*, battery. Relay MB*m* pulls up.

Upon pulling up, relay MB*m* prepares over its front MB*m*4 the energizing circuit of relay RB*n*, which pulls up as soon as cam M*ca*1, started in the ringing machine, closes its contacts.

Relay MB*m* holds over its front MB*m*1, as also relay MB*n*, through its right-hand winding, over its front MB*n*1.

Over its front MB*n*2, relay MB*n* prepares the energizing circuit of the upper winding of differential relay MB*m*. Over its front MB*n*4, it prepares the energizing circuit of relay MB*o*.

When the time period, two seconds in the example described, has elapsed, cam M*ca*2 closes its contacts and the following circuit is completed: ground applied by the contacts of cam M*ca*2, front MB*n*2, MB*m*3, upper winding of differential relay MB*m*, battery. Differential relay MB*m* being balanced, it releases.

Relay MB*m* upon releasing completes the following circuit over its back MB*m*1: ground on wire 86, back MA*e*1 (second marker), MA*k*1, MB*m*1, front MB*n*4, back MB*o*3, winding of relay MB*o*, battery. Relay MB*o* pulls up. Over its back MB*m*2, relay MB*m* completes the following circuit: ground, back MB*m*2, front MB*n*3, wire 47, front RA*t*1, resistance RR2, wire 30, front AB*d*4, resistance AR1, winding of relay AA*jk*, battery. Relay AA*jk* energizes.

Relay MB*o* upon energizing completes over one or more front contacts, such as MB*o*1, one or more trouble-signaling circuits. It completes a holding circuit for itself over its front MB*o*3.

Relay AA*jk* upon energizing causes, in a manner already described, the sending of the busy tone to the calling subscriber and the release.

Relay MB*o* locks and can be restored to normal only through operation of unlocking button MBD1.

The marker involved being out of order, its availability circuit is broken by means of a key or button not shown, in order to prevent its seizure for the routing of the next call.

The case will now be described where a calling subscriber is slow in dialing after removing his handset or, having started to dial, is slow in finishing.

It has been seen that as soon as feeding bridge A is connected to receiver R, relay RB*u* (FIG. 5) energizes over the following circuit: ground on wire 35, back RA*h*1, RB*t*1, left-hand winding of differential relay RB*u*, battery.

Relay RB*u* upon energizing prepares over its front RB*u*4 the energizing circuit fo relay RB*t*, which pulls up when cam R*ca*1, started in the system's ringing machine, closes its contacts.

Relay RB*u* upon pulling up completes a holding circuit for itself over its front RB*u*2, while relay RB*t* holds, through its right-hand winding, over its front RB*t*1. Over its back RB*t*1, relay RB*t* prevents the re-energization of relay RB*u* after the latter has released. Over its front RB*t*3, it prepares the energizing circuit of the right-hand winding of relay RB*u*.

When the time period, approximately twenty seconds in the example described, has elapsed, cam R*ca*2 closes its contacts and completes the circuit of the right-hand winding of differential relay RB*u*, which, being balanced, releases.

Relay RB*u* upon releasing completes the following circuit over its back RB*u*1: ground, back RB*u*1 (FIG. 6), front RB*t*2, resistance RR2, wire 30, front AB*d*4, resistance AR1, winding of relay AA*jk*, battery. Relay AA*jk* energizes and causes, as already described, the sending of the busy tone to the calling party and the release of the seized members and equipments.

The same sequence is repeated after each pulse train if the calling subscriber is slow in dialing the second or the third digit of the called-subscriber's number.

The time device constituted by the combination of relays RB*u* and RB*t* is restored to zero as soon as the calling subscriber sends any digit, back RA*h*1 being then open.

The system can comprise a certain number of lines grouped under one and the same number. The operation of the system for the ringing of such lines will now be described.

In the example described groups of four lines as a maximum are used per fifties. It is quite obvious that this number of lines per group could be larger without thereby affecting the principle of operation.

There is only one set of relays in the whole system to provide for the operation of all the line groups. This set is shown in FIG. 10 and comprises: relay LA*v*, whereby the device is started, the four relays LA*no*, LA*pq*, LA*rs*, LA*tu* used for testing grouped lines and relay LA*xy*, which shows that all the lines in a group are busy. Only connections *v*1, *v*2, *v*3 are made, along with connection *v*4 in FIG. 8.

If it is desired to have two line-groups per fifties, another relay, LA*w*, similar to relay LA*v*, is provided, connections *v*1, *v*2, *v*3 and *v*4 are eliminated and connections *w*1, *w*2, *w*3 (FIG. 10) and *w*4 (FIG. 8) are made. Moreover, contacts LA*v*4 and LA*v*5 become LA*w*2 and LA*w*3.

Each line of the grouped-line device naturally takes the place of a standard line; it can be reached by dialing either the first line in the group or its own number. In the latter case, the selection is made like in the general case without passing through the grouped-line device.

For each hundreds, grouped lines take the place of standard lines 22, 24, 26 and 28 for the first fifties and 62, 64, 66 and 68 for the second fifties. It is quite obvious that this choice is arbitrary and that other lines, taken from different tens, could have been chosen.

It is possible to have groups comprising only three or even two lines. It suffices to eliminate wires *t*28 or *t*68 in order to obtain 3-line groups, or wires *t*28, *t*26 or *t*68, *t*66 in order to obtain 2-line groups.

In the example described, the group of lines of the first fifties belonging to the first 100's is set aside for the selection of a free service-line that will allow calling the director station's operator by dialing 0. The group of lines of the second fifties belonging to the first 100's is used for reaching outgoing trunks to distant private systems by dialing the digit 7. These two cases will be discussed subsequently.

A description will now be given, choosing specific cases, of the operation of the grouped-line device. It will be assumed that a subscriber dials number 362, corresponding to the first line of the line group belonging to the second fifties of the second 100's.

As described for the general case, the three pulse-trains are sent and registered in the receiver and then in the marker.

The tens digit 6 causes the energization of relay M*n*, which over its front M*n*9 completes the energizing circuit of fifties relay MA*h*, which pulls up.

The units digit 2, characterized by the application of a ground by receiver R to wire 81, causes the energization of relay M*t*.

Because of the reception of number 62, characteristic of a line group, the outgoing wire of pyramid MPY grounded is wire 88. Because of this, the following circuit is completed: ground on wire 88 outgoing from contact pyramid MPY, wire 97, cable 3, wire 97, winding of relay LA*v*, battery. Relay LA*v* pulls up.

Relay LA*v* upon energizing completes a holding circuit for relay MA*def* over its front LA*v*1: ground, front LA*v*1, wire 106, cable 3, cable 4, wire 106, front MA*f*9, windings in series of relay MA*def*, battery. Over its front LA*v*2, LA*v*3, LA*v*4, LA*v*5, the circuits of test relays LA*no*, LA*pq*, LA*rs*, LA*tu* are completed as follows:

(*a*) Circuit of relay LA*no*: ground, back LA*o*2, LA*q*2, connection *v*3, back LA*s*2, LA*u*2, connection *v*2, back LA*o*5, left-hand winding of relay LA*no*, front LA*v*2, wire 51, final-selector frame of the second hundreds, front L*d*6 of fifties relay L*cd* of the final-selector frame of the second hundreds, wire *t*62, cables *t*3 and *t*4, wire T, cable 24, cable 5, cable 42 (FIG. 2), wire T, back J*a*4, J*b*3, of the subscriber's connector of the first grouped-line, right-hand winding of relay J*b*, battery.

(*b*) Circuit of relay LA*pq*: ground, back LA*o*2, LA*q*2, connection *v*3, back LA*s*2, LA*u*2, connection *v*2, back LA*q*5, left-hand winding of relay LA*pq*, front LA*v*3, wire 52, and, in the final-selector frame of the second hundreds, front L*d*5, wire *t*64, cables *t*3, *t*4, wire T and circuit similar to the circuit of the preceding relay LA*no* to battery through the winding of relay J*b* of the connector of the second grouped-line.

(*c* and *d*) Circuits of relays LA*rs* and LA*tu*: The circuits of these two relays are similar to that of the preceding relays LA*pq* and LA*no* and they respectively test the third and the fourth lines of the line group.

It will be assumed that the first line in the group is free. Relay LA*no* therefore pulls up, while relay J*b* remains unoperated owing to the high resistance of the winding of relay LA*no*. Over its front LA*o*1, it completes the following holding circuit for itself: ground, front LA*o*1, right-hand winding of relay LA*no*, front LA*v*6, resistance LR4, battery. Over its back LA*o*2, it opens the holding circuit of the other three relays LA*pq*, LA*rs* and LA*tu*, which, even if they energize, cannot hold. Over its front LA*o*3, it marks the line chosen on selection magnet L1H in the final-selector frame of the second 100's, this magnet energizing over the following circuit: ground, front LA*o*3, wire L1*h*′, cable 55, cable *mpy*, wire L*lh* in the final-selector frame of the second 100's, front L*e*2 (relay L*efg* is energized, having had its circuit completed over front L*d*1 of relay L*cd* as described in the example of the general case), winding of magnet L1H, battery. Magnet L1H pulls up. Over its front LA*o*4, relay LA*no* completes a supplementary holding circuit for marker's relay MA*def*, this relay being required to release last, as has already been explained. Over its back LA*o*5, it opens its own energizing circuit, while over its back LA*o*6 it opens the energizing circuit of relay LA*xy*, which, being a slow-acting relay, did not have time to energize when relay LA*v* was energized.

Moreover, the following circuit is completed upon the energization of relay L*efg*: ground, front MA*f*7, back M*s*2 (the units digit is an even digit), wire 98, cable 3, wire 98, front L*g*9, winding of magnet L14B, battery. Magnet L14B energizes.

The rest of the operations are the same as in the general case previously described. Normal testing of the line is done over the following circuit: ground, front MA*f*8, windings in series of relay MA*i*, wire 105, cable 3, wire 105, front L*d*2, L14B2, L1H3, cable *t*1, wire T and battery through relay J*b* of the subscriber's connector and the circuit previously described; this causing the energization of relay MA*i*.

It will now be assumed that the first line in the group is busy. In that case, relay LA*no* cannot energize. The second relay LA*pq* energizes then if it finds battery through relay J*b* of the connector of the second line in the group over the circuit already described. It completes the following holding circuit for itself over its contact LA*q*1: ground, back LA*o*2, front LA*q*1, right-hand winding of relay LA*pq*, front LA*v*6, resistance LR4, battery. Over its back LA*q*2, it opens the holding circuit of relays LA*rs* and LA*tu*. Over its front LA*q*3, it marks the line on the selection magnet L2B to which the line is connected and causes its energization over the following circuit: ground, LA*q*3, wire L2*b*′, cable 55, cable *mpy*, wire L2*b* (not shown) in the final-selector frame of the second 100's, front L*e*3 (not shown), winding of magnet L2B, battery.

The rest of the operations are similar to the preceding case.

In case the first and second lines in the group are busy, relay LA*rs* of the third line (if free) will operate in similar fashion. Further, if the first three lines are busy, the fourth line will be taken (if free), relay LA*tu* energizing then.

It will be assumed, however, that the four group-lines are busy.

In that case, none of relays LA*no*, LA*pq*, LA*rs*, LA*tu* can operate. Relay LA*xy*, whose energizing circuit was completed upon the energization of relay LA*v* over its front LA*v*7, pulls up with some delay due to the short-circuiting of its right-hand winding.

Upon energizing, relay LA*xy* removes the short-circuit from its right-hand winding by opening its back LA*y*1, over its front LA*y*4, it completes a supplementary holding circuit for relay MA*def*, while over its front LA*y*2 it completes the following circuit: battery, resistance LR4, front LA*y*2, wire 104, cable 3, wire 104, front MA*f*10, left-hand winding of relay MB*de*, ground. Relay MB*de* pulls up with a certain delay and causes, in the manner already described, the sending of the busy tone to the calling subscriber and release of the seized members or equipments.

In the example just described a group of lines has been chosen belonging to the second fifties of the second hundreds. The operation is similar for any other group of lines. In the case of grouped lines belonging to the first fifties, it is relay M*j*, characteristic of the tens 2, that causes the application of a ground to wire 88 in order to allow the energization of relay LA*v*.

Furthre, a four-line group has been chosen. A larger number of lines per group could be provided, by adding relays such as LA*on*, LA*pq*, . . . If groups of only three lines are desired, it suffices to eliminate wire *t*28 or *t*68. If groups of only two lines are desired, wires *t*28 and *t*26 or *t*68 and *t*66 are eliminated.

The case where two different line-groups are provided per fifties would be handled in similar fashion. In that case, relay LA*v* characterizes the first group and controls the switching in of the relays LA*no* and LA*pq* provided to effect the selection in the first group and relay LA*w* characterizes the second group and controls the switching in of the relays LA*rs* and LA*tu* provided to effect the selection in the second group. This working is obtained by making the wiring changes already indicated (replacement of connections *v* with connections *w* and of contacts LA*v*4 and LA*v*5 with contacts LA*w*2 and LA*w*3).

The case will now be described of a call to a distant private system Z (FIG. 10).

Figure 6:
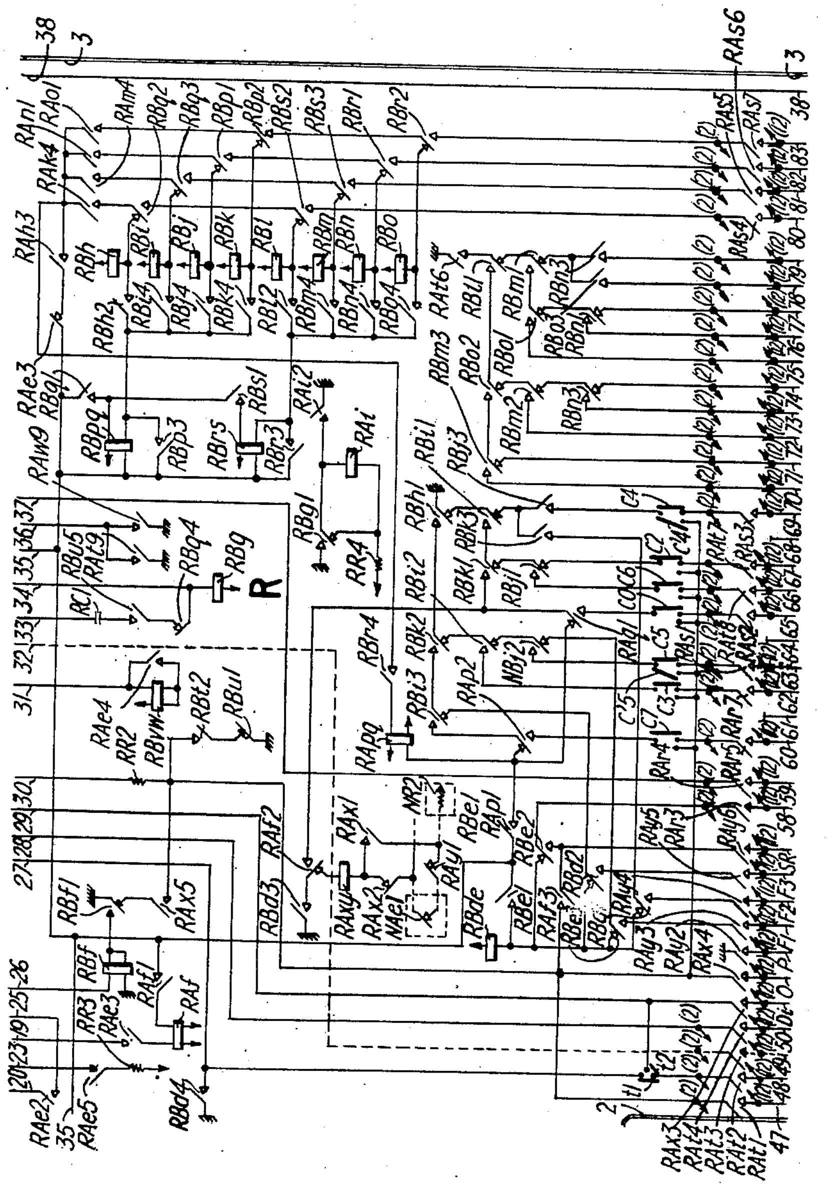

Such a call is characterized by the dialing of digit 7 in the example described. This digit 7 is received at the receiver like previously described and at the end of the sending of the seven-pulse train causes the energization of relays RB*h*, RB*i*, RB*j* and RB*k* (FIG. 6).

These relays complete the following circuit upon pulling up: ground, front RB*h*1, RB*k*2, RB*i*3,, back RA*p*2, lower winding of relay RA*pq*, battery. Relay RA*pq* pulls up.

As in the case previously discussed, relay RA*pq* causes the seizure of one of the two markers M. Over its front RA*p*2, it switches the ground of the contact pyramid of the hundreds relays from its energizing circuit to wire 60, characteristic of digit 7.

When the receiver has been connected to the marker, the circuit of relay MB*k* is completed by the ground on wire 60. Relay MB*k* pulls up.

Over its front MB*k*1, relay MB*k* prepares the energizing circuit of relay AB*gh* of feeding bridge A. Over its back MB*k*1, it makes a break in the usual energizing circuit of connection magnet SVS of the fifties-selector. Over its front MB*k*2 it completes the following circuit: ground, front MB*k*2, wire 94, cable 3, wire 94, winding of relay L*cd*, back L14B1, L14H1, L1B1, L1H, . . . L13B1, L13H1, resistance LR3, battery. Relay L*cd* pulls up. Over its front MB*k*3, relay MB*k* completes the following circuit: ground, front MB*k*3, connection *v*4, wire 97, cable 3, wire 97, winding of relay LA*v*, battery. Relay LA*v* pulls up. Over its front MB*k*4, relay MB*k* completes a holding circuit for relay MA*def*.

As an example, a group of four lines has been provided to reach distant system Z. This group belongs to the 2nd 50's of the 1st 100's.

It will be assumed that the first line in the group is free. Relay LA*no* energizes over the following circuit: ground, back LA*o*2, LA*q*2, connection *v*3, back LA*s*2, LA*u*2, connection *v*2, back LA*o*5, left-hand winding of relay LA*no*, front LA*v*2, L*d*2, wire *t*62, cable *t*3, cable *t*4, wire T, cable *gd* and availability battery across resistance GR2 in repeater-connector G.

The rest of the method of operation is similar to the cases previously described, up to the moment when, in the frame of fifties selectors S (FIG. 9), relay S*ab* releases.

Relay S*ab* completes the following circuit over its back S*a*1: ground, front contact of the selection magnet energized among the eight in the frame of fifties selectors S, front S14H2 (the outgoing line belonging to the second fifties), back S*a*1, S*c*1, S*e*1, wire 38, front MA*i*2 (FIG. 7) of test relay MA*i*, front MB*k*1, wire 49, front RA*t*3, wire 32, front AB*f*3, righthand winding of relay AB*gh*, wire A, back AA*i*2, left-hand winding of relay AA*de*, battery. Relay AB*gh* pulls up.

Relay AB*gh* completes the following circuit over its front AB*g*3: ground, front AB*g*3, AB*j*5, wire 39, upper winding of connection magnet SVS of the fifties selector, battery. Magnet SVS pulls up. Over its front AB*g*1, AB*g*2, it prepares the metallic connection between the calling-subscriber's station and repeater-connector G, while over its back AB*g*1 and AB*g*2 it disconnects the calling-subscriber's station from its supply relay AA*de*, which releases. Over its back AB*h*4, AB*g*4 it opens the ringing-current sending circuit. Over its front AB*h*1, it prepares a holding circuit for itself and prepares the energizing circuit of relay AB*i*. Over its front AB*h*2, it completes the following holding circuit for itself: ground, front AB*h*2, AB*k*4, left-hand winding of relay AB*gh*, battery. Over its front AB*h*3, it switches the general holding ground from contact AB*j*1, relay AB*jk* being required to release as will be explained.

Connection magnet SVS upon energizing causes, as previously described, the energization of final-selector connection magnet LVC. Further, over its front SVS2, it short-circuits the holding winding of relay AB*def*, which releases.

Relay AA*de* upon releasing short-circuits over its back AA*e*2 the winding of relay AB*jk*, which releases with a certain delay.

Relay AB*def* upon releasing disconnects feeding bridge A from receiver R, which releases, thereby causing the release of marker M as has already been described.

Through its energization, magnet LVC establishes the metallic connection between the calling-subscriber's line and repeater-connector G over the following circuit: battery through a winding of the supply relay (not shown) in repeater-connector G, wire A (not shown), cable *gd*, wire A, contact *la*, wire A, contact *sa*, front SVS3, wire A, dash-line shunt, front AB*g*1, front CVA3, contact *ca*, wire A, loop in calling-subscriber's station PA, wire B, contact *cb*, front CVA4, wire B, front AB*g*2, dash-line shunt, wire B, front SVS4, contact *sb*, wire B, contact *lb*, wire B, cable *gd*, ground on wire B through the second winding of the supply relay in repeater-connector G. Calling-subscriber station PA is thus from then on supplied by repeater-connector G.

Final-selector magnet LVC also completes the following holding circuit for relay AB*gh*: ground across resistance GR1 on wire C in repeater-connector G, cable *gd*, wire C, contact *lc*, wire C, contact *sc*, front SVS6, wire C, back AB*i*2, front AB*h*1, right-hand winding of relay AB*i*, left-hand winding of relay AB*gh*, battery. Relay AB*i* remains unoperated owing to the high value of resistance GR1. The function of relay AB*i* will be explained subsequently, in connection with the description of the double-call operation on a call between an outside subscriber and a subscriber of the distant private system.

In repeater-connector G, the supply relay upon energizing establishes the connection to the distant system, this causing the sending of the dialing tone to the calling subscriber. The calling subscriber then dials the called-party's number, the pulses being sent directly to the supply relay of the repeater-connector, which sends them out to the distant system.

At the end of the call, the calling subscriber by hanging up causes the release of the supply relay of repeater-connector G. Due to its release, the ground on wire C is removed and relay AB*gh* (FIG. 4) releases.

Over its front AB*h*3, relay AB*gh* causes the release of magnet SVS. Over its front SVS5, magnet SVS opens the holding circuit of magnet LVC, which likewise releases. Further, over its front AB*h*3, relay AB*gh* opens the holding circuit of magnet CVA, which releases also.

In the case of a call from distant system Z to a subscriber of the local automatic switchboard, or from the operator or from an outside line by direct seizure if the distant subscriber is entilted thereto, the connection is established like in the case of a call from the local automatic switchboard, each trunk line terminating at an incoming connector through the repeater-connector: distant system Z, cable *z*, repeater-connector G, cable *ga*, cable 5, cable 42 and a connector such as J (FIG. 2) giving access to the frame of call finders C, this connector cutting off the availability battery in repeater-connector G.

The case of party lines will now be described.

It has already been explained that the system's capacity can be increased through the use of two-station party lines, that is, lines each used for two subscribers. In the example described, the subscriber lines of the first 100's, namely, the 100's whose first call-number digit is the digit 2, have been chosen as capable of comprising party lines. The second subscriber served by a line in hundreds 2 can then be reached by dialing a number whose tens and units digits are the same as in the number of the first subscriber but whose hundreds digit is different. In the embodiment of the invention the digit 6 has been chosen as the hundreds digit of the number to be dialed to reach the second party-line subscriber.

It will be assumed that two subscribers served by one and the same line have the one the number 241 and the other the number 641.

The subscriber having number 241 will be reached in the manner already described.

The case will now be described of ringing the second subscriber, having the number 641.

As has already been explained, the various digits of his number are received at receiver R and then sent to marker M. Upon the connection of the marker to the receiver, relay M*l*, characterizing the tens-digit 4, and relay M*s*, characterizing the units-digit 1, pull up and prepare, in contact pyramid MPY, the marking of the selection magnet L11B of the frame of final selectors L of the wanted 100's, namely, the first 100's, corresponding to digit 2. Further, relay M*s* also prepares the energizing circuit of the magnet L14H of the switching bar.

The reception of the hundreds digit 6, characterized by a ground applied to wire 66, causes the energization of relay MA*j*.

Over its front MA*j*1, relay MA*j* marks the hundreds comprising the called subscriber: ground, front MA*j*1, MB*h*2, wire 42, front MA*g*1 (relay MA*g*, showing the subscriber belongs to the first fifties, has pulled up), wire 93, cable 3, wire 93 in the frame of final selectors L of the first 100's, winding of relay LA*b*, back L14B1, L14H1, L1B1, L1H1, . . ., L13B1, L13H1, resistance LR3, battery. Over its front MA*j*2, it completes the following circuit: ground, front MA*j*2, MA*d*3, wire 59, front RA*r*4, wire 37, front AB*e*3, winding of relay AA*g*, battery. Relay AA*g* pulls up. Over its front MA*j*4, relay MA*j* completes a supplementary holding circuit for MA*def*.

Relay AA*g* upon energizing completes a holding circuit for itself over its front AA*g*3. Over its front AA*g*1 and AA*g*2, it prepares the ringing-current sending circuit.

When fifties-selector connection magnet SVS pulls up, the ringing current is sent and in accordance with a known method causes the operation of the ringer of station 641 due to the fact that the generator is connected to wire A instead of to wire B.

The rest of the operation is identical with the cases previously described.

In the various examples already described it has been assumed that all the hundreds digits were used. Depending upon the capacity of the system, or upon traffic conditions, some hundreds can be free. In that case, connections *c*, such as *c*4, *c*5, are eliminated in each receiver R and connections *c'*, such as *c'*4, *c'*5, are made.

It will be assumed by way of example that the hundreds 5 is not used. Then connection *c*5 is eliminated and connection *c'*5 made.

If subscribers dial this unused hundreds-digit 5, the following circuit is completed as soon as this digit has been registered at the receiver: ground, front RB*h*1, back RB*k*2, RB*i*2, front RB*j*2, connection *c'*5, resistance RR2, wire 30, front AB*d*4, resistance AR1, winding of relay AA*jk*, battery. Relay AA*jk* energizes and causes the release and the sending of the busy signal to the calling subscriber.

The various cases of connection of inside stations to the outside network will now be discussed, with reference to FIGS. 11 to 18.

Figure 12:
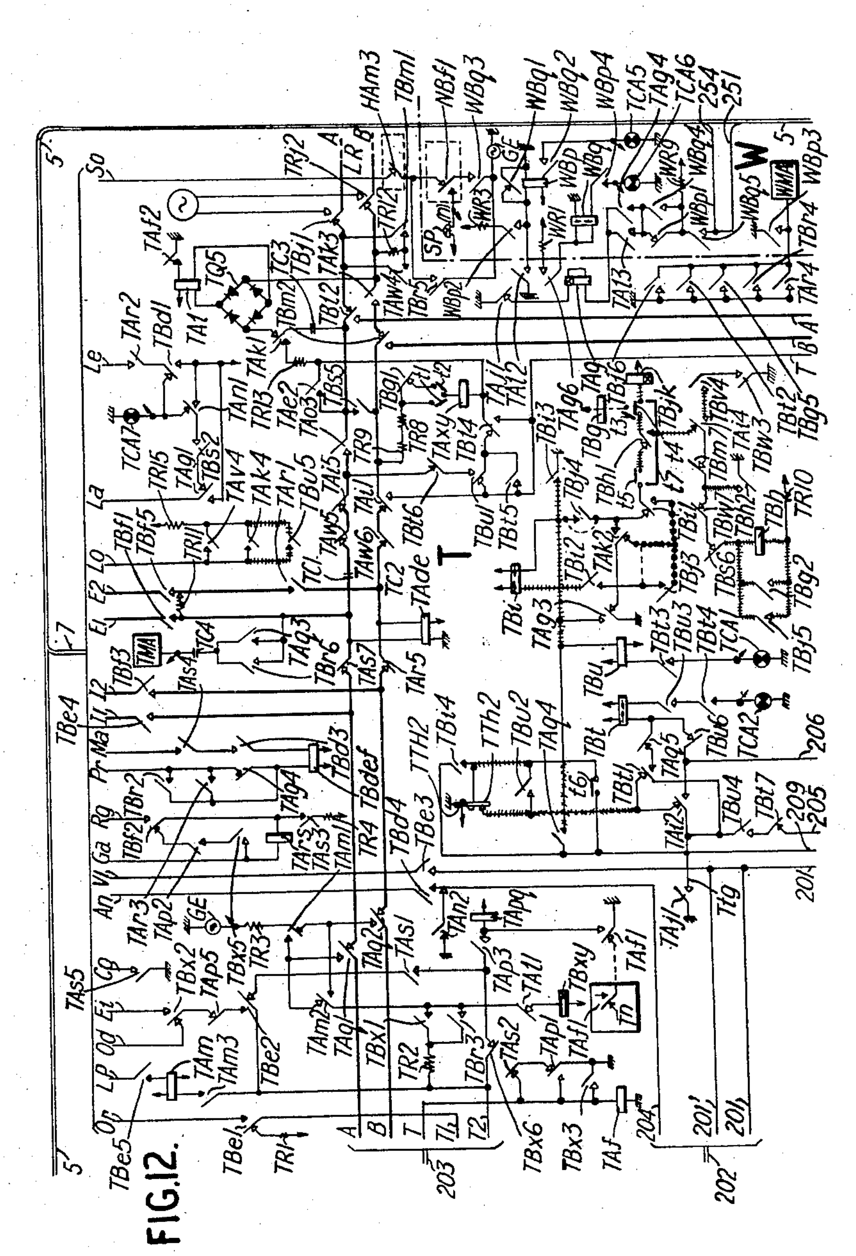
FIGS. 12 and 13 are the circuit diagram of an outside line equipment, as also, in the lower portion of FIG. 13, the circuit diagram of a double-ringing line.
Figure 13:
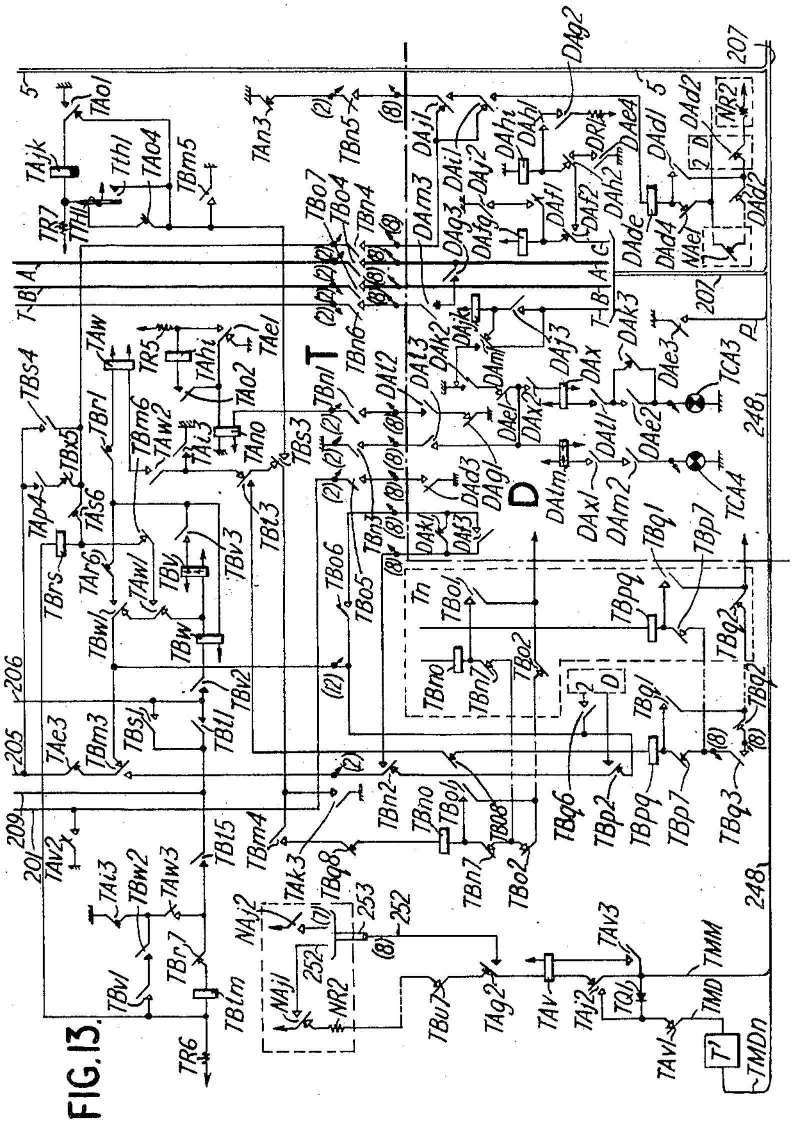

With each outside line LR is associated an equipment such as T (FIGS. 12 and 13). Each equipment T is associated with two "outside finders" V1 and V2. An outside finder V consists of an individual multi-selector selector having 52 outlets, each giving access to an extension in the system. Since outside equipment T is associated with two finders V, it gives access to 2×52-104 extensions. If the system's capacity does not exceed 8 outside lines, the 16 finders V are grouped in one and the same multi-selector. Otherwise, one or more supplementary multi-selectors would have to be provided. All the various outside equipments T give access, through one of their finders V, to the same extensions, this allowing each of said extensions to be connected to any desired outside line. Of course, this assumes that the number of extensions will not exceed 104, which is generally the case in practice. Otherwise, additional finders V would have to be provided for each outside equipment T.

Figure 11:
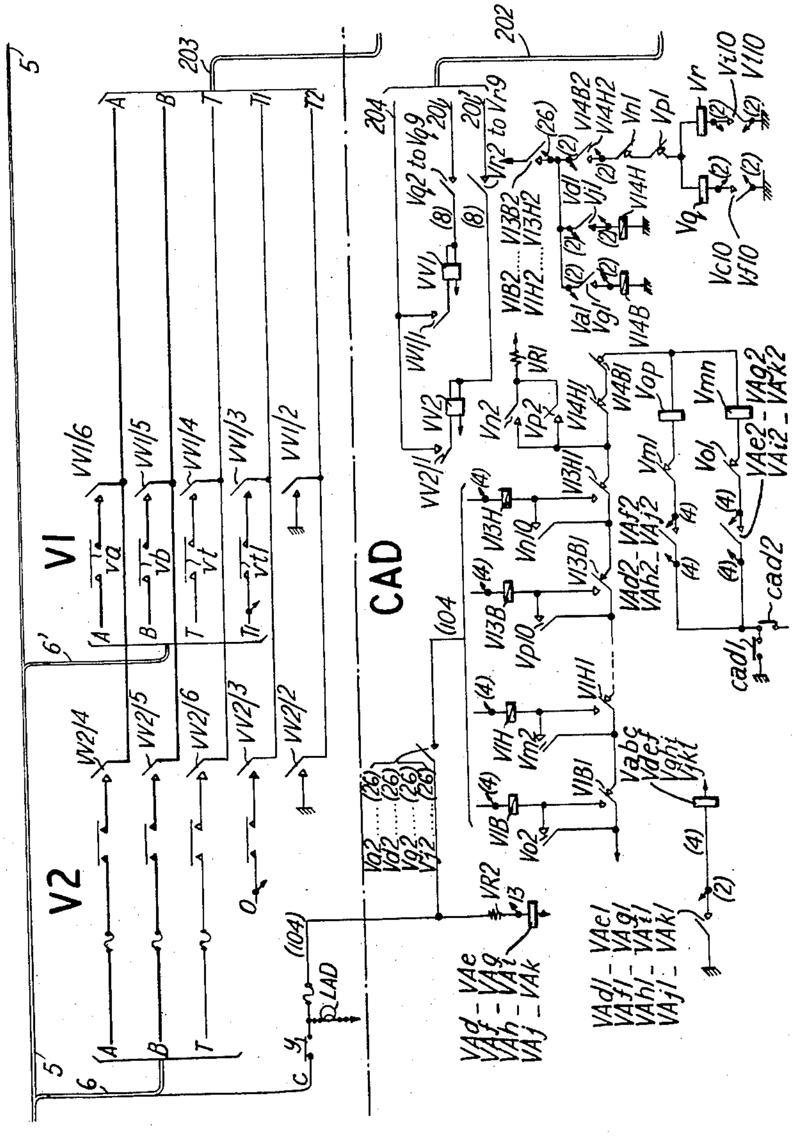
FIG. 11 is a circuit diagram of an outside call finder frame.
Figure 18:
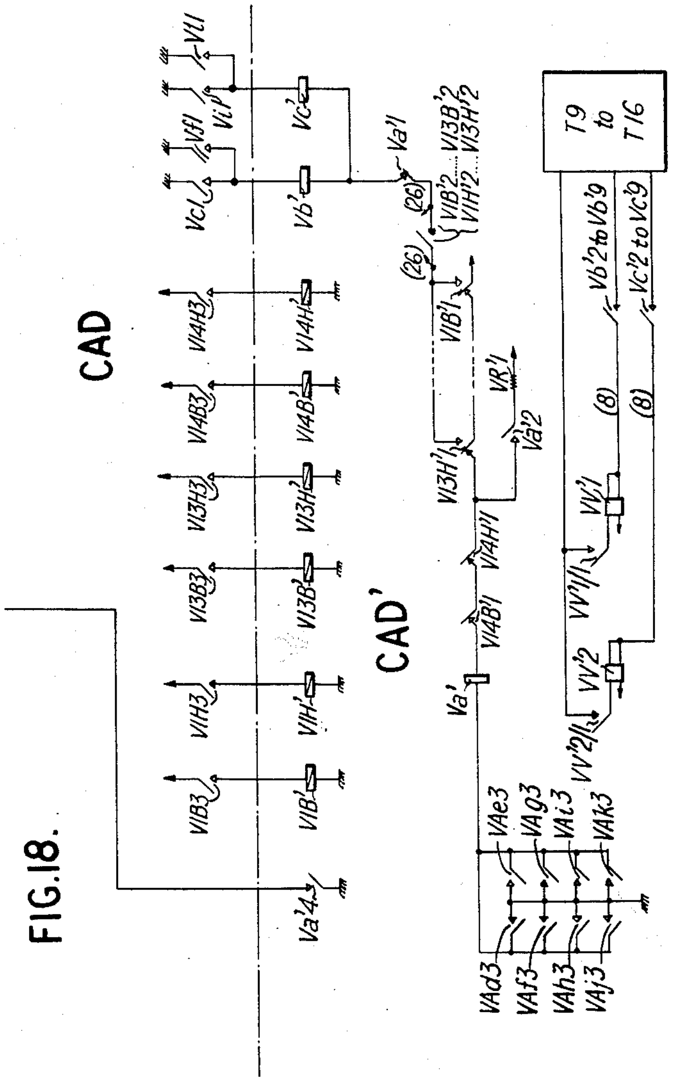
FIG. 18 is a circuit diagram of an auxiliary outside call-finder frame.

The selection and connection magnets of each multi-selector, as well as the relays controlling said magnets, have been grouped in "frames" such as CAD, CAD' (FIGS. 11, 18). It will be assumed to begin with, for greater clarity, that a single frame CAD has been provided.

Director station B (FIG. 14) can have access to all outside-line equipments T. FIG. 15 corresponds to the director-station's receiver U. One or two director stations such as B can be provided, for the whole system. Each receiver is associated with a director station. The director station and the associated receiver have been grouped in one and the same equipment; all the reference numbers of these two devices begin with the letter B. Finally, director marker N (FIG. 17) is common to the whole system; it is used for controlling the positioning of finders V and it can be seized either by a director-station receiver or by one of the receivers of the local selection-chain over cable 5.

An inside subscriber desiring to make an outside call removes his handset, thereupon being connected in accordance with a method already described, to a feeding bridge and to a receiver. He thereupon dials the number of the desired line-group. In the example given, the outside lines are divided into three groups, respectively corresponding to numbers 1, 8 and 9. These lines can be of different types. They can, for example, be automatic, central-battery (CB), local-battery (LB) or rural lines. It will be assumed first that it is desired to call an outside line of the first group and that said group is made up entirely of automatic lines. When an equipment T is associated with an automatic line, connections *x*, as well as connections *t*1, are made and connections *t*2 . . . *t*7 are eliminated. The subscriber therefore dials the digit 1. As has been indicated, this causes the operation of registering relay RB*h*. Owing to this, the following circuit is completed: battery, relay RB*de*, back RB*e*3, RB*j*2, RB*i*2, RB*k*2, front RB*h*1, ground. Relay RB*de* energizes.

At RB*e*1, relay RB*de* completes the following holding circuit for itself: battery, relay RB*de*, front RB*e*1, ground on wire 35 over a circuit already described. At RB*d*3 it causes the seizure of director marker N, the following circuit being completed: ground, front RB*d*3, back RA*f*2, relay RA*xy* energized, back RA*x*2, back NA*e*1 of director marker N, closed if said marker is available, back RA*y*1 of the receiver involved, back contacts (not shown) similar to RA*y*1 in the other receiver, resistance NR2 of the director marker, battery. The above circuit cannot be completed unless contact RA*f*2 is in normal position, that is, unless relay RA*f* itself is in normal position, such being the case when the calling subscriber is entitled to make direct outside calls.

Relay RA*xy* controls the connection of receiver R to marker N.

Director marker N can be seized not only by one of local receivers R but also by other equipments, such as the receiver U associated with director station B, as will subsequently be explained. It is necessary to prevent several equipments from being connected simultaneously to director marker N, in case the latter is free. To that end, the circuit of each of the connection relays is made to pass through back contacts of all the others. These various back contacts are shown in dot-dash lines in the energizing circuit of relay RA*xy*. When two or more equipments attempt to connect themselves to director marker N, only the connection relay located the nearest to the battery of said marker will be able to hold.

Over its back RB*e*3, relay RB*e* opens its original energizing circuit; over its front RB*e*3, it prepares the sending of the wanted outside-group's number to the director marker.

Relay RA*xy* completes a holding circuit for itself over its front RA*x*1; over its back RA*y*1, it prevents the energization of the similar relays of the receivers less-well located, so as to prevent the simultaneous seizure of one and the same director marker by two receivers, priority being given to the receivers having their contacts RA*y*1 towards the right of the figure. Over its various front contacts RA*x*3, RA*x*4, RA*y*2, RA*y*3, RA*y*4, RA*y*5, RA*y*6, relay RA*xy* establishes the continuity of the various connecting circuits between receiver R and director marker N. At RA*x*3, it completes the following circuit: ground, lower winding of relay NA*fg* (FIG. 17), wire D*i*, cables 8, 5, 4 (FIG. 10), 3 and 4 (FIG. 7), wire D*i* (FIG. 6), front RA*x*3, wire 29, front AB*d*1, wire C, front CVA6, contact *cc* of finder C in the position corresponding to the calling subscriber, wire C, cables 42, 5, 6 (FIG. 11), wire C, cable 5 (FIG. 11), connection *y*, characterizing an extension, resistance VR2, pilot relay VA*d*, battery. Relay NA*fg* alone energize in the preceding circuit, relay VA*d* remaining unoperated owing to the high resistance of relay NA*fg*.

A few explanations will now be given regarding the connection of wires C to the pilot relays. The terms "fifties" and "groups of 13" will be used throughout what follows; it is to be clearly understood that these terms refer to the position of the subscribers on the banks of outside finders V and not to their telephone number. There is further no required relationship between the positions of the subscribers on the outside-finder banks and the subscribers' numbers.

Subscriber wires C are grouped by 13's, each wire group terminating at a relay such as VA*d*. Since 104 extensions have been provided, there are 8 groups of 13 wires C, these 8 groups corresponding respectively to relays VA*d*, VA*e*, VA*f*, VA*g*, VA*h*, VA*i*, VA*j*, VA*k*. More precisely, pilot relays VA*d*, VA*f*, VA*e*, VA*g* are assigned respectively to groups No. 1, 2, 3, 4 of the first fifties; relays VA*h*, VA*j*, VA*i*, VA*k* are assigned respectively to groups No. 1, 2, 3, 4 of the second fifties.

Over its front RA*y*2, relay RA*xy* completes the following circuit: ground, front RA*y*2, wire P, cables 4, 3, 4, 5, wire P (FIGS. 16 and 17), back NA*d*1, right-hand winding of relay NA*de*, which energizes with a certain delay owing to the short-circuit of its left-hand winding battery; over its front RA*y*3 (FIG. 6), it completes the following circuit: ground, front RB*h*1, back RB*k*2, RB*i*2, RB*j*2, front RB*e*3, RA*y*3, wire F1, cables 4, 3, 4, 5, 8 (FIGS. 17), wire F1, relay NB*e* energized, battery. Relay A*xy* (FIG. 6) prepares over its front RA*x*5 the circuit provided for releasing the local selection-chain after the outside connection has been established.

The energization of NA*de* (FIG. 17) marks the seizure of marker N; that of NB*e* shows the subscriber wants an outside line of the first group; finally, that of NA*fg* characterizes the category of the calling subscriber (extension). Relays NB*f* and NB*g*, connected to wires F2 and F3, correspond respectively to the second and third outside-line groups.

Relay NB*e* completes at NB*e*1 a holding circuit for relay NA*fg*, as also an energizing circuit for relay NA*h*, which energizes with a certain delay owing to the short-circuit of its lower winding; over its front NB*e*2, it completes the following circuit: ground, front NA*g*4, NB*e*2, wire TMM, cables 248, 5, 248, wire TMM (FIG. 13), back TA*j*2, left-hand winding of relay TA*v* energized, back TA*g*2, TB*u*7, resistance NR2, back NA*j*1, battery; over its front NB*e*4 and contact NA*g*3, it short-circuits the lower winding of relay NA*fg*, this causing the energization of the pilot relay VA*d* (FIG. 11) characterizing the 13-wire group to which the calling subscriber belongs.

Relay NA*fg* (FIG. 17) completes a holding circuit for itself at NA*g*1 as previously described.

The energization of relay TA*v* (FIG. 13) marks the seizure of outside-line equipment T. Over its front TA*v*3, it completes a holding circuit for itself; over its back TA*v*1, it opens the starting circuit of the next outside-line equipment; over its front TA*v*2, it prepares the circuit of the connection magnet of outside finder V1; at TA*v*4 (FIG.12), it causes at the director station the lighting up of a busy lamp corresponding to the outside-line equipment involved, the following circuit being completed: battery, resistance RT15, front TA*v*4, wire L*o*, cables 7, 5 and 7, wire L*o*, busy lamp LO, ground.

It has been assumed in the foregoing that the first outside-line equipment of the first group was free. An outside-line equipment such as T is free when all its relays are in normal position. In that case, the chain of contacts T*aj*2, T*ag*2, T*bu*7 is closed and the above-described circuit of relay T*av* can be completed. If the first outside-line equipment of the first group had not been free, one at least of the contacts in the above chain would have been open and relay T*av* would not have been able to energize. The starting ground of wire TMM is then transferred to the second outside-line equipment T' of the first group over the following circuit: front TA*j*2 or rectifier TQ1, back TA*v*1, wire TMD. This ground controls the starting of the second outside-line equipment, if it is free; otherwise, the starting ground is transferred to the third outside-line equipment and so on.

In director marker N (FIG. 17), seizure relay NA*de*, which is made slow-acting by the short-circuit of its left-hand winding, ends by energizing. At NA*d*1, it removes the short-circuit from that winding, this making it fast-releasing; over its back NA*e*1, it makes a break in the availability circuit of the director marker, to prevent its seizure by another receiver.

Relay NA*h*, made slow-acting by the short-circuit of its lower winding, ends by energizing. At NA*h*1 it removes that short-circuit, this making it fast-releasing; at NA*h*2, it completes a holding circuit for relay NA*de*.

Pilot relay VA*d* (FIG. 11) upon energizing characterizes the 13-wire group to which the calling subscriber belongs. At V*ad*1, it causes the energization of relay V*abc*. Four relays such as V*abc*, namely, V*abc*, V*def*, V*ghi* and V*jkl*, have been provided. Relay V*abc* is connected to the two front contacts V*ad*1 and V*ae*1; it operates when the calling subscriber belongs to the first or to the third group of the first fifties (odd groups). Likewise, relay V*def* is connected to the two front contacts VA*f*1 and and VA*g*1; it operates when the calling subscriber belongs to the second or to fourth 13-wire group in the first fifties (even groups). Relays V*ghi* and V*jkl* are wired similarly; they correspond the one to the first and third groups of the second fifties and the other to the second and fourth groups of the second fifties. In the example described it has been assumed that the subscriber belonged to the first group of 13 in the first fifties; in that case, contact VA*d*1 alone is closed and it is relay V*abc* that operates.

Relay VA*d* completes the following circuit at VA*d*2: ground, strip *cad*1, front contact V*ad*2, back contact V*m*1, relay V*op* energized, back V14B1, V14H1, V13H1, V13B1, . . ., V1H1, V1B1, battery. The above-described circuit is completed only if the 26 frame-selection magnets V1B, V1H, . . . , V13B, V13H and the two switching magnets V14H and V14B are in normal position; in effect, it is important to make sure that all the selection and switching magnets of the outside-finder frame are in normal position before effecting the selection of the calling subscriber. Two relays have been provided to afford this control; the first, V*op*, is connected to the four front contacts VA*d*2, VA*f*2, VA*h*2, VAj2 and energizes if the calling subscriber belongs to either of the first two groups in each fifties; it controls the switching in of "low" selection-magnets V1B . . . V13B. Relay V*mn* is connected to the four front contacts VA*e*2, VA*g*2, VA*i*2, VA*k*2; it energizes if the calling subscriber belongs to either of the last two groups in each fifties and controls the switching in of the "high" selection-magnets. In the example described it has been assumed that the calling subscriber was the first in the first group of the first fifties; under such conditions, contact VA*d*2 is closed and relay V*op* is energized.

Relay V*abc* prepares at V*a*1 the circuit of the switching magnet V14B that must operate where the calling subscriber belongs to an odd group (first or third 13-wire group in either fifties). Switching magnet V14H corresponds to the even groups (second or fourth group in either fifties). Over its front V*a*2, relay V*abc* causes the energization of the selection magnet corresponding to the calling subscriber. Each subscriber has a wire C; in the first fifties, wires C of the 13 subscribers in the first group are connected respectively to selection magnets V1B–V13B; wires C of the 13 subscribers in the second group are connected respectively to these same selection magnets V1B–V13B; the 13 subscribers in the third group and the 13 subscribers in the fourth group are similarly connected to selection magnets V1H–V13H.

In that first fifties, each selection magnet therefore corresponds to two subscribers; thus, for example, selection magnet V1B corresponds to the first subscriber in the first 13-wire group and to the first subscriber in the second 13-wire group; likewise, magnet V13H corresponds to the last subscriber in the third group and to the last subscriber in the fourth group. In the second fifties, the connection of wires C is effected in similar fashion. Connection *y* is provided only for extensions; in the case of private stations, wire C is isolated. These various connections are made over contacts of relays V*abc*, V*def*, V*ghi* and V*jkl*. More precisely, 26 contacts such as V*a*2, associated with relay V*abc*, are used for the 13 subscribers in the first group of the first fifties and for the 13 subscribers in the third group of the first fifties, this giving one contact per subscriber. Likewise, 26 contacts associated with relay V*def* are used for the second and the fourth subscriber-groups of the first fifties, and so on.

In the example described it has been assumed that the calling subscriber was the first in the first group of the first fifties; under these conditions, relays V*ad* and V*abc* are energized; contact V*a*2 is closed and the selection magnet V1B assigned to said subscriber energizes over the following circuit: wire C grounded over a circuit already described, front V*a*2, selection magnet V1B, front V*o*2, battery.

Relay V*op* prevents at V*o*1 the operation of relay V*mn*; at V*p*2 it completes a holding circuit for itself across resistance VR1.

Selection magnet V1B prevents over its back V1B1 the energization of any of the other selection magnets; over its front V1B1, it completes a holding circuit for itself; over its front V1B2, it completes the circuit of switching magnet V14B: ground, magnet V14B, front V*a*1, V1B2, battery.

Magnet V14B opens at V14B1 the holding circuit of relay V*op*, which releases; at V14B2, it prepares the circuit of relay V*q*.

Relay V*op* upon releasing completes at V*p*1 the following energizing circuit for relay V*q*: battery, front V1B2, V14B2, back V*n*1 and V*p*1, relay V*q*, front V*c*10, ground.

Two relays V*q* and V*r* have been provided; the first is connected to the two front contacts V*c*10 and V*f*10 and operates if the calling subscriber belongs to the first fifties, as is the case in the example described; relay V*r* is connected to the two front contacts V*i*10 and V*l*10 and operates if the calling subscriber belongs to the second fifties. In the frame of outside finders V, 8 finders have been provided giving access to the first fifties and 8 finders giving access to the second fifties; each outside equipment T can be associated with two finders V so as to have access to all the subscribers in the 100's. A pair of contacts such as V*q*2 and V*r*2 is used for each outside-line equipment T; contact V*q*2 is used for switching in the connection magnet VV1 of the finder V1 giving access to the first fifties; contact V*r*2 is used for switching in the connection magnet VV2 of the finder V2 giving access to the second fifties. Contact pair V*q*2, V*r*2 is used for the first outside-line equipment; . . . contact pair V*q*9, V*r*9 is used for the eighth and final outside-line equipment.

Relay V*q* upon releasing completes the following circuit at V*q*2: battery, lower winding of magnet VV1, front V*q*2, wire 201, cable 202, wire 201, front TA*v*2, ground. Connection magnet VV1 operates and causes outside finder V1 to be connected to the calling subscriber, previously selected by means of magnets V1B and V14B. The calling subscriber is then supplied over the following circuit: ground, left-hand winding of relay TA*de* energized, back T*as*7, T*aq*1, wire A over cable 203, front VV1/6, contact *va* of outside finder V1, wire A, cables 6′, 5, 42 (FIG. 3), wire A, calling-subscriber's loop, wire B, cables 42, 5, 6 (FIG. 11), wire B, contact *vb*, front VV1/5, wire A over cable 203, back T*aq*2, T*ar*5, right-hand winding of TA*de*, battery.

Further, a free ground is applied to the calling-subscriber's test wire T over the following circuit: ground, back TA*p*1, TA*s*2, wire T over cable 203, front VV1/4, contact *vc*, wire T. This ground holds the two relays J*a* and J*b* of the calling-subscriber's connector, but it short-circuits the receiver's relay RB*f* (FIG. 6), which releases after a moment and causes the release of the local selection-chain as will subsequently be explained.

The calling subscriber has a second test-wire T1, individual to him; this wire is connected to battery over the following circuit: contact *vt*1 of outside V1, front VV1/3, wire T1 over cable 203, back TB*e*1, resistance TR1, battery. This shows that the calling subscriber has seized an outside finder.

Connection magnet VV1 prepares a holding circuit for itself through its two windings in series over its front VV1/1.

Supply relay TA*de* causes the energization of relay TA*no* over its front TA*el* and across resistance TR5; at TA*e*2, it prepares a looping circuit for the outside line.

Relay TA*no* completes at TA*n*2 the following holding circuit for the connection magnet VV1 of finder V: battery, windings in series of magnet VV1, front VV1/1, wire 204 over cable 202, back TB*d*4, front TA*n*2, ground; over its front TA*o*1, it causes the energization of slow relay TA*jk* across resistance TR7; over its front TA*o*2 and front contact TA*e*1, it short-circuits relay TA*hi*; over its front TA*o*3, it prepares the talking circuit.

Relay TA*jk* causes over its front TA*j*1 the application of a general ground to wire T*tg*, which will be used in establishing the connection; over its back TA*j*2, it makes a break in the availability circuit of outside-line equipment T; over its front TA*j*2, it prepares the circuit for transferring the starting ground to the second outside-line equipment in accordance with a method already described; through the opening of its back TA*j*4, it makes a break in wire P*r* in order to prevent seizure of equipment T by an operator; over its back TA*k*1, it switches out the rectifier bridge TQ5, used only for incoming calls; over its front TA*k*1, it connects resistance TR13 and condenser TC3 in parallel with contact TA*e*2, thus preparing a spark-extinguishing circuit that will be used when dialing the outside line; at TA*k*3, it loops the outside line over the following circuit: wire A of outside line LR, back TB*j*1, TB*l*2, front TA*e*2, self-inductance TA*xy*, connection *t*1 (connection *t*2 not being established), resistance TR8, TR9, back TB*m*, front TA*k*3, back TB*j*2, wire B of outside line LR. This looping causes the seizure of the automatic outside line; at TA*k*4, relay TA*jk* doubles contact TA*v*4 to hold the busy lamp lighted after the opening of said contact TA*v*4.

The calling subscriber is then connected to the outside line over the following circuit: wire A of said subscriber (FIG. 11), contact *va* of the outside finder, front VV1/6, wire A over cable 203, back TA*q*1, TA*a*7, condenser TC1, back TA*w*5, TA*i*5, front TA*o*3, back TB*l*2, TB*j*1, line wires A and B of outside line LR, back TB*j*2, front TA*k*3, back TB*m*2, TA*i*1, TA*w*6, condenser TC2, back TA*r*5, TA*q*2, wire B over cable 203, front VV1/5, contact *vb* of outside finder V and line wire B of the calling subscriber.

The calling subscriber being connected to the outside line, the local selection-chain is no longer used and will be released as follows. Relay RB*f* of the local receiver (FIG. 6) is short-circuited through the outside-line equipment as has been indicated and ends by releasing. Over its back RB*f*1, it completes the following circuit: ground, back RB*f*1, front TA*x*5, resistance RR2, wire 30, front AB*d*4, resistance AR1, relay AA*jk*, which releases with a certain delay, battery.

At AA*k*1, relay AA*jk* completes the following holding circuit for itself: battery, relay AA*jr*, resistance AR1, front AA*k*1 and AB*j*1, ground; at AA*k*6, it opens the circuit of magnet CVA; the various contacts *ca*, *cb*, *ct*, *co* of call finder C are open and the calling subscriber is accordingly isolated from the local selection-chain. Supply relay AA*de* being no longer looped to said subscriber's station, it releases and causes the release of the local selection-chain in accordance with a method already described.

When the local selection-chain is released, wire C of the calling subscriber is broken at CVA6 (FIG. 3), this causing the release of marking pilot-relay VA*d* and of selection magnet V1B.

Relay VA*d* opens at VA*d*1 the circuit of relay V*abc*, which releases.

Selection magnet V1B opens at V1B2 the circuit of switching magnet V14B and of relay V*q*, both of which release.

The various relays and magnets used for the selection of the calling subscriber have all returned to normal position and are ready to be used anew for the routing of another call.

In director marker N (FIG. 17), relay NB*e* releases, having its circuit open in the local selection-chain's receiver. At Nb*e*1, it opens the circuit of relay NA*h*, which releases; at NB*e*2, it opens the circuit of the outside-equipment's starting relay TA*v*, which releases also. Relays NA*fg* and NA*de* return to normal, having their circuits open in the local selection-chain, the one at RA*x*3 and the other at RA*y*2. The director marker is fully released and ready to be used for the routing of another call.

The calling subscriber being connected to the outside line, he receives dialing tone from the public automatic exchange and can dial the wanted party's number.

At the beginning of the first dialing-pulse, relay TA*de*, having its circuit opened by the dial, releases and at TA*d*2 opens the loop of the outside line. At the end of the first pulse, relay TA*de* re-energizes and completes the outside-line's loop again at TA*e*2.

A first pulse is therefore sent to the outside line through the play of contact TA*e*2. The next pulses are sent the same way.

At the beginning of the first dialing-pulse, relay TA*hi*, whose short-circuit is removed because of the opening of front contact TA*e*1, energizes over the following circuit: ground, back TA*e*1, front TA*o*2, relay TA*hi*, resistance TR5, battery. This relay suffers brief short-circuitings over front contact TA*e*1 throughout the pulse train, but it is made slow-releasing because of said short-circuitings and holds throughout the pulse train. At the end of the pulse train, relay TA*hi* is short-circuited for a longer period over front contact TA*el* and it releases. Relay TA*no* also suffers brief short-circuitings over back contact TA*e*1, but it nevertheless holds, for the same reason as above.

Relay TA*hi* makes a break in the line wires over its back contacts TA*i*1 and TA*i*5 in order to isolate the calling-subscriber's station; over its front TA*i*1 and back TB*u*1 and TB*l*4, it short-circuits self-inductance TA*xy* in order to prevent distortion of the dialing pulses; over its front TA*i*2, it completes the following circuit: battery, left-hand winding of relay TB*t* energized, back TB*u*6, front TA*i*2, TA*j*1, ground.

Relay TB*t* completes the following holding circuit for itself at TB*t*1: battery, left-hand winding of relay TB*t*, back TA*q*5, front TB*t*1 and TA*j*1, ground. Over its front TB*t*2, it causes the starting of ringing machine WMA, in order to cause the starting of the two cams TCA1 and TCA2; over its front TB*t*3, it prepares the left-hand winding of relay TB*u*; over its front TB*t*4, it prepares the circuit of its opposite winding; at TB*t*5 it doubles back contact TB*u*1 in order to hold the short-circuit of self-inductance TA*xy* even after the opening of said back contact.

When the first pulse-train ends, relay TA*hi* releases as previously described, this causing self-inductance TA*xy* to be switched in again.

The remaining pulse-trains are sent to the outside line in accordance with a similar method. The called-subscriber's selection in the public exchange is effected in accordance with a known method and when said subscriber answers he finds himself connected to the calling subscriber over a circuit already described.

It will be noted that public exchanges do not necessarily provide battery reversal at the calling-subscriber's end when the called subscriber answers; generally, no device can be provided in outside-line equipment T to delay said called-subscriber's answer and nothing shows the moment when said equipment must pass to the "talking" position. In order to remedy that drawback, a time device has been provided, which is started when the subscriber begins to dial an outside call; outside equipment T will be considered to be in talking position after the delay imposed by that device; as from that moment onward, the digits dialed by the calling subscriber will no longer be sent to the outside exchange but will control certain operations such as the following: double ringing, re-ringing of the operator, etc.

This time device consists essentially of relays TB*u*, TB*t* and cams TCA1, TCA2. It operates as follows. When cam TCA1 closes its contact, the following circuit is completed: ground, cam TCA1, front TB*t*3, left-hand winding of relay TB*u*, battery. Relay TB*u* energizes. At TB*u*2, it completes the following holding circuit for itself: battery, right-hand winding of relay TB*u*, front TB*u*2, connection X, back TA*i*2, front TA*j*1, ground; over its front TB*u*1, it prepares the direct looping of the outside line to self-inductance TA*xy*, that is, without passing through dialing contact TA*e*2; at TB*u*3, it prepares the circuit of the opposite winding of relay TB*t*; at TB*u*4, it prepares the reception at equipment T of signals intended to cause various operations, such as double ringing, return to the outside exchange, etc. Through the opening of its back contact TB*u*6, it opens the original energizing circuit of relay TB*t*, which holds as already described.

After a predetermined time period, cam TCA2 closes its contact and the following circuit is completed: ground, cam TCA2, front TB*t*4, TB*u*3, right-hand winding of relay TB*t*, battery. The fluxes produced by the two windings of relay TB*t* being equal and of opposite sign, said relay releases. Over its back TB*t*1, it completes the following holding circuit for relay TB*u*: battery, right-hand winding of relay TB*u*, front TB*u*2, connection X, back TB*t*1, front TA*j*1, ground; through the opening of its front TB*t*2, it comes the stopping of ringing machine MA and hence of cams TCA1 and TCA2; over its back TB*t*6, it loops the outside line over the following circuit: wire A of outside line LR, back TB*j*1, TB*l*2, front TA*o*3, back TB*t*6, front TB*u*1, back TB*l*4, self-inductance TA*xy*, connection t1, resistances TR8, TR9, back TB*m*2, front TA*k*3, back TB*j*2, wire B of outside line LR. Dialing contact TA*e*2 is therefore eliminated; such pulse trains as may subsequently be sent by the calling subscriber will have no effect on the outside line. Relay TB*t* prepares at TB*t*7 the receiving circuit for signals intended to cause various operations, which have already been mentioned.

Of course, the time device consisting of the two relays TB*u* and TB*t* is restored to zero every time the subscriber sends a digit to the outside line; it is in effect desirable that the delay imposed by this device be counted forward from the moment the called-subscriber's selection has ended. Each time the calling subscriber sends a digit to the outside system, back contact TA*i*2 is opened and relay TB*u* releases, this bringing about said restoration to zero.

When equipment T is in "outside talking" position, the calling subscriber can, if he so desires, be connected to some other subscriber served by the local automatic switchboard. For that purpose he dials a suitable number, assumed in the example described to be the digit 2. At the beginning of the first pulse, relay TA*de* releases and at TA*e*3 completes the following circuit: battery, lower winding of relay TB*v*, back TA*w*1, TB*w*1, TB*m*3, TA*e*3, TB*t*7, front TB*u*4, TA*j*1, ground. Relay TB*v* energizes. At TB*v*2, it prepares a holding circuit for itself, as well as an energizing circuit for relay TB*w*; at TB*v*3, it prepares the circuit of its opposite winding.

During the reception of the digit-2 pulse train, relay TA*hi* is in operating position in accordance with a method already described. Moreover, contact TA*e*2 is operated; but no pulse is sent to the outside line, for the reasons already given.

When the first pulse ends, relay TA*de* re-energizes; back contact TA*e*3 is open; relay TB*v* holds and relay TB*w* energizes, the following circuit being completed: battery, lower winding of relay TB*v*, upper winding of relay TB*w*, front TB*v*2, wire 206, front TA*i*2, TA*j*1, ground. Over its front TB*w*1, relay TB*w* prepares the reception of the second dialing-pulse through the opposite winding of relay TB*v*.

At the beginning of the second pulse, relay TA*de* releases, contact TA*e*3 re-closes and the following circuit is completed: battery, upper winding of relay TB*v*, front TB*v*3, back TA*r*6, front TB*w*1, back TB*m*3, TA*e*3, wire 205, back TB*t*7, front TB*u*4, TA*j*1, ground. The fluxes produced by the two windings of relay TB*v* being equal and of opposite sign, relay TB*v* releases. On the other hand, relay TB*w* holds through its lower winding in shunt over the circuit previously described.

Relay TA*w* energizes over the following circuit: battery, upper winding of relay TA*w*, back TB*r*1, TA*r*6 and circuit previously described.

Relay TA*w* completes the following holding circuit for itself at TA*w*2: battery, lower winding of TA*w*, front TA*w*2, TA*i*3, ground; at TA*w*3, it prepares an energizing circuit for double-ringing relay TB*lm*; at TA*w*5 and TA*w*6, it makes a break in the line wires to prevent sending the outside subscriber an acoustic shock after the release of series relay TA*hi*.

When the second dialing-pulse has ended, relay TA*de* re-energizes, back TA*e*3 opens and relay TB*w* releases, its holding circuit being open.

When the reception of digit 2 ends, relay TA*hi* homes. Backs TA*i*1, TA*i*5 are again closed but the line remains broken due to the opening of the two contacts TA*w*5, TA*w*6. Relay B*lm*, energizes over the following circuit: battery, resistance TR6, relay TB*lm*, back TB*r*7, front TA*w*3, back TA*i*3, ground; at TA*i*3, relay TA*hi* opens the holding circuit of TA*w*, which releases.

Relay TB*lm* controls the various operations involved in double-ringing. At TB*l*5, it completes the following holding circuit for itself; battery, resistance TR6, relay TB*lm*, back TB*r*7, front TB*l*5, wire 209, front TA*j*1, ground; over its back TB*l*2 and TB*m*2, it disconnects the calling party from outside line LR; said outside line is held, being looped to resistance TR12 over front TB*m*1. Over its front TB*l*2 and TB*m*2, it prepares the connection of the calling subscriber to a special connector for the double ringing; over its front TB*m*4 it causes the seizure of a double-call line, the following circuit being completed: ground, front TA*k*5, TB*m*4, back TB*q*8, relay TB*no*, back TB*n*7, TB*o*2, similar contacts TB*o*2 in the outside equipments T′ having access to the same double-call line D, battery. Over its front TB*m*3, relay TB*lm* prepares the reception of the number that must return the calling subscriber to the outside system when the connection obtained via double call comes to an end.

Relay TA*w* upon releasing prepares at TA*w*5 and TA*w*6 the continuity of the talking circuit used for the double call.

Relay TB*no* upon energizing controls the connection of equipment T to the first double-call line. Two double-call lines D capable of being used by each outside-line equipment T have been provided. Only one of these lines is shown. Priority is given to the seizure of the line corresponding to relay TB*no*. If that line is busy, the two back contacts TB*n*7 and TB*o*2 are open, relay TB*no* cannot energize and hence the second double-call line D1 is seized, the following circuit being completed: ground, front TA*k*5, back TB*s*3, front TB*l*3, back TB*o*2, relay TB*pq*, back TB*p*7, front TB*o*3 of one of the relays TB*no* controlling the connection to the first double-call line, back TB*q*2 of all the outside equipments T, battery. If the second double-call line were busy, one of contacts TB*q*2 would be open and the wanted double-call connection could not be handled so long as the two lines remained busy.

As has been indicated, both double-call lines D are common to all the outside equipments T. Either one of these two lines can be seized by the various outside equipments T of the system; to that end, as many seizure relays such as TB*no* have been provided as there are equipments T capable of being associated therewith. A chain of back contacts TB*o*2 has been provided to prevent one and the same double-call line D from being seized by more than one outside equipment T.

In the example described it has been assumed that line D was free, the relay TB*no* on the left-hand side of the figure being then energized. At TB*o*1, relay TB*no* completes a holding circuit for itself; over its front TB*n*2, it prepares the reception of the code chosen to control the return of the calling subscriber to the outside system when a double-call call ends; at TB*n*3, it prepares an energizing circuit for relay DA*lm*; at TB*n*7 and TB*o*2, it opens its original energizing circuit; at TB*o*4 and TB*o*7, it loops wires A and B of the double-call line to self-inductance TA*xy* over the following circuit: wire A, front TB*o*4, TB*l*2, TA*e*2, self-inductance TA*xy*, connection *t*1, resistance TR8, TR9, front TB*m*2, TB*o*7, wire B. Wires A, B, C, T of double-call line D are connected over cables 207, 5 and 42 (FIG. 3) to a connector J similar to the one of the other subscribers. Wires A, B being looped, the seizure of the local selection-chain will therefore be caused in accordance with the same method already described.

When double-call line D is seized by the local-selection chain, a ground is applied to wire T in accordance with a method already described, this causing the energization of relay DA*jk* (FIG. 3) over back DA*m*1. Relay DA*jk* completes a holding circuit for itself at DA*j*3; at DA*j*2, it prepares a holding circuit for relay DA*fg*; at DA*k*1, it makes a break in the circuit provided for receiving the code that must cause the return to the outside line; over its front DA*k*2, it completes the following circuit: battery, right-hand winding of relay DA*lm*, back DA*e*1, front DA*k*2, ground; through the opening of its back DA*k*3, it prevents the switching in of relay DA*x*, which is not used in the case involved.

Relay DA*lm* completes the following holding circuit for itself at DA*m*3: battery, right-hand winding of relay DA*lm*, front DA*l*3, TB*n*3, ground; over its back DA*m*1, it opens the original energizing circuit of relay DA*jk*, whose holding is placed under the sole control of contact DA*j*3; at DA*m*3, it prepares for the two line wires A and B a looping circuit that will be used at the end of the dialing to eliminate contact TA*e*2.

Selection magnet C1B has been allotted to the two double-call lines connected on the banks of finder C of the local-selection chain. In the event of double call, therefore, magnet C1B is energized, contact C1B5 is closed and the following circuit is completed: ground, lower winding of relay C*w*, back C*i*8, front C1B5, front CA9, wire 18, left-hand winding of relay AA*f*, front AB*e*2, wire 23, front RA*e*5, resistance RR3, battery. Relay AA*f* energizes. At AA*f*2, it completes the following holding circuit for itself: battery, right-hand winding of relay AA*f*, front AA*f*2 and AB*j*2, ground; at AA*f*3, it prepares the sending of an end-of-dialing signal to the double-call line.

The dialing tone from the local automatic switchboard is sent to the calling subscriber over the following circuit: wire A (FIG. 13), front TB*o*4, TB*l*2, TA*o*3, back TA*i*5 and circuit already described over the calling-subscriber's loop, back TA*i*1, front TB*m*2, TB*o*7, line wire B.

The calling subscriber then dials the number of the inside station with which he wants to be connected. The dialing pulses make relay TA*de* beat and are sent to the local automatic switchboard through the play of contact TA*e*2. Relay TA*hi* energizes in accordance with a method already described during each pulse train; over its front TA*i*1, and front TB*l*4, it short-circuits self-inductance TA*xy*.

Once the three digits of the called-subscriber's number have been received at the local automatic switchboard, one or the other of relays MA*g* and MA*h* of the local marker (FIG. 7) is energized and the following circuit is completed: ground, front contact MA*g*5 or MA*k*5, connection *m*1, front MA*d*2, wire 48, front RA*t*2, connection *r*1, front AB*e*4, AA*f*3, AB*d*1, wire C, front CVA6, contact *cc* of call finder C in the position corresponding to the double-call line involved, cable *da*, connector JDA, cables 5 and 207, wire C (FIG. 13), back DA*f*2, relay DA*fg* energized, battery. At DA*f*1, relay DA*fg* completes the following holding circuit for itself: battery, relay DA*fg*, front DA*f*1 and DA*j*2, ground; over its back DA*f*2, it opens its original energizing circuit; over its front DA*f*2, it prepares the circuit of relay DA*hi*; over its front DA*f*3, it prepares the reception at equipment T of the code intended to cause the return to the outside line; over its front DA*g*2, it prepares a holding circuit for relay DA*hi*; at DA*g*3, it loops the two line wires A and B over the following circuit: wire A, front DA*g*3, DA*m*3, TB*m*6, TB*l*4, self-inductane TA*xy*, connection *t*1, resistances TR8 and TR9, front TB*m*2, TB*o*7, line wire B. Dialing contact TA*e*2 is therefore switched out and any digits sent subsequently by the calling subscriber will not be sent to the local automatic switchboard.

When the inside subscriber answers, he finds himself connected to the calling subscriber over the circuit already described for the sending of the dialing tone.

The following circuit is then completed if said called station is an extension: ground, relay DA*hi*, back DA*h*2, front DA*f*2, wire C, cables 207 and 5, connector JDA (FIG. 3), cable *da*, wire C, contact *cc* of finder C in the position corresponding to the double-call line, front CVA6, wire C, back AB*d*1, front AA*f*4 and AA*i*5, back AB*h*1, AB*i*2, front SVS6, contact *sc* of selector S, contact *lc* of final selector L, wire C, cables 112, 5 and 6 (FIG. 11), wire C, connection *y*, characteristic of an extension, resistance VR2 and one of pilot relays VA*d* to VA*k*. Relay DA*hi* energizes. At DA*h*1, it completes the following holding circuit for itself: ground, relay DA*hi*, front DA*h*1 and DA*g*2, resistance DR1, battery; over its front DA*h*2, it prepares the application of a free ground to wire C, which will be used in the event of transfer; over its front DA*i*1, it prepares the circuit of relay DA*de*, which also will be used in the event of transfer.

When a double-call has ended, the calling subscriber can either return to the outside line or transfer the outside call to a subscriber called by double-call, on condition, of course, that said subscriber have an extension.

The case will first be discussed where the calling subscriber wants to resume the outside call. For that purpose, he dials a suitable number, assumed in the example described to be the digit 1. At the beginning of the first dialing-pulse, relay TA*de* releases, the following circuit being then completed: ground, front TA*j*1, TB*u*4, back TB*t*7, wire 205, back TA*e*3, front TB*m*3, TB*n*2, DA*f*3, TB*o*6, back TB*w*1, TA*w*1, lower winding of relay TB*v* energized, battery.

Relay TB*v* prepares at TB*v*1 the short-circuit of double-ringing relay TB*lm*.

When the first dialing-pulse ends, relay TA*de* re-energizes and contact TA*e*3 opens; relay TB*v* holds and relay TB*w* energizes over the following circuit: battery, lower winding of relay TB*v*, upper winding of relay TB*w*, front TB*v*2, TV*l*1 and TA*i*2 in parallel, front TA*j*1, ground. When relay TA*hi* releases following the reception of digit 1, a ground is applied to the left-hand terminal of double-ringing relay TB*lm* over: back TA*i*3, front TB*w*2 and TB*v*1. Relay TB*lm* is thereby short-circuited and releases.

Through the play of its back-front contacts TB*l*2 and TB*m*2, relay TB*lm* disconnects the calling subscriber from the double-call line in order to connect him again to the outside line; the local selection-chain used for the double call is thereby released. Due to the re-closing of back TB*l*4, the outside line is again looped to self-inductance TA*xy* over a circuit already described; at TB*m*1, guard resistance TR12, which has become useless, is switched out; at TB*m*4, relay TB*lm* opens the circuit of relay TB*no*, which releases. At TB*l*1, relay TB*lm* opens the holding circuits of relays TB*v* and TB*w*, which release.

Relay B*no* opens at TB*n*3 one of the holding circuits of relay DA*lm*.

When the local selection-chain is released, the ground is removed from wire T of the double-call line and relay DA*jk* releases. At DA*j*2, relay DA*jk* opens the holding circuit of relay DA*fg*, which releases in turn; over its front DA*k*2, it opens the last holding circuit of relay DA*lm*, which likewise releases.

The various relays of outside equipment T are again in the positions they were during the connection to the outside line, relays TA*de*, TA*no*, TA*jk*, TB*u* alone being energized. The calling subscriber can then resume his outside call.

When that call ends, the calling subscriber hangs up, this causing the release of supply relay TA*de*. Relay TA*no*, short-circuited for a long period at TA*e*1, releases and controls the various operations involved in the release. Over its front TA*o*1, relay TA*no* opens the circuit of relay TA*jk*, which releases with a certain delay; over its front TA*n*2, it opens the holding circuit of connection magnet VV1, which releases; over its front TA*o*3, it opens the loop of the outside line, this releasing said line.

Connection magnet VV1 causes the opening of the various contacts *va*, *vb*, *vt* and *vt*1 of outside finder V1.

General holding relay TA*jk* causes at TA*j*1 the release of TB*u*; at TA*k*4 it causes the turning off of the director-station's busy lamp LO.

Outside equipment T is fully released and ready to be used for the routing of a new call.

It will be noted that a subscriber connected to the outside system can hang up at any time; his doing so will not affect outside equipment T.

The case will now be discussed where a calling subscriber, after having been connected to some other inside subscriber through double call, desires to transfer an outside call to such other subscriber. For that purpose, he first asks the called subscriber to hold on and then hangs up without doing anything else. Relay TA*de*, having its circuit opened by the loop of the calling-subscriber's station, releases; over its back TA*e*1, it causes the energization of relay TA*hi* as already described and short-circuits for a long period relay TA*no*, which releases with a certain delay; over its back TA*e*3, it energizes relay TB*v* over a circuit already described.

Relay A*no* causes at TA*n*2 the release of connection magnet VV1; at TA*n*3, it completes the following circuit: ground, back TA*n*3, front TB*n*5, DA*j*1, DA*i*1, relay DA*de* energized, back DA*d*4, NA*e*1, DA*d*2, DA*d*2 in the other double-call equipment D, resistance NR2, battery. The preceding circuit is completed only if the contact NA*e*1 included in the director marker is closed, that is, only if said marker is available and if the contact DA*d*2 of the other double-call line D is also closed, that is, if no other double-call line is already connected or in the process of being connected to the director marker. Relay TA*no* opens over its front TA*o*1 the energizing circuit of relay TA *jk*; over its back TA*o*1, it completes the following holding circuit for said relay TA*jk*: battery, resistance TR7, relay TA*jk*, back TA*o*1, front TB*m*5, ground.

Thermal relay TTH1 is shunted to the preceding circuit over back TA*o*4. At TA*o*2, relay TA*no* opens the circuit of relay TA*hi*, which releases.

Connection magnet VV1 having released, the various contacts *va*, *vb*, *vt*, *vt*1 return to normal also and outside finder V1 is disconnected from the calling subscriber.

Relay DA*de* causes double-call line D to be connected to director marker N. Over its front DA*d*1, it completes a holding circuit for itself; at DA*d*3, it prepares a re-energizing circuit for one of the two connection magnets VV1 or VV2; over its back DA*e*1, it opens one of the holding circuits of relay DA*lm*, which nevertheless holds over the two front contacts DA/3 and TB*n*3; over its front DA*e*2, it prepares an energizing circuit for relay DA*x*; over its front DA*e*3, it causes the energization of the director-marker's seizure relay over the following circuit: ground, front DA*e*3, wire P, cables 248, 207, 5, wire P (FIGS. 16 and 17), back NA*d*1, right-hand winding of the director-marker's relay NA*de*, battery; over its front DA*e*4, it causes the marking of the double-call called subscriber on the banks of outside finder V, the following circuit being completed: ground, front DA*e*4, DA*h*2, DA*f*2, wire C, cables 207, 5 and 42 (FIG. 2), wire C, contact *cc* of finder C in the position corresponding to the double-call line, front CVA6, wire C, back AB*d*1, front AA*f*4, AA*i*4, back AB*h*1, AB*i*2, front SVS6, contact *sc* of fifties selector S, wire C, contact *lc* of final selector L, wire C, cables 112, 5 and 6 (FIG. 11), connection *y* characterizing an extension resistance VR2 and pilot relay allotted to the group of the subscriber connected via double call. That pilot relay energizes.

That pilot relay causes in the equipment of the frame of outside finders V the rest of the operations already described, which end in the energization of one of the two relays, V*q* or *Vr*, characterizing the fifties comprising the subscriber connected by double call and the energization of a selection magnet and of a switching magnet characterizing said subscriber's rank in that fifties. It will be assumed by way of example that this subscriber is the last in the fourth group of the first fifties; under these conditions, relay V*q* is energized, as well as the two selection magnets V13H and V14H.

In director marker N, seizure relay NA*de* energizes, this having the effect of opening back contact NA*e*1 and hence of preventing the seizure of the marker by another equipment. By this means, crosses are prevented and hence the wrong connections that could result from the simultaneous marking of two or more subscribers on the banks of outside finder V.

The connection magnet VV1 (FIG. 11) of the finder V1 associated with the outside equipment T involved re-energizes over the following circuit: battery, lower winding of magnet VV1, front V*q*2, wire 201, cable 202, wire 201, front TB*o*5, DA*d*3, ground. Magnet VV1 causes outside finder V1 to be connected to the subscriber to be transferred, contacts *va*, *vb*, *vt*, *vt*1 being then closed. Owing to this, supply relay TA*de* energizes through said subscriber's loop over a circuit already described; a free ground is applied to that subscriber's wire T, the effect of this being to release the selection chain used for the double call. Connection magnet VV1 prepares a holding circuit for itself at VV1/1.

Supply relay TA*de* causes at TA*e*1 the re-energization of relay TA*no*; through the opening of its back TA*e*3, it ends the pulse sent to counting relays TB*v*, TB*w*; relay TB*v* holds and relay TB*w* energizes over a circuit already described.

Relay TA*no* completes at TA*n*2 the holding circuit already described for connection magnet VV1; at TA*n*3, it opens the circuit of the marker's connecting relay DA*de*, which releases; over its front TA*o*1, it allows relay TA*jk* to hold over its original energizing circuit; over its back TA*o*4, it opens the circuit of thermal relay TTH1, which has not had time to operate.

Relay TB*w* short-circuits at TB*w*2 double-call control relay TB*lm*, which releases with a certain delay.

Relay DA*de* opens at DA*e*3 the circuit of relay NA*de* of the director marker, which again becomes available; at DA*e*4, it opens the circuit of the pilot relay used to mark the subscriber to be transferred on the banks of outside finder V. Owing to this, all the relays and magnets of the frame of finders V return to normal, except for connection magnet VV1.

Relay TB*lm* upon releasing opens at TB*l*1 the circuit of the two relays TB*v* and TB*w*, which release in turn; through the play of its two front contacts TB*l*2 and TB*m*2, it disconnects the subscriber from the double-call line in order to connect him to the outside line, the transfer being thus effected; over its back TB*m*4, it again loops the outside line to self-inductance TA*xy*; at TB*m*1, it switches out guard resistance TR12, which has become useless; at TB*m*4, it causes the release of relay TB*no* and hence the release of double-call line D as will subsequently be described.

From the foregoing descriptions it follows that a subscriber connected by double call has taken the place of the calling subscriber on the banks of finders V. The various relays of outside equipment T are respectively in the normal position in which they must be during an outside call. The transferred subscriber therefore finds himself exactly in the same condition as the calling subscriber; he can therefore in turn make a double call, resume the outside call or transfer it to a third subscriber. One and the same outside call can thus be transferred in succession to all the extensions comprised in the system.

When an inside subscriber is connected to the outside system, he can, if he so desires, ring the director-station's operator by dialing a suitable number, assumed in the example described to be the digit 0.

The first two pulses are received at outside equipment T in accordance with a method already described; the first pulse energizes the two relays TB*v* and TB*w*; the second pulse causes the energization of relay TA*w* and the homing of the two relays TB*v* and TB*w*. At the beginning of the third dialing pulse, contact TA*e*3 closes and the following circuit is completed: ground, front TA*j*1, TB*u*4, back TB*t*7, wire 205, back TA*e*3, TB*m*3, TB*w*1, front TA*w*1, back TB*m*6, relay TB*rs* energized, resistance TR6, battery.

Figure 14:
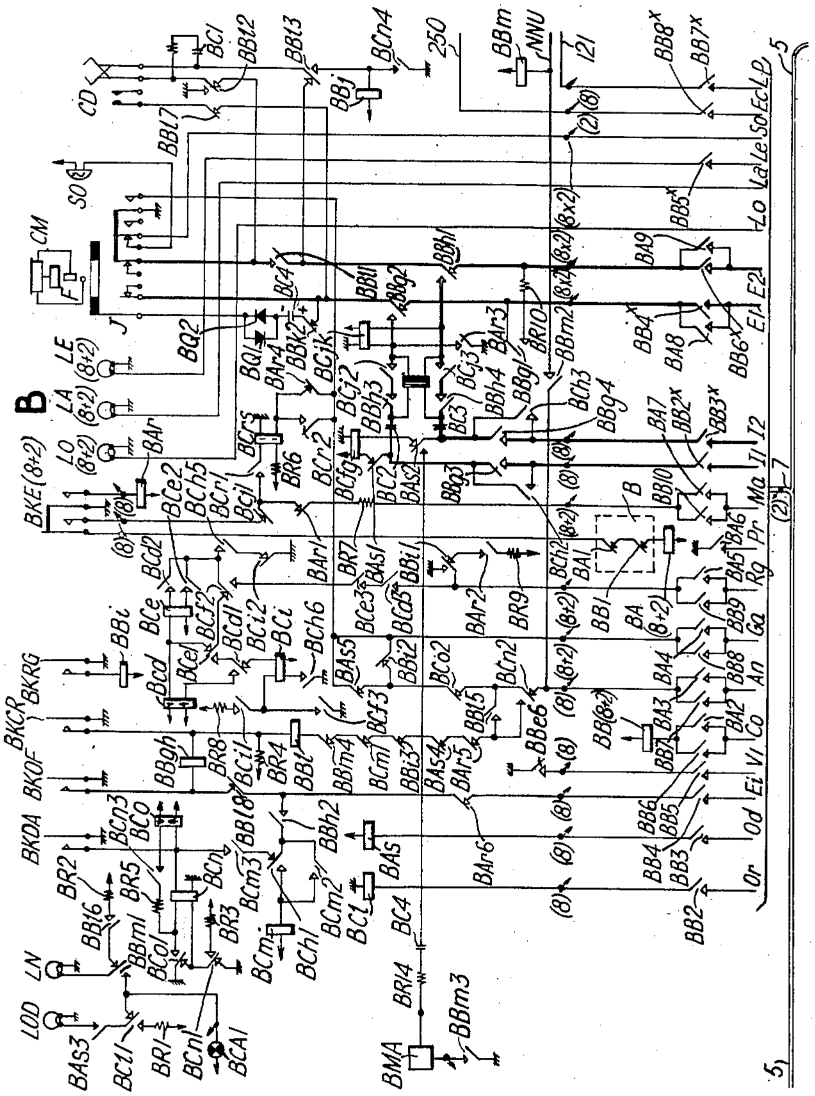
FIG. 14 is a circuit diagram of a director station.
Figure 15:
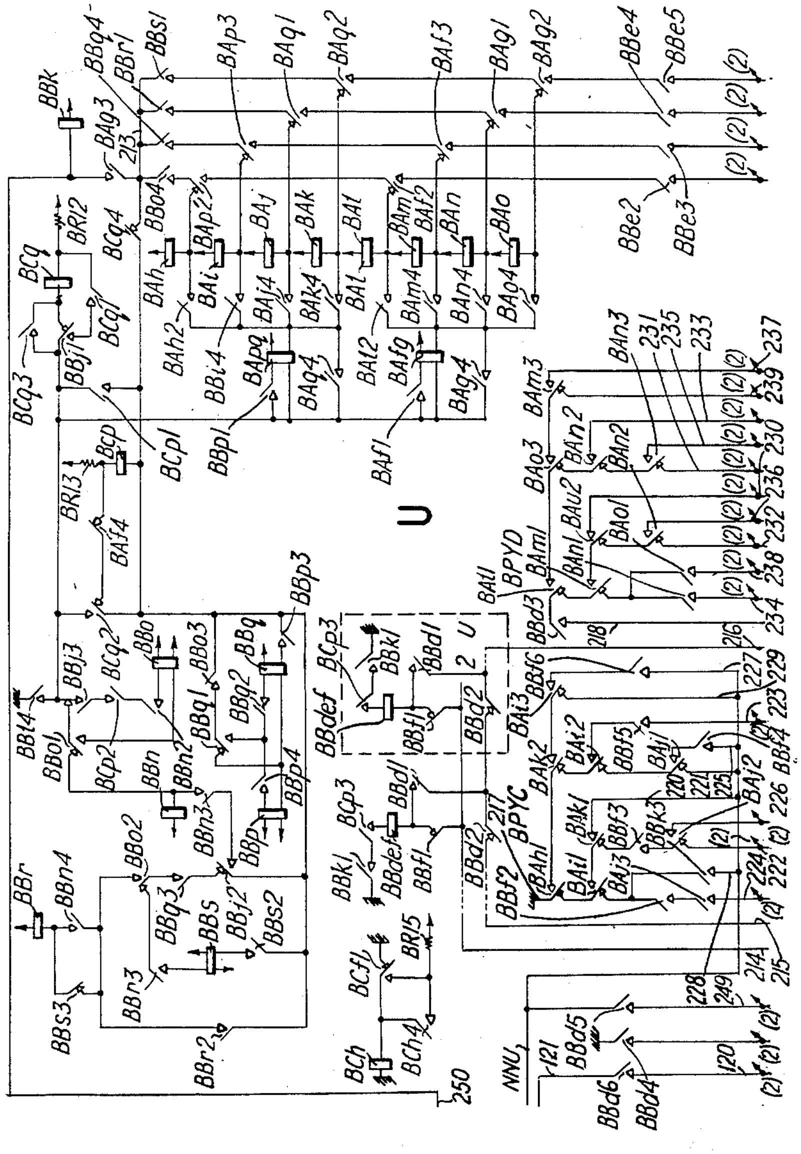
FIG. 15 is a circuit diagram of a receiver associated with the director station of FIG. 14.

Relay TB*rs* opens at TB*r*1 the circuit of the upper winding of relay TA*w*, said relay holding immediately through its lower winding over front TA*w*2 and TA*i*3; over its front TB*r*2, relay TB*rs* prepares the circuit whereby equipment T is seized by the director-station's operator; over its front TB*r*3, it completes the following circuit: battery, relay TB*xy*, which energizes with a certain relay, back TA*l*1, front TB*r*3, resistance TR2, wire T2, cable 203, wire T2, front VV1/2, ground; at TB*r*4, it causes the starting of ringing machine WMA so as to prepare the operation of the director-station's ringer; at TB*r*5, it causes the operation of the director-station's ringer over the following circuit: ground, ringing-current generator Ge, front TB*r*5, back HA*m*3, wire S*o*, cable 7, cable 5 across FIGS. 12, 13 and 14, wire S*o*, back contact associated with the director-station's jack J, ringer SO, battery; over its front TB*r*6, it causes the sending of the ringing tone to the calling subscriber over the following circuit: ringing machine TMA, condenser TC4, front TB*r*6, back TA*s*7, loop of the calling subscriber over a circuit already described, back TA*r*5, right-hand winding of relay TA*de*, battery; at TB*r*7, it prevents any re-energization of relay TB*lm* after the reclosing of back TA*i*3, that is, at the end of the pulse train; at TB*s*2, it causes the lighting up of the director-station's ringing lamp over the following circuit: battery, front TA*n*1, TB*s*2, back TA*g*1, wire L*a*, cable 7, cable 5 across FIGS. 12, 13 and 14, cable 7, wire La, ringing lamp LA, ground; at TBs4, it completes the following holding circuit for itself; ground, front TAj1, TBu4, back TBt7, wire 205, front TBs4, back TAs6, relay TBrs, resistance TR6, battery; at TBs5, it short-circuits the two wires of the outside line in order to prevent the outside subscriber from hearing the double-ringing tone.

Slow-acting relay TBxy completes a holding circuit for itself at TBs1; over its front TBx2, it prepares in the director station the energization of a relay characterizing listening in at an inside station; at TBx3, it holds the ground on the calling-subscriber's test wire T, this ground to be removed subsequently at TAs2.

When the third dialing-pulse ends, relay TAde reenergizes and contact TAe3 opens, but relay TBrs holds over the circuit already described.

The reception of the next pulses will have no effect upon outside equipment T.

When the pulse train has ended, relay TAhi releases and opens at TAi3 the holding circuit of relay TAw, which releases in turn.

The operator, hearing ringer SO ring and seeing ringing lamp LA light up, first inserts the plug F of her handset CM in jack J and then operates the listing key BKE corresponding to the ringing lamp lighted. One listening key BKE of the "restoring" type and one set of three lamps, namely, one ringing lamp LA, one listening lamp LE and one busy lamp LO, have been provided at the director station for each outside line.

In the foregoing description it has been assumed that plug F was not inserted in jack J; had it been otherwise, pilot ringer SO, having its circuit opened over a side contact of jack J, would not have operated.

When the operator plugs in, pilot ringer SO stops, if it is operating, and the following circuit is completed: ground, side contact of jack J, back BAr4, lower winding of relay BCrs, resistance RB6, battery. Relay BCrs energizes. At BCr2, it completes a holding circuit for itself; at BCr1, it prepares the circuit of its opposite winding.

When the operator depresses her listening key BKE, the following two circuits are completed simultaneously:

(1) Ground, upper winding of relay BC, front BCr1, back BCj1, contact of listening key BKE, back BA1, BB1, relay BA individual to the outside equipment T involved, battery.

(2) Battery relay BAr, front contact of listening key BKE, ground.

Of course, the two circuits described above are multiplied to all the listening keys BKE of the position. The two relays BA and BAr energize. Relay BCrs holds also, the flux of its lower winding prevailing.

Relay BA controls the connection of director station B to outside equipment T over its various front contacts BA2 to BA9.

At TBA6, relay BA completes the following circuit: ground, front BA6, wire Pr, cables 7 and 5 across FIGS. 14, 13 and 12, cable 7, wire Pr, front TBr2, left-hand winding of relay TBdef, battery.

The energization of relay TBdef marks the seizure of outside equipment T by the operator. Over its front TBd3, it prepares a holding circuit for itself; over its front TBd1, it prepares a steady-lighting circuit for the director-station's listening lamp; through the play of its front-back contact TBd4, it opens the holding circuit of connection magnet VV1 of outside finder V1 in order to replace it with the following holding circuit: battery, series windings of magnet VV1, front VV1/1, wire 204, cable 202, wire 204, front TBd4, wire An, cable 7, cable 5 across FIGS. 12, 13 and 14, front BA3, back BCn2, BCo2, back BAs5 and BBi2 in parallel, side contact of jack J, ground; over its back TBe1 (FIG. 12), it removes from the calling-subscriber's test wire T1 the battery polarity marking the outside line busy; over its front TBe2, it prepares in the director station the circuit of a relay indicating listening in at an inside station; over its front TBe4 and TBf3, it prepares the talking circuit between the calling subscriber and the operator; over its front TBf2, it completes the following circuit: battery, resistance BR9 (FIG. 14), front BAr2, back BBi1, front BA5, wire Rg, cable 7, cable 5 across FIGS. 13 and 12, cable 7, wire Rg, front TBf2, relay TArs energized, wire Ga, cable 7, cable 5 across FIGS. 13 and 14, cable 7, wire Ga, front BA4, side contact of jack J, ground.

In outside equipment T, relay TArs completes a holding circuit for itself over its front TAs3, resistance TR4 and battery; at TAr2, it prepares the steady lighting of the director-station's listening lamp; at TAr3, it completes a holding circuit for relay TBdef; at TAr5 and TAs7, it makes a break in the line wires of equipment T in order to eliminate the sending of the ringing tone to the calling subscriber and to prevent the conversation between the calling subscriber and the operator from being heard by the subscriber served by the outside system; at TAs4, it prepares a holding circuit for relay TBdef; at TAs5, it completes the following circuit: ground, front TAs5, wire Co, cable 7, cable 5 across FIGS. 13 and 14, cable 7, front BA2, relay BB energized, battery; over its back TAs6 (FIG. 12), it opens the holding circuit of relay TBrs, which releases.

The calling-subscriber's supply relay TAde, having its circuit opened at TAs7 and TAr5, holds over the following circuit: ground, left-hand winding of relay TAde, front TBf1, wire E1, cable 7, cable 5 across FIGS. 13 and 14, cable 7, wire E1, front BB'4 and BBg1, guard resistance BR10, front BB'6, wire E2, cable 7, cable 5 across FIGS. 13 and 12, cable 7, wire E2, front TBf5, TAr1, right-hand winding of relay TAde, battery.

Relay TBrs upon energizing causes at TBs2 the director-stations ringing lamp to be turned off; at TBs5, it removes the short-circuit from the two line wires.

The relay BB individual to the outside equipment T involved (FIG. 14) establishes the continuity of the various connecting wires between director station B and outside equipment T over its front contacts BB2 to BB10 and BB2' to BB8'.

At BB6, it completes a holding circuit for itself; at BB5', it causes the steady lighting of listening lamp LE over the following circuit: ground, listening lamp LE, front BB5', wire Le, cable 7, cable 5 across FIGS. 13 and 12, cable 7, wire Le, front TAr2 and TBd1, battery.

As has been indicated, listening key BKE is a key of the "restoring" type. When the operator releases this key, the circuits of relays BAr, BCrs and BA are opened; relays BA and BAr release, but the upper-winding circuit of relay BCrs is held closed as follows: ground, upper winding of relay BCrs, front BCr1, back BAr1, resistance BR7, front BB10, wire Ma, cable 7, cable 5 across FIGS. 13 and 12, cable 7, front TAs and TBd3, right-hand winding of relay TBdef, battery. The various circuit components described above are so designed that the flux produced by the lower winding of relay BCrs will prevail, said relay always holding.

Relay BAr upon releasing completes the following circuit at BAr6: battery, resistance BR4, relay BBgh energized, back BB18 and BAr6, front BB4, wire Ei, cables 7, 5 and 7, wire Ei, front TBx2, back TAp5, front TBe2, wire T2, cable 203, wire 72, front VV1/2, ground.

The release of relay BA (FIG. 14) produces no effect, because its various front contacts previously used, BA2, BA3, BA4, BA5, BA7, are duplicated respectively by closed contacts BB6, BB7, BB8, BB9, BB10; contact BA6 makes a break in wire Pr, but relay TBdef of outside equipment T holds through its right-hand winding as previously described.

Relay BBgh (FIG. 14) controls the various operations involved in the operator's listening in on the calling subscriber. Said operator's set is supplied over the following circuit: ground, left-hand winding of relay BC*jk*, front BB*g*2, tip of jack J, tip of plug F, operator's handset CM, ring of plug F, ring of jack J, back BB*l*2, contact of dial CD, back BB*l*3, front BB*h*1, right-hand winding of relay BC*jk*, battery. Relay BC*jk* pulls up.

The calling subscriber is supplied over the following circuit: battery, left-hand winding of relay BC*fg* energized, back BA*s*1, front BB*g*3, BB'2, wire I1, cables 7, 5 and 7, wire I1, front TB*e*4, back TA*q*1, calling-subscriber's loop over a circuit already described, back TA*q*2, front TB*f*3, wire I2, cables 7, 5 and 7, wire I2, front BB3', BB*g*4, back BA*s*2, right-hand winding of relay BC*fg*, ground. Relay BB*gh* prepares the talking circuit between the calling subscriber and the operator over its various front contacts BB*g*2, BB*h*3, BB*g*3, BB*h*1, BB*h*4; at BB*h*2, it prepares an energizing circuit for relay BC*m*.

Relay BC*jk* being energized, the calling subscriber finds himself connected to the operator over the following circuit: operator's handset CM, tips of plug F and of jack J, front BB*g*2, BC*j*2, BB*h*3, condenser BC2, front BB*g*3, BB2', wire I1, cables 7, 5 and 7, wire I1, front TB*e*4, back TA*q*1, calling-subscriber's loop over a circuit already described, back TA*q*2, front TB*f*3, wire I2, cables 7, 5 and 7, wire I2, front BB3', BB*g*4, condenser BC3, front BB*h*4, BC*j*3, BB*h*1, back BB*l*3, contact of dial CD, back BB*l*2, rings of jack J and of plug F.

The calling-subscriber's supply relay BC*fg* causes over its front BC*f*1 the energization of relay BC*h* across resistance BR15.

Relay BC*h* completes the following circuit over its front BC*h*1: battery, winding of relay BC*m* energized, front BC*h*1, BB*h*2, back BA*r*6, front BB4, wire E*i*, ground over a circuit already described. At BC*h*2 and BC*h*3, relay BC*h* provides for the holding of the talking circuit between the calling subscriber and the operator independently of contacts BB*g*3 and BB*g*4; at BC*h*4, relay BC*h* completes a holding circuit for itself; at BC*h*5, it prepares the reception of the digit 1, chosen for returning the calling subscriber to the outside line; at BC*h*6, it prepares a holding circuit for the left-hand winding of relay BC*i*.

When the connection between the calling subscriber and the operator has ended, said subscriber can either resume the outside call or transfer the outside call to the operator.

First the case will be discussed where the calling subscriber desires to resume the outside call. For that purpose, he dials the digit 1. At the beginning of the dialing pulse, supply relay BC*fg*, having its circuit opened over the station's loop, releases. Over its back BC*f*2, it completes the following circuit: ground, back BC*i*2, front BC*h*5, back BC*f*2 and BC*e*1, upper winding of relay BC*d*, battery.

Relay BC*d* prepares at BC*d*2 a holding circuit for itself, as also an energizing circuit for relay BC*e*; at BC*d*3, it prepares the guard-removal circuit and hence the various operations that end in the switching out of the director station.

Relay BC*fg* re-energizes at the end of the pulse. Over its back BC*f*2, it opens the energizing circuit of relay BC*d*; this latter holds and relay BC*e* energizes over the following circuit: battery, upper windings of relays BC*d* and BC*e*, front BC*d*2 and BC*h*5, back BC*i*2, ground. Over its front BC*f*2, relay BC*fg* prepares the guard-removal circuit.

Relay BC*h* has been fully short-circuited for a moment over its back BC*f*1; but, being slow-releasing due to said short-circuit, it holds in operating position.

Relay BC*e* completes the following holding circuit for itself at BC*e*2: battery, lower winding of relay BC*e*, front BC*e*2 and BC*h*5, back BC*i*2, ground; over its front BC*e*3, it grounds wire R*g* over the following circuit: ground, back BC*i*2, front BC*h*5, BC*f*2, BC*e*3, BC*d*3, BB9, wire R*g*, cables 7, 5 and 7, wire R*g*. The two wires G*a* and R*g* of the outside equipment being grounded, guard relay TA*rs* finds itself short-circuited and releases with a certain delay.

Relay TA*rs* upon releasing causes at TA*r*2 the turning off of the director-station's listening lamp; at TA*s*4, it opens the holding circuit of relay TB*def*, which releases in turn; it also opens the circuit of the upper winding of the director-station's relay BC*rs*, which continues to hold over its lower winding; at TA*s*5, it removes the ground from wire C*o*, thereby causing the homing of the director-station's connection relay BB.

Relay TB*def* upon releasing places the holding of connection magnet VV1 under the control of front contact TA*n*2, that is, of the calling subscriber; over its back TB*e*1, it causes the busy polarity to be restored on the calling-subscriber's test wire T1; over its front TB*e*2, it eliminates the grounding of wire E*i*, this causing the release of relays BC*m* and BB*gh* in director station B; at TB*e*4 and TB*f*3 (FIG. 12), it opens the talking circuit between the calling subscriber and the operator, as also the circuit of supply relay BC*fg*.

The release of the equipment of director station B, which had been started by the release of relays BB, BB*gh*, BC*fg* and BC*m*, is completed as follows. Relay BC*jk* releases, having its circuit opened at BB*g*2 and BB*h*1. Relay BC*d* releases, the circuit of its opposite winding being completed as follows: battery, lower winding of BC*d*, front BC*d*1 and BC*e*1, back BC*f*2, front BC*h*5, back BC*i*2, ground. The ground used to release relay BC*d* thereupon, over back BC*d*1, energizes relay BC*i*, which holds through its left-hand winding over BC*h*6, BC*i*1, resistance BR8 and battery. Relay BC*e* releases, having its holding circuit opened at BC*i*2. Relay BC*h* releases, after being short-circuited for a long period over back BC*f*1, and at BC*h*6 opens the holding circuit of relay BC*i*, which releases in turn.

All the director-station's relays have homed, except for relay BC*rs*, which always holds over the following circuit: battery, resistance BR6, lower winding of BC*rs*, front BC*r*2 and back BA*r*4 in parallel, side contact of jack J, ground. When the operator pulls out her plug, this side contact is opened and relay BC*rs* releases.

The various relays of outside equipment T are then back in the respective positions in which they must be during an outside call (with the sole difference that relay TB*xy* is energized, but this is unimportant for any double-calls and transfers made subsequently).

If the calling subscriber, after having been connected to the operator via double call, desires to transfer the outside call to her, he merely hangs up, this causing the release of relay BC*fg* in the director station. This relay short-circuits for a long period, over its back BC*f*1, relay BC*h*, which in turn releases with a slight delay; over its back BC*f*2, it causes the sending of a pulse to the upper winding of relay BC*d* over a circuit already described, this causing the energization of said relay but producing no other result.

Relay BC*h* upon releasing completes the following circuit over its back BC*h*1: battery, lower winding of relay BC*o* energized, front BC*m*3, back BC*h*1, front BB*h*2, back BA*r*6, front BB4, wire E*i* grounded as already described; at BC*h*5, it opens the circuit of relay BC*d*, which releases.

Relay BC*o*, over its front BC*o*1, prepares a holding circuit for itself, as well as an energizing circuit for relay BC*n*.

To resume the outside call, the operator depresses restoring key BKCR, this causing the release of relay BB*gh*. At BB*g*1, relay BB*gh* switches out guard resistance BR10, which has become useless; over its front BB*g*2 and BB*h*1, it opens the circuit of supply relay BC*jk*, which releases; over its back BB*g*2 and BB*h*1, it loops supply relay TA*de* of outside equipment T over the following circuit: ground, left-hand winding of relay TA*de* holding, front TB*f*1, wire E1, cables 7, 5 and 7, wire E1, front BB4', back BB*g*2, tip of jack J, tip of plug F, director-station's handset CM, ring of plug F, ring of jack J, back BB*l*2, dial CD, back BB*l*3, BB*h*1, front BB6', wire E2, cables 7, 5 and 7, wire E2, front TB*f*5, TA*r*1, right-hand winding of relay TA*de*, battery. At BB*h*2, it removes the ground applied to the left-hand terminal of the lower winding of relay BC*o*; this latter holds and relay BC*n* energizes over the following circuit: battery, lower winding of relay BC*o*, upper winding of relay BC*n*, front BC*o*1, ground. Relay BC*m* releases, having its circuit opened at BB*h*2.

Relay BC*n* upon energizing completes a holding circuit for itself over its front contact BC*n*1, resistance BR4 and battery; over its back contact BC*n*2, it opens the holding circuit of the outside-finder's connection magnet VV1, which releases; over its front BC*n*2, it prepares the operation of relay BB*l*; over its front BC*n*3, it completes the following circuit: battery, upper winding of relay BC*o*, front BC*n*3, resistance BR5, front BC*o*1, ground. The fluxes produced by the two windings of relay BC*o* being equal and of opposite sign, said relay releases.

Relay BC*o* upon releasing short-circuits over its back BC*o*1 the holding winding of relay BC*n*, which releases after a moment.

In the equipment of outside finder V1 (FIG. 11) magnet VV1 opens at VV1/2 the holding circuit of relay TB*xy*, which releases after a moment.

The operator is then connected to the outside line over the following circuit: wire A of outside line LR, back TB*j*1, TB*l*2, front TA*o*3, back TA*i*5, TA*w*5, condenser TC1, front TB*f*1 and director-station's loop over a circuit already described, front TB*f*5, TA*r*1, condenser TC2, back TA*w*6, TA*i*1, TB*m*2, front TA*k*3, back TB*j*2, wire B of outside line LR.

The various operations involved in transferring the outside call to the director station have ended.

The method will now be described of routing an incoming call to an inside station of the system. The ringing A.C. from the otuside line is received at equipment T (FIG. 12) over the following circuit: wire A of outside line LR, back TB*j*1, TB*l*2, condenser TC3, back TA*k*1, rectifier bridge TQ5, back TB*j*2, wire B of outside line LR. The relay TA*l* associated with rectifier bridge TQ5 energizes. At TA*l*3 it completes the following circuit: ground, back TA*j*1, winding in series of slow-acting relay TA*g*, which energizes after a moment, front TA*l*3, back WB*p*1, resistance WR9, battery.

It will be noted that when outside equipment T is seized by an inside station, relay TA*jk* is energized, back TA*j*1 is open, the circuit previously described cannot be completed and the rest of the operations cannot take place. The reception of an outside call produces no effect upon a busy equipment T.

Relay TA*g* causes over its front TA*g*1 the lighting up of the director-station's ringing lamp, the following circuit being completed: battery, front TA*g*1, wire L*a*, cables 7, 5 and 7, wire L*a*, ringing lamp LA individual to the outside equipment involved, ground; through the opening of its back TA*g*2, it prevents the operation of relay TA*v* and hence the direct seizure of the outside equipment involved; over its front TA*g*3, it causes the energization of relay TB*u*; at TA*g*4, it completes a holding circuit for itself; at TA*g*5, it causes the starting of ringing machine WMA; at TA*g*6, it completes the following circuit: ground, upper winding of relay WB*q*, front TA*g*6, resistance WR1, battery.

The relay WB*q* energized forms part of an equipment W included in a dash-dot rectangle and common to all the outside equipments T. At WB*q*1, relay WB*q* removes the short-circuit from the upper winding of relay WB*p*, to prevent slowing down this relay; at WB*q*2, it prepares an energizing circuit for said relay WB*p*; at WB*q*3, it causes the operation of the director-station's ringer over the following circuit: ground, ringing-current generator G*e*, front WB*q*3, back NB*f*1, HA*m*3, wire S*o*, cables 7, 5 and 7, wire S*o*, back contact of jack J, ringer SO, battery. Of course, the ringer operates only if plug F is not inserted in jack J; otherwise, the operator merely is alerted by the lighting up of ringing lamp LA. Relay WP*q* completes a holding circuit for relay TA*g* at WB*q*4.

Generally, the ringing current coming from the outside system is a rhythmical current. Receiving relay TA*l* follows this rhythm, but relays TA*g*, WB*q* and TB*u*, which have registered the call, hold constantly operated even during the periods of interruption of the ringing current.

The operator, hearing ringer SO ring and seeing ringing lamp LA light up, inserts plug F of her handset CM in jack J and then momentarily depresses the listening key BKE associated with the ringing lamp LA involved. As has been indicated, listening key BKE is a key of the "restoring" type.

When the operator plugs into jack J, ringer SO stops and the following circuit is completed: ground, side contact of jack J, back BA*r*4, lower winding of relay BC*rs* energized, resistance BR6, battery. At BC*r*1, relay BC*rs* prepares the circuit of its opposite winding; at BC*r*2, it completes a holding circuit for itself.

When the operator depresses listening key BKE, the following two circuits are completed:

(1) Ground, upper winding of relay BC*rs*, front BC*r*1, back BC*j*1, front contact of listening key BKE, back contacts BA1 and BB1 included in the second director station, relay BA energized, battery;

(2) Battery, relay BA*r* energized, front contact of listening key BKE, ground.

The fluxes produced by the two windings of relay BC*rs* are of opposite sign, but the flux of the lower winding prevails and said relay holds.

Relay BA*r* prepares at BA*r*2 the circuit of guard relay TA*rs* in outside equipment T; at BA*r*4, it opens one of the two circuits of the lower winding of relay BC*rs*, so as to place the holding of said relay solely under the control of contact BC*r*2.

Relay BA controls the various operations involved in connecting the outside equipment to the director station that has answered. Over its various front contacts BA2 to BA9, it establishes the continuity of the various connecting wires between the outside equipment and the director station. At BA6, it completes the following circuit: ground, front BA6, wire P*r*, cables 7, 5 and 7, wire P*r*, back TA*j*4, left-hand winding of relay TB*def* energized battery.

In outside equipment T, relay TB*def* prepares at TB*d*1 the steady lighting of the listening lamp at the director station; at TB*d*3, it prepares a holding circuit for itself; at TB*d*4, it prepares a holding circuit for one of the connection magnets, VV1 or VV2, of outside finders V, which will be used in ringing the wanted inside station; at TB*e*1, it prepares the wanted inside-station's test circuit; at TB*e*2, it prepares the operation of the relay BB*gh* marking at the director station the condition of listening in on an inside station; at TB*e*3, it prepares an energizing circuit for one of the connection magnets, VV1 or VV2, of outside finders V; at TB*e*4 and TB*f*3, it prepares the connection of the operator to the wanted inside station; at TB*f*1 and TB*f*5, it prepares the connection of the operator to the calling outside line; over its front TB*f*2, it completes the following circuit: ground, side contact of jack J (FIG. 14), front BA4, wire G*a*, cables 7, 5 and 7, wire G*a*, guard relay TA*rs* energized, front TB*f*2, wire R*g*, cables 7, 5 and 7, wire R*g*, front BA5, back BB*i*1, front BA*r*2, resistance BR9, battery.

Relay TA*rs* allows at TA*r*1 the supplying of the operator's station over the following circuit: ground, left-hand winding of relay TA*de* energized, front TB*f*1, wire E1, cables 7, 5 and 7, wire E1, front BA8, back BB*g*2, tip of jack J, tip of plug F, handset CM, ring of plug F, ring of jack J, back BB*l*2, contact of dial CD, back BB*l*3, BB*h*1, front BA9, wire E2, cables 7, 5 and 7, wire E2, front TB*f*5, TA*r*1, right-hand winding of relay TA*de*, battery. Relay TA*rs* prepares at TA*r*2 the steady lighting of the director-station's listening lamp; at TA*r*3, it completes a holding circuit for relay TB*def*; at TA*s*2, it removes the short-circuit of relay TA*f* in order to prepare the called inside-station's test; at TA*s*3, it prepares a holding circuit for relay TB*def*; at TA*s*5, it completes the following circuit: ground, front TA*s*5, wire C*o*, cables 7, 5 and 7, wire C*o*, front BA2, relay BB energized, battery.

Relay BB upon energizing establishes or confirms over its various front contacts BB2 to BB10, BB2′, BB8′, the continuity of the various connecting wires between outside equipment T and director station G. At BB6, it completes a holding circuit for itself; at BB5′, it completes the steady-lighting circuit of listening lamp LE: ground, lamp LE, front BB5′, wire L*e*, cables 7, 5 and 7, wire L*e*, front TA*r*2, and TB*d*1, battery.

Supply relay TA*de* completes the following circuit over its front TA*e*1: ground, relay TA*no* energized, front TA*e*1, resistance TR5, battery.

Relay TA*no* completes the circuit of slow-acting relay TA*jk* over its front TA*o*1 and resistance TR7; at TA*o*3, it prepares the talking circuit between the operator and the outside line.

Relay TA*jk* opens at TA*j*1 the circuit of slow-acting relay TA*g*, which releases; over its front TA*j*1, it causes the grounding of general holding wire T*tg*; over its front TA*j*2, it prepares the transfer of the starting polarity to the next outside equipment in the case where a subscriber performs a direct-seizure operation; over its back TA*k*1, it switches out rectifier bridge TQ5, this causing the homing of relay TA*l*; at TA*k*3, it controls the connection of the operator to the calling outside line over the following circuit: wire A of outside line LR, back TB*j*1 and TB*l*2, front TA*o*3, back TA*i*5 and TA*w*5, condenser TC1, front TB*f*1, wire E1, loop of operator's set over a circuit already described, wire E2, front TB*f*5, TA*r*1, condenser TC2, back TA*w*6, TA*i*1, TB*m*2, front TA*k*3, back TB*j*2, wire B of outside line LR. At TA*k*4, relay TA*jk* causes the lighting up of the director-station's busy lamp over the following circuit: battery, resistance TR15, front TA*v*4, wire L*o*, cables 7, 5 and 7, wire L*o*, busy lamp LO individual to the outside line involved, ground.

Relay TA*g* upon releasing causes over its front TA*g*1 the turning off of ringing lamp LA and it re-closes its back TA*g*2, but relay TA*v*, provided to control the starting of the operations involved in direct seizure, continues switched out owing to the opening of back TA*j*2; over its front TA*g* 3, relay TA*g* opens the original energizing circuit of relay TB*u*, this latter holding immediately over the following circuit: battery, right-hand winding of relay TB*u*, front TB*u*2, connection X, back contacts in parallel TB*t*1 and TA*i*2, front TA*j*1, ground; at TA*g*6, it opens the circuit of relay WB*q*, which releases.

When the operator releases listening key BKE, which, as already stated, is of the "restoring" type, the original circuit of the upper winding of relay BC*rs* is opened and relays BA*r* and BA release. At BA*r*1, relay BA*r* completes the following circuit: ground, upper winding of relay BC*rs*, front BC*r*1, back BA*r*1, resistance RB7, front BB10, wire MA, cables 7, 5 and 7, wire MA, front TA*s*4 and TB*d*3, right-hand winding of relay TB*def* holding, battery. The flux produced in the lower winding of relay BC*rs* always prevails and said relay holds.

The release of relay BA produces no effect, because its various front contacts are duplicated by those of relay BB.

The subscriber served by the outside system then tells the operator the inside station with which he wants to be connected. The operator then depresses double-ringing key BKDA, which is of the "restoring" type. Relay BC*o* energizes; over its front BC*o*1, it prepares a holding circuit for itself, as well as an energizing circuit for relay BC*n*.

When the operator releases double-ringing key BKDA, relay BC*o* holds and relay BC*n* energizes over the following circuit: battery, lower winding of relay BC*o*, upper winding of relay BC*n*, front BC*o*1, ground. Over its front BC*n*1, relay BC*n* completes a holding circuit for itself across resistance BR3; over its front BC*n*2, it prepares the energization of relay BB1; over its front BC*n*3, it completes the following circuit: battery, upper winding of relay BC*o*, front BC*n*3, resistance BR5, front BC*o*1, ground. The fluxes produced in the two windings of relay BC*o* being equal and of opposite sign, said relay releases. At BC*n*4, relay BC*n* causes the energization of relay BB*j*.

Relay BC*o* upon releasing opens at BC*o*1 the circuit of its two windings, as also the energizing circuit of BC*n*; the latter, short-circuited over back BC*o*1, releases after a moment; at BC*o*2, it completes as follows the energizing circuit of relay BB*l*1: ground, on side contact of jack J, back BA*s*5 and BB*i*2 in parallel, back BC*o*2, front BC*n*2, back BA*r*, BA*s*4, BB*i*3, BB*m*1, BB*m*4, relay BB*l*, resistance BR4, battery.

Relay BB*l* upon energizing controls the various operations involved in the dialing of the wanted inside station by the operator. Over its contacts BB*l*1, BB*l*2 and BB*l*3, it eliminates dial CD from the talking circuit; over its front contacts BB*l*2, and BB*l*3, it completes the following circuit: battery, relay BB*j* holding, front BB*l*3, dial CD, front BB*l*2, ground; at BB*l*4, it prepares the operation of the various relays of receiver U; at BB*l*5, it completes a holding circuit for itself; at BB*l*6, it causes the steady lighting of lamp LN over the following circuit: ground, lamp LN, back BB*m*1, front BB*l*6, resistance BR2, battery. The operator is thus told that she can begin to dial the wanted inside-station's number.

The operator then dials the wanted inside-station's number, which, as stated, comprises three digits. At the beginning of the first dialing pulse of the first train, relay BB*j* releases, having its circuit opened over the contact of dial CD. Over its back BB*j*1, it completes the following circuit: ground, front BB*l*4, back BB*j*1, relay BC*q* energized, resistance BR12, battery; over its back BB*j*3, it allows the reception of the first pulse at relay BB*n*, the following circuit being completed: ground, front BB*l*4, back BB*j*3, BB*o*1, relay BB*n* energized, battery.

Relay BC*q* completes a holding circuit for itself at BC*q*3; at BC*q*1, it prepares a short-circuit for itself; over its front BC*q*2, it causes the energization of relay BC*p* over the following circuit: ground, front BB*l*4, front BC*q*2, relay BC*p*, resistance BR13, battery.

Relay BC*p* completes the following holding circuit for itself at BC*p*1: ground, front BB*l*4, BC*p*1, relay BC*p*, resistance BR13, battery; at BC*p*2, it prepares the operation of relay BB*o* of the chain of counting relays BB*n* . . . BB*s*.

The pulses of the first train are received in the chain of counting relays BB*n*, BB*o*, BB*p*, BB*q*, BB*r* and BB*s* in accordance with a method already described in connection with the routing of a call between two inside stations.

Relay BC*q* suffers brief short-circuitings over front contacts BB*j*1 and BC*q*1 throughout the reception of the pulse train; but, being made slow-releasing by reason of said short-circuitings, it holds. When the reception of the first pulse train ends, said relay BC*q*, short-circuited for a longer period over front contacts BC*q*1, BB*j*1, BB*l*4, releases. Over its back contact BC*q*2, it short-circuits relay BC*p*, which in turn releases with a certain delay; over its back contact BC*q*4, it causes the grounding of wire 213 over the following circuit: wire 213, back BC*q*4, front BC*p*1, BB*l*4, ground. Because of this, the first digit dialed by the operator is registered in code form in all or part of the four relays BA*h*, BA*i*, BA*j*, BA*k* in accordance with a method already described in connection with the routing of a call between two inside stations.

When relay BC*p* releases, it removes at BC*p*1 the ground from wire 213; in accordance with a method already described, relay BA*pq* energizes in series with the relays that have registered the selective combination and over its various front contacts BA*p*2, BA*p*3, BA*q*1, BA*q*2 prepares the routing of the second digit's selective combination to relays BA*l*, BA*m*, BA*n*, BA*o*.

The second digit dialed by the operator, the tens digit, is received in the chain of counting relays and registered at relays BA*l*, BA*m*, BA*n*, BA*o* in accordance with the same method. When the reception of that digit has ended, relay BA*fg* is energized. Over its various front contacts BA*f*2, BA*f*3, BA*g*1, BA*g*2, it prepares the registering of the units digit in the marker; over its front contact BA*g*3, it prepares the energization of relay BB*k*. After the reception of the second digit, contact BA*f*4 is open, this preventing the short-circuiting of relay BC*p*, which remains pulled up to the end of the operation of the receiver.

The third digit dialed by the operator, the units digit, is received the same way in the chain of counting relays. Wire 213 is grounded immediately, as previously described, this causing the energization of relay BB*k* over front contact BA*g*3. If director marker N is available, that is, if back contact NA*e*1 is closed, the following circuit is completed: ground, front BB*k*1, BC*p*3, relay BB*def* energized, back BB*f*1, wire 214, back NA*e*1, wire 215, back BB*d*2 of the receiver involved, back BB*d*2 of the receiver associated with the other director station (if necessary), wire 216 resistance NR2, battery.

Relay BB*def* controls the various operations involved in the seizure of director marker N. At BB*d*1, it completes a holding circuit for itself; at BB*d*3, it prepares the sending of the tens digit to the director marker; at BB*d*4, it completes the circuit of seizure relay NA*de*, which, being made slow-acting by the short-circuiting of its left-hand winding at NA*d*1, energizes with a certain delay; over its various front contacts BB*e*2 to BB*e*5, it prepares the registering of the third digit in the director marker; at BB*e*6 (FIG. 14), it causes the grounding of wire V1, thus preparing the operation of the connection magnet VV1 of outside finder V; over its various front contacts BB*f*2, BB*f*3, BB*f*4, BB*f*5, BB*f*6, it prepares the sending of the hundreds digit to the marker.

In director marker N, seizure relay NA*de* upon energizing removes at NA*d*1 the short-circuit from its left-hand winding, this making it fast-releasing; over its various front contacts NA*d*2, NA*d*3, NA*d*4 and NA*d*6, it allows sending the hundreds digit to the director marker.

Relays BA*h*, BA*i*, BA*j* and BA*k* comprise a number of contacts arranged in a pyramid BPYC. This pyramid comprises one incoming wire 217 and ten outgoing wires 220 . . . 229, one of these wires and one alone being grounded depending on the hundreds digit received. Wires 222, 223, 224 and 226 correspond respectively to the hundreds 2, 3, 4, and 6; wires 221, 225, 227, 228, 229, and 220 correspond respectively to the hundreds 1, 5, 7, 8, 9 and 0. Wires 222, 223, 224 and 226, corresponding to the hundreds used, are connected respectively to relays NC2, NC3, NC4 and NC6; wires 221, 225, 227, 228, 229 and 220, which correspond to the unused hundreds, are all connected to wire NNU. In the example described, it will be assumed that the hundreds digit dialed by the operator is the digit 2; wire 222 is grounded and the following circuit is completed: wire 222 grounded, front NA*d*3, connection *n*2, relay NC2 energized, battery.

Seizure relay NA*de* opens its back contact NA*e*1 to mark the nonavailability of director marker N; at NA*e*2, it prepares the sending of the tens digit to the director marker; over its front contacts NA*e*3 . . . NA*e*6, it allows registering the units digit at relays NA*n*, NA*o*, NA*t*, NA*q*. This registering is effected in accordance with the same method as for the registering of the hundreds digit at relays BA*h* . . . BA*k* or of the tens digit at relays BA*l* . . . BA*o*.

The energization of relay NC2 characterizes the reception of the hundreds-digit 2. At NC21, relay NC2 completes a holding circuit for seizure relay NA*de*; over its various contacts NC22 . . . NC29, NC20, NC20′, it controls the switching in of relays ND1 . . . ND0, provided to register the tens digit in director marker N. Pyramid BPYD is made up similarly to pyramid BPYC, but with the contacts of the relays VA*l* . . . BA*o* that have registered the tens digit in the receiver. It comprises one incoming wire 218 and ten outgoing wires 231 . . . 230, respectively corresponding to the tens 1 . . . 0. A set of ten tens-registering relays ND1 . . . ND0, respectively connected to contacts NC22 . . . NC29, NC20, NC20′, has been provided for each of hundreds 2, 3 and 4; in order not to complicate the drawing, it shows only the contacts and relays corresponding to the hundreds 2, but actually wires 231 . . . 230 are multipled to sets of contacts similar to NC22 . . . NC29, NC20, NC20′ and belonging to the hundreds 3 and 4.

In the example described it will be assumed that the tens digit is the digit 2; then wire 232 is grounded and the following circuit is completed: wire 232 grounded, front NC24, relay ND2 energized, battery.

It will be assumed also, in order to facilitate the explanations that will follow, that the units digit is the digit 5; then relays NA*n* and NA*p* are energized, relays NA*o* and NA*q* remaining unoperated. These relays complete a holding circuit for seizure relay NA*de* over over their front contacts NA*n*2 and NA*p*4.

Relays NA*n* . . . NA*q*, provided to register the units digit, comprises a certain number of contacts making up pyramid BYPU. The details of this pyramid are not shown, because it is a question of an arrangement that is standard in automatic-telephone practice. This pyramid comprises one incoming wire 240 and ten outgoing wires 241, one of these ten wires and one alone being grounded depending upon the units digit dialed. Each wire 241 is connected to the input of a pyramid BYPD′ made up of contacts of the tens relays ND1 . . . ND0 of hundreds 2. There are three pyramids BYPD′, each made up of contacts of the tens relays of one of the hundreds 2, 3 or 4. Since each pyramid BYPD′ comprises 10 outgoing wires C, a total of 10×10 wires C is obtained for hundreds 2, each wire corresponding to a specific subscriber in said hundreds. Wire 241 being multipled, as shown by the arrow, to the inputs of pyramids similar to BYPD′ and corresponding to hundreds 3 and 4, 3×100=300 wires C are obtained, each characterizing a specific subscriber-line. Out of these wires, those corresponding to extension subscribers have been grouped in cable CNU and are connected to the pilot relays of finders V; those corresponding to grouped-line numbers are contained in cable CLG and are connected to relays XA*d*, XA*e* and XA*f*; finally, those corresponding to unused numbers or to private stations are all multipled to one and the same wire NNU terminating at relay BB*m*. There is no wire C for hundreds 6, and any subscriber in that hundreds sharing his line with a subscriber comprised in hundreds 2.

From the foregoing explanations it will be understood that the wire C corresponding to a subscriber dialed by the operator, and by her alone, will be grounded over contact pyramids BYPD′ and BYPU.

In accordance with a method already described in connection with the direct seizure of the outside system that grounding will cause the energization of one or the other of relays V*g* and V*r*, depending upon the fifties comprising the called subscriber, as well as the energization of one of the selection magnets V1B . . . V13B, V1H . . . V13H and of one of the switching magnets V14B, V14H, depending upon the subscriber's rank in the fifties involved.

The marker's seizure relay NA*de* finds a third holding circuit in the one provided by contacts ND11 . . . ND01, corresponding to the tens-relay energized (ND21, in the example chosen).

It will be assumed that the subscriber dialed by the operator occupies on the banks of outside finders V (FIG. 11) a position corresponding to the first fifties; then relay Vq is energized and the following circuit is completed: battery, lower winding of the connection magnet VV1, front Vq2, wire 201 over cable 202, front TBe3, wire V1, cables 7, 5 and 7, front BB5, BBe6, ground. Magnet VV1 energizes and controls the connection of the finder V1 associated with the outside equipment T involved to the called subscriber. At VV1/1, it completes the following holding circuit for itself: battery, windings in series of VV1, front VV1/1, wire 204 over cable 202, front TBd4, wire An, cables 7, 5 and 7, front BB7, back contacts BCn2, BCo2, BAo5 and BBi2 in parallel, side contact of jack J, ground; at VV1/2, it completes the following circuit: ground, front VV1/2, wire T2 over cable 203, front TBe2, back TAp5 and TBx2, wire Od, cables 7, 5, and 7, front BB3, relay BAs energized, battery.

Relay BAs opens at BAs4 the holding circuit of relay BBl, which releases. Contacts BBl2 and BBl3 return to normal, this causing the release of relay BBj. Contact BBl4 opens, this causing the release of receiver U and of director marker N as will subsequently be described. At BBl6, it turns off dialing lamp LN; at BBl8 it prepares the circuit of relay BBgh.

The release of receiver U, and of director marker N, is effected as follows. Relays BAh, BApq, BBk, BAl, BAfg, NAn and NAp release, having their circuits opened at BBl4. Relay BBdef releases, having its circuit opened at BBk1; relays NC2 and ND2 release also, having their circuits opened in contact pyramids PBYC and PBYD. Finally, seizure relay NAde releases in turn, having its various holding circuits opened at BBd5, NAn2, NAp4, NC21 and ND21.

When the various registering relays of director marker N have returned to normal position, the various control members of frame CAD release as already described.

If the called subscriber is free, his test wire T is connected to battery over his ringing and cut-off relays, the following circuit being then completed: battery, wire T, contact vt of outside finder V1, front VV1/4, wire T, cable 203, wire T, relay TAf energized, ground. Relay TAf completes over its front TAf1 the circuit of relay TApq, which energizes in turn. Back contacts TAf1 of the various outside equipments T are arranged in a chain so that, if more than one outside equipment test at the same instant, only one relay TApq will be able to operate, namely, only the one belonging to the outside equipment T having its contact TAf1 the best placed in the chain. Relay TAl energizes over TAf2.

Relay TApq causes over its front TAp1 the application of a free ground to the called-subscriber's test wire T, the effect of this being to short-circuit relay TAf, which releases slowly, and to control the energization of said subscriber's ringing and cut-off relays. At TAp3, relay TApq completes the following holding circuit for itself: battery, relay TApq, front contact TAp3, back contact TBx6, wire T2 over cable 203, front contact VV1/2, ground; over its front contacts TAq1 and TAq2, it prepares the sending of the ringing current to the called subscriber; at TApq5, it opens the circuit of relay BAs, which releases.

When relay TAf releases, it opens at TAf2 the circuit of relay TAl, which releases in turn.

Relay TAl then controls over its back TA/1 the sending of ringing current to the called subscriber over the following circuit: ground, ringing-current generator Ge, resistance TR3, back TAm1, front TAq2, wire B over cable 203, front VV1/5, contact vb of outside finder V1, wire B, loop of called subscriber over a circuit already described, wire A, front va of outside finder V1, front VV1/6, wire A over cable 203, front TAq1, back TAm2, TAl1, relay TBxy, battery. Relay TBxy being slow-acting, it could not be energized by the ringing A.C. It will be noted that after having tested the called subscriber, the sending of ringing current is held up for a moment by the set of relays TAl and TAf, so as to be sure that said current is sent only after actual operation of the subscriber's ringing and cut-off relays.

The ringing tone is sent to the operator over the following circuit: condenser TC4, front contacts TAq3 and TBf1, wire E1, operator-set's loop over a circuit already described, wire E2, front contacts TBf5 and TAr1, right-hand winding of relay TAde, battery.

When the called subscriber removes his handset, his line wires A and B are looped metallically, relay TBxy being then energized by the D.C. superimposed on the ringing A.C. At TBx1, it completes the following holding circuit for itself: battery, relay TBxy, back TAl1, front TBx1, resistance TR2, wire T2 over cable 203, front VV1/2, ground; over its front TBx2, it prepares the energizing circuit of relay BBgh in the director station; over its front TBx3, it confirms the application of a free ground to the called-subscriber's test wire T, this arrangement being made necessary owing to the subsequent opening of front contact TAp1; at TBx6, it opens the energizing circuit of relay TApq, which releases.

Relay TApq upon releasing completes at TAp5 the circuit of listening relay BBgh in the director station: ground, front VV1/2, wire T2 over cable 203, front TBe2, back TAp5, front TBx2, wire Ei, cables 7, 5 and 7, wire Ei, front BB4, back TAr6, BBl8, relay BBgh energized, resistance BR4, battery; over its front TAq1 and TAq2, it stops the sending of ringing current; over its back TAq1 and TAq2, it prepares the called-subscriber's supply circuit, as also the talking circuit; at TAq3, it eliminates the sending of ringing tone to the operator.

The relay BBgh energized in the director station controls the various operations involved in connecting the operator to the called subscriber. At BBg1, it loops the two line-wires at the outside-exchange end across guard resistance BR10, in order to ensure the holding of the supply relay TAde of equipment T; over its front-back contacts BBh1 and BBg2, it disconnects the operator from the outside line and prepares the connection of the operator to the called subscriber. The operator's handset supply circuit is then as follows: ground, left-hand winding of relay BCjk, front BBg2, tip of jack J, tip of plug F, handset CM, ring of plug F, ring of jack J, back BBl2, contact of dial CD, back BBl3, front BBh1, right-hand winding of relay BCjk, battery. The called-subscriber's supply circuit is as follows: battery, left-hand winding of relay BCfg, back BAs1, front BBg3 and BB2', wire I1, cables 7, 5 and 7, wire I1, front TBe4, back TAq1, wire A over cable 203, front VV1/6, contact va of outside finder V1, wire A, called-subscriber's loop over a circuit already described, wire B, contact vb of outside finder V1, front VV1/5, wire B over cable 203, back TAq2, front TBf3, wire I2, cables 7, 5 and 7, wire I2, front BB3' and BBg4, back BAs2, right-hand winding of relay BCfg, ground.

Relay BBgh prepares at BBh2 the circuit of relay BCm; at BBh3 and BBh4, it prepares the talking circuit between the operator and the called subscriber.

When supply relay BCjk has pulled up, the connection is established between the operator and the called subscriber as described in connection with recalling the operator.

Relay BCfg upon energizing causes the operation of relay BCh over the following circuit: ground, relay BCh, front contact BCf1, resistance BR15, battery.

Relay BCh upon energizing completes the following circuit over its front BCh1: battery, relay BCm energized, front BCh1 and BBh2, back BAr6, front BB4, wire Ei grounded as already described. At its front BCh2 and BCh3, relay BCh confirms the talking circuit between the operator and the called subscriber; at BCh4, it completes a holding circuit for itself.

Relay BCm completes a holding circuit for itself at BCm2.

The operator then tells the called subscriber that she is going to connect him to the outside system. To do so, she depresses for an instant guard-removal key BKRG, of the "restoring" type, this causing the momentary energization of relay BB*i*. A ground is then applied to the right-hand terminal of guard relay TA*rs* of outside equipment T over the following circuit: front TB*f*2 (FIG. 12), wire R*g*, cables 7, 5 and 7, wire R*g*, front PB9 and BB*i*1, ground. Owing to this, said guard relay TA*rs* is short-circuited and releases after a moment.

Guard relay TA*rs* upon releasing controls the various operations that will end in isolating the operator from outside equipment T. At TA*r*2, it causes the turning off of listening lamp LE at the operator's station; over its back TA*r*5 and TA*s*7, it causes the closing of the following supply circuit for the called subscriber: ground, left-hand winding of relay TA*de* holding, back TA*s*7, TA*q*1, called-subscriber's loop over a circuit already described up to back TA*q*2, back TA*r*5, right-hand winding of relay TA*de*, battery; over its front TA*s*4 it opens the holding circuit of relay TB*def*, which releases; at TA*s*5, it removes the ground from wire C*o*, this causing the release of the relay BB connecting the operator to outside equipment T. Contacts TA*s*7 and TA*r*5 being closed, the subscriber is connected to the outside line over a circuit already described in connection with direct seizure.

Relay TB*def* upon releasing opens at TB*d*4 the holding circuit of the connection magnet VV1 of outside finder V1, said magnet immediately over back TB*d*4, front TA*n*2 V1, said magnet holding immediately over back TB*d*4, front TA*n*2 and ground; over its back TB*e*1, it causes the application of battery to the called-subscriber's test wire T1, in order to show that said subscriber is busy with an outside call; over its front TB*e*2, it removes the ground from wire E*i*, the effect of this being to cause the release of relays BB*gh* and BC*m* in the director station; at TB*e*4 and TB*f*3, it disconnects the subscriber from the operator.

The release of director station B then is effected as follows. Relay BC*fg* releases, having its circuit opened respectively at BB′2, BB′3.

Relays BC*jk* and BC*h* release, having their circuits opened respectively at BB*g*2, BB*h*1 and BC*f*1. When the operator releases guard-removal key BKRG, relay BB*i* releases in turn. Relay BC*rs* alone remains operated so long as plug F of handset CM remains inserted in jack J.

The various relays of equipment T are in the position in which normally they should be during an outside call (relays TA*do*, TA*no*, TA*jk*, TB*u*, TB*xy* energized) and conditions are back to a case already described.

From the foregoing description it follows that when an operator is connected to the outside system and she desires to ring an inside subscriber in order to transfer the outside call to him if need be, she uses a method wholly different from the one already described for the case where the party wanting to make a double call and a transfer is an inside subscriber. Such arrangement allows the operator to handle outside calls even if the inside automatic equipment is out of order.

Various special cases likely to arise in the routing of calls will now be discussed, examining first the various cases involved in the direct seizure of the outside system.

In the preceding descriptions it has been assumed that an inside subscriber is required to dial the digit 1 in order to be connected to the outside system. In fact, as has been stated, three separate outside-line groups have been provided, capable of being reached by dialing the digits 1, 8 and 9, respectively. If the subscriber dials the digit 8, relay RBK of local receiver R is the only one to energize out of the series of relays RB*h* . . . RB*k* (FIG. 6); wire F2, corresponding to the second outside-line group, is grounded over the following circuit: back contacts RB*h*1 and RB*i*1, front contacts RB*k*3, RB*d*1, RA*y*4, wire F2. That ground energizes relay NB*f* of director marker N (FIG. 17) and the starting polarity is then transferred to equipment T2 of the first outside-line in the second group over the following circuit: ground, front NA*g*4, NB*f*2, back NA*i*2, wire TMM2. If the equipment of the first line in the second group is busy, the starting ground is transferred to the equipment of the second line and so on, in accordance with a method already described.

If the subscriber dials the digit 9, relays RB*h* and RB*k* of the local receiver are energized; wire F3, corresponding to the third outside-line group, is grounded over the following circuit: front RB*h*1, RB*k*2, back RB*i*3, front RB*d*2, RA*y*5, wire F3. That ground energizes relay NB*g* in director marker N; the starting ground is transferred then to the first free outside equipment T3 of the third group over the following circuit: front NA*g*4 and NB*g*2, back NA*i*1, wire TMM3.

If all the outside lines in the group dialed are busy, the call cannot be handled and arrangements have to be provided to release all the seized equipments and to give the calling subscriber the faulty signal. When an outside equipment T is busy, its relay TA*jk* is in operated position. Contacts TA*k*6 (FIG. 17) of all the outside equipments T of one and the same group are arranged in series and connected to front contacts NB*e*3 of director marker N. Only one contact TA*k*6 has been shown for each outside-line group, the remaining contacts being replaced with a dash line. When a subscriber dials the number of the first outside-line group, contact NB*e*3 is closed, and when all the lines in said group are busy the following circuit is completed: ground, front TA*k*6 of the various outside equipments of the first group, front NB*e*3, NA*g*2, NA*h*3, wire O. That ground immediately energizes the feeding-bridge's busy relay AA*jk* over the following circuit: wire O (FIG. 6), front RA*x*4, resistance RR2, wire 30, front AB*d*4, resistance AR1, winding of relay AA*jk*, battery. Relay AA*jk* causes the sending of busy tone to the calling subscriber and the release of all the seized members as has already been described.

If the subscriber served by the outside system is busy, the calling subscriber receives the busy tone from the distant exchange, he hangs up and outside equipment T then is released under the same conditions as after a normal call.

If the subscriber served by the outside system does not answer, the calling subscriber receives the ringing tone from the distant exchange, all he can do is hangup and outside equipment T then is released like in the preceding case.

In the foregoing description it has been assumed that all the outside finders such as V were busy in a single frame. If the number of outside lines is such that a single frame is no longer sufficient, an auxiliary frame CAD′ is used. The relays and magnets making up said frame have been grouped together in FIG. 18. Connection *cad*1 must be replaced with connection *cad*2.

At the outset of the operations involved in marking the called subscriber on the banks of the outside finders V associated with the seized outside equipment T, one of pilot relays VA*d* . . . VA*k* energizes as has been described and the following circuit is completed: ground, one of front contacts VA*d*3 . . . VA*k*3, relay V*a*′, back V14B′1, V14H′1, V13H′1 . . . V1B′1, battery. Relay V*a*′ energizes, thus indicating that there is a call on hand and that all the auxiliary frame's selection and switching magnets are in normal position. At V*a*′2, it completes a holding circuit for itself; at V*a*′4, it allows the normal operation of relays V*op* and V*mn* as already described.

In main frame CAD, the various relays and magnets operate as if there were only one frame.

In auxiliary frame CAD′, the selection and switching magnets corresponding to those already energized in the main frame will operate over the following circuits:

(1) Ground, one of selection magnets V1B′ . . . V13B′, V1H′ . . . V13H′, one of front contacts V1B3 . . . V13B3, V1H3 . . . V13H3, battery.

(2) Ground, one of switching magnets V14B′ or V14H′, one of front contacts V14B3 or V14H3, battery.

When the selection and switching magnets corresponding to the calling subscriber have been energized in the auxiliary frame, relay Va′ releases, having its circuit opened by one of contacts V14B′1 or V14H′1. Then the following circuit is completed: battery, one of front contacts V1B′1 . . . V13H′1, one of front front contacts V1B′2 . . . V13B′2, V1H′2 . . . V13H′2 back contact Va′1, one of relays Vb′ or Vc′, one of front contacts Vc1, Vf1, Vi1, Vl1. Relay Vb′ energizes where the calling subscriber belongs to the first fifties; relay Vc′ energizes if he belongs to the second fifties.

Where the seized outside equipment T corresponds to a finder V located in second frame CAD′, the energization of one of connection magnets VV′1 or VV′2 is caused over one of contacts Vb′2 . . . Vb′9, Vc′2 . . . Vc′9. This energization is effected in accordance with the same method as for one of connection magnets V1 or V2 of the main frame.

When the relays and magnets of main frame CAD home, the auxiliary frame's relays and selection and switching magnets have their circuit opened and home also.

The wanted party may be busy or fail to answer when an inside subscriber connected to the outside system wants to make a double call. If he is busy, the local selection-chain releases; the connector individual to the double-ringing line alone remains seized and causes the sending of busy tone to the calling subscriber. The latter can then return to the outside system by dialing the digit 1, as has already been described. If the station seized by double ringing fails to answer, the calling subscriber returns to the outside system under the same conditions.

An inside subscriber connected to the outside system can perform a double-call operation and be connected to an outgoing trunk. The ringing of such trunk through the local selection-chain has already been discussed. When the calling subscriber has dialed the outgoing-trunk's number, namely, the digit 7, relay ABgh is in operated position. The next digits, intended to cause the selection in the distant exchange, are received and sent out by repeater-connector G as already described. When all these digits have been sent, the repeater-connector associated with the outgoing trunk causes a free ground to be applied to wire C of final selector L (FIG. 10), resistance GR1 being short-circuited in that case. Then the following circuit is completed: wire C grounded, contact *lc* of final selector L, wire C, contact *sc* of fifties selector S, front SVS6, wire C, back AB*i*2, front AB*h*1, dash-line connection, right-hand winding of relay AB*i*, left-hand winding of relay AB*gh*, battery. Relay AB*i* energizes. At AB*i*1, it completes the following holding circuit for itself: battery, left-hand winding of relay AB*i*, front AB*i*1 and AB*h*3, ground; at AB*i*2, it switches in resistance AR5 in order to reduce the strength of the current flowing through its right-hand winding; at AB*i*3, it causes the grounding of wire C of the double-call line over the following circuit: ground, front AB*i*3, wire C, front CVA6, contact *cc* of finder C in the position corresponding to the double-call line. That ground then causes the operation of relay DA*fg* of the double-call line (FIG. 13) under the conditions already described. Front DA*f*3 closes, this preparing the reception of the digit 1, provided for causing the return to the outside system.

From the foregoing explanations it follows that the energization of the double-call line's relay DA*fg* is caused only when it is sure that all the digits required for double call have been sent properly, and that always, regardless of whether the subscriber engaged in a double call is an inside subscriber or a subscriber served by a distant private system; in fact, it is only at that moment that the circuit must be prepared for the digit (digit 1) intended to cause the return to the outside system.

It may happen that the calling subscriber makes a mistake in dialing the various digits of the called-subscriber's number when making a double call. If he notices his mistake before having dialed the last digit, he hangs up, then removes his handset again and finds himself still connected to the outside system. If he does not remove his handset again after a predetermined time period, the outside call will be transferred to the director station. These arrangements are provided as follows.

So long as the subscriber has not dialed the whole number of the inside station with which he wants to be connected by double call, relay DA*fg* is in home position. When the calling subscriber hangs up, supply relay TA*de* releases, this opening at TA*e*2 the loop of the line wires at the local automatic-switchboard's end. This switchboard releases. Relay TA*no* has its upper winding definitely short-circuited by back contact TA*el* but it nevertheless holds over the following circuit: battery, lower winding of relay TA*no*, front TB*n*1, DA*l*2, back TA*g*1, ground. At TA*e*3, relay TA*de* causes the energization of relay TB*v* over a circuit already described.

When the calling subscriber removes his handset again, supply relay TA*de* re-energizes; contact TA*e*3 opens, relay TB*v* holds and relay TB*w* energizes as already described. The latter causes at TB*v*1 and TB*w*2 the short-circuiting of relay TB*lm* and hence the return of the calling subscriber to the outside system.

If the calling subscriber does not remove his handset again after a predetermined time period, relays DA*x* and DA*lm* operate as follows.

When cam TCA3 closes its contact, the following circuit is completed: ground, cam TCA3, back contact DA*k*3, front contact DA*l*1, left-hand winding of relay DA*x*, battery. Relay DA*x* completes a holding circuit for itself over front contacts DA*x*2, DA*l*3 and TB*n*3, ground; at DA*x*1, it prepares the circuit of cam TCA4.

When cam TCA3 closes its contact, the following circuit is completed: ground, cam TCA4, front contacts DA*m*2 and DA*x*1, left-hand winding of relay DA*lm*, battery. The fluxes produced by the two windings of relay DA*lm* being equal and of opposite sign, said relay releases. At DA*l*1 and DA*m*2, it switches out cams TCA3 and TCA4; at DA*l*2, it opens the holding circuit of relay TA*no*, which releases; at DA*l*3, it opens the holding circuit of relay DA*x*, which releases in turn.

Then the following circuit is completed: ground, back contact TA*n*3, front contact TB*n*5, back DA*j*1, front TB*n*4, back TA*s*6, relay TB*rs*, resistance TR6, battery. Relay TB*rs* energizes and in accordance with a known method causes the recalling of the operator.

The case will now be described where an inside subscriber attempts to transfer an outside call to a private station. When an inside subscriber seized in a double call is not entitled to outside calls, connection *y* (FIG. 11) is not provided and relay DA*hi* (FIG. 13) cannot energize. When the calling subscriber hangs up without the intention of causing the transfer, supply relay TA*de* releases, short-circuiting over its back contact TA*e*1 relay TA*no* which releases slowly. Relay TA*no* opens at TA*n*2 the holding circuit of connection magnet VV1, which releases and disconnects outside finder V from the calling-subscriber's equipment; at TA*n*3, it completes the following circuit: ground, back TA*n*3, front TB*n*5, DA*j*1, back DA*i*1, front TB*n*4, back TA*s*6, relay TR*rs* energized, resistance TR6, battery; through the play of its back-front contact TA*o*1, it replaces the original energizing circuit of relay TA*jk* with the following holding circuit: battery, resistance TR7, relay TA*jk*, back TA*o*1, front TB*m*5, ground; at TA*o*4, it shunts thermal relay TTH1 to the preceding circuit.

Relay TB*rs* upon operating controls the various operations involved in the re-seizure of the outside connection by the operator. At TB*r*2, it prepares the operation of listening relay TB*def*; at TB*r*4 it applies a ground to the starting wire of ringing machine WMA; at TB*r*5, it connects rhythmical ringing-current source G*e* to wire S*o* in order to cause the operation of the director-stations ringer under the conditions already described; at TB*r*7, it opens the circuit of double-ringing relay TB*lm*, which releases;

at TB*s*2, it causes the blinking of the operator's ringing lamp over the following circuit: ground, cam TCA7, back TA*n*1, front TB*s*2, back TA*g*1, wire L*a* and operator's ringing lamp over a circuit already described; at TB*s*4, relay TB*rs* completes a holding circuit for itself as already described.

Relay TB*lm* upon releasing controls the various operations involved in the release of double-call line D. Through the play of its back-front contacts TB*l*2, TB*m*2 and TB*l*4, it disconnects outside equipment T from the local selection-chain and connects it again to outside line LR; at TB*m*1, it switches out guard resistance TR12, outside line LR being then looped over the following circuit: wire A of outside line LR, back TB*j*1 and TB*l*2, front TB*s*5, back TB*m*2, front TA*k*3, back TB*j*2, wire B of outside line LR; at TB*m*4, it causes the release of relay TB*no*; at TB*m*5, it opens the circuit of relay TA*jk*, which holds immediately over the following circuit: battery, resistance TR7, relay TA*jk*, back contact TA*ol*, front TB*s*3 and TA*k*5, ground.

The loop of line wires A and B giving access to the local selection-chain being open, said chain releases and removes the ground from wire T; owing to this, relay DA*jk* releases, opening at DA*j*2 the holding circuit of relay DA*fg*, which releases in turn. Double-ringing line D is fully released.

The operator, seeing her ringing lamp LA flash, is warned thereby that an inside subscriber first connected to the corresponding outside line has performed a wrong operation. To re-seize the outside call, she inserts (if she has not already done so) plug F of her handset in jack J, this causing the stopping of ringer SO and the energization of relay BC*rs*; she thereupon depresses her listening key BKE corresponding to the outside line involved. Relays BA, BA*r*, TB*def*, TA*rs*, BB, TA*de* and TA*no* then operate in accordance with a method already described; relay TB*rs*, having its circuit opened at TA*s*6, releases and at TB*s*2 causes the turning off of the ringing lamp. The various relays of director station B and of outside equipment T are then respectively in the same position they were immediately after the operator had answered an outside call (relays BC*rs*, BB, TB*u*, TA*de*, TA*no*, TA*jk*, TB*def* and TA*rs* energized). The operator is therefore connected to the outside system and handles the outside call as she sees fit.

If the operator does not answer, thermal relay TTH1, whose circuit is completed as has been described, by TA*o*4, TB*s*3 and TA*k*5, heats up and ends by operating after a predetermined time period. Relay TA*jk*, short-circuited for a long period over front contact T*th*1 of thermal relay TTH1 and back contact TA*o*1, releases. Relay TB*rs*, having its circuit opened at TA*j*1, releases in turn; thermal relay TTH1 has its circuit opened at TA*k*5 and homes after a certain time period. Outside equipment T is fully released. This release is signaled to the public exchange by the opening of the loop of line wires A and B at TB*s*5.

When a calling subscriber attempts to transfer an outside call to an inside subscriber that has not yet answered or that has already hung up, the ground applied to wire C over front contacts DA*e*4, DA*h*2 and DA*f*2 cannot energize the pilot relay that must cause the called subscriber's marking on the banks of outside finders V. In effect, in feeding bridge A, relay AA*hi* is unoperated and contact AA*i*4 open. Relays DA*x* and DA*lm* then operate in accordance with a method already described. The loop at the local automatic switchboard's end is open at DA*m*3, the local selection-chain is released, relay DA*jk* releases and over its back contact DA*j*1 causes the energization of relay TB*rs* and hence the recalling of the operator.

The varous special cases arising in connection with incoming outside calls will now be discussed and it will be assumed first that the operator is slow in answering an outside call. When cam TCA5 closes its contact, the following circuit is completed: ground, cam TCA5, front contact WB*q*2 closed when an outside call is on hand at equipment T, lower winding of relay WB*p* energized, battery. Relay WB*p* opens at WB*p*1 one of the holding circuits of relay TA*g*, which nevertheless remains operated owing to the closing of contact WB*q*4; at WB*p*2, it completes the following holding circuit for itself: ground, upper winding of WB*p*, front WB*p*2, resistance WR3, battery; at WB*p*3, it confirms the starting of ringing machine MA; at WB*p*4, it prepares the circuit of the opposite winding of relay WB*q*.

If the operator has not yet answered when cam TCA6 closes its contact, the following circuit is completed: ground, cam TCA6, front WB*p*4, lower winding of relay WB*q*, front TA*g*6, resistance WR1, battery. The fluxes produced by the two windings of relay WB*q* being equal and of opposite sign, said relay releases. At WB*q*1, it short-circuits the holding winding of relay WB*p*, which releases slowly; at WB*q*2, it switches out cam TCA5 in order to prevent the untimely re-energization of relay WB*p*; at WB*q*3, it ends the sending of ringing current to the ringer of the director station; at WB*q*4, it opens the last holding circuit of relay TA*g*, which releases.

Relay TA*g* upon releasing causes through the opening of its front TA*g*1 the turning off of the ringing lamp at the director station; over its front TA*g*3, it opens the circuit of relay TB*u*, which releases; at TA*g*5 it opens one of the starting circuits of ringing machine WMA; at TA*g*6, it opens the circuit of the 2 windings of relay WB*q*, which remains unoperated.

Relay WB*p* opens at WB*p*3 the last circuit of ringing machine WMA, which stops.

Outside equipment T is fully released and the call is erased.

In describing the various operations involved in the reception of an outside call, it has been assumed that relay TA*l* was energized by the ringing current from the outside system. In fact, said ringing current is a rhythmical current and receiving relay TA*l* follows that rhythm. Each time relay TA*l* energizes or re-energizes, it causes at TA*l*2 the short-circuiting of the holding winding of relay WB*p* where the latter has been energized over cam TCA5. From the foregoing descriptions it follows that the time device made up of relays WB*p* and WB*q* is restored to zero throughout the reception of the ringing current from the outside system. It is obviously necessary to arrange things so that the time period between the closings of cams TCA5 and TCA6 be longer than the periods of "silence," that is, of interruption of the ringing current, so that the ringing will not be erased during one of said periods of silence.

It will now be assumed that the operator has received an outside call and that she wants to route it to an inside subscriber. It may happen that said subscriber is busy or that he fails to answer.

First the case will be discussed where that subscriber is busy with an inside call. Said subscriber's test wire T is then grounded and relay TA*f* cannot energize. Front contact TA*f*1 being open, relay TA*pq* no longer energizes and the following circuit is completed: ground, front VV1/2, wire T2 over cable 203, front TB*e*2, back TA*p*5 and TB*x*2, wire O*d*, cables 7, 5 and 7, wire O*d*, front BB3, relay BA*s* energized, battery. Relay BA*s* prevents at BA*s*1 and BA*s*2 the switching in of supply relay BC*fg*; over its front BA*s*2, it causes the sending of the busy signal to the operator over the following circuit: ringing machine BMA, resistance BR14, condenser BC4, front BA*o*2, condenser BC3, director-station's loop over a circuit already described and ground through supply relay BC*jk*; at BA*s*3, it causes the flashing of "busying" lamp LOD over the following circuit: ground, lamp LOD, front BA*s*3, back BC*l*1, cam BCA1, battery; at BA*s*4, it causes the release of relay BB*l*.

Relay BB*l* opens over its front contacts BB*l*2 and BB*l*3 the circuit of relay BB*j*, which releases.

When front contact BB$l$4 is open, receiver U and director marker N release as already described.

The operator, if she so desires, can listen in on the busy called subscriber in order to let him know that an outside call is on hand for him. For that purpose, she operates key BKOF, this causing the energization of relay BB$gh$ across resistance BR4. At BB$g$1, relay BB$gh$ loops the two line wires E1 and E2 terminating at outside equipment T so as to allow the holding of supply relay TA$de$ and thus prevent the release of said equipment; through the play of its back-front contacts BB$g$2 and BB$h$1, it disconnects the operator's handset CM from outside equipment T in order to connect it to the supply relay BC$jk$ energized; at BB$g$3, BB$g$4, BB$h$3 and BB$h$4, it prepares the circuit that allows listening in on the called subscriber.

Relay BC$jk$ completes at BC$j$2 and BC$j$3 the circuit whereby the operator listens in on the called subscriber. This circuit moreover is the same as the talking circuit already described for the case where the called subscriber was free.

When the operator releases offering key BKOF, relays BB$gh$ and BC$jk$ release.

If the called subscriber accepts the call, he hangs up, causing the release of the call in progress. Owing to this, the availability battery is applied to his test wire T and relays TA$f$, TA$l$ and TA$pq$ operate in accordance with a method already described. The call is then transferred to the called subscriber. When the latter answers, relays TB$xy$, TA$pq$, BB$gh$, BC$jk$, BC$fg$, BC$h$ and BC$m$ operate like in the case where the subscriber was found free by the operator. Busy relay BA$s$ releases when its circuit is opened at TA$p$5 in outside equipment T.

The subscriber can ask the operator to hold the outside call. He can also ask that said call be transferred to some other inside station of the system. To do so, she depresses her double-call key BKDA for an instant, this causing the operation of relays BC$o$ and BC$n$ in accordance with a method already described. Relay BC$n$ opens the circuit of the connection magnet VV1 of outside finder V over its back BC$n$2. To ring the second inside subscriber, the operator then proceeds as she did for the first. The operator can also release the outside call. To do so, she operates her holding-removal key BKRG, this causing the temporary energization of relay BB$i$. Relay BB$i$ releases, having its circuit opened at BB$i$3, this causing the release of receiver U and of director marker N. Relay BB$i$ causes the grounding of holding-removal wire Rg over front contacts BB$i$1 and BB9; in outside equipment T, the two wires G$a$ and R$g$ are grounded; owing to this, relay TA$rs$ is short-circuited and releases; relay TB$def$, having its holding circuit opened at TA$s$4, releases in turn. The circuit of supply relay TA$de$ is opened at TA$r$1 and outside equipment T releases as already described.

If the subscriber to whom the operator wants to transfer an outside call is himself busy with another outside call, his test wire T1 is connected to battery across resistance TR1 of the outside equipment T seized by that subscriber. Then the following circuit is completed: wire T1 to battery, contact V$t$1 of the outside finder V1 involved, front VV1/3, wire T1 over cable 203, front TB$e$1 of the outside equipment T involved, wire O$r$, cables 7, 5 and 7, front BB2, relay BC1 energized, ground. Relay BA$s$ energizes also like in the case where the called party is busy with an inside call and causes at BA$s$4 the release of relay BBl and hence the return to normal of receiver U and of director marker N. "Called-subscriber busy" lamp LOD lights up steadily, the following circuit being completed: ground, lamp LOD, front BA$s$3, BC$l$1, resistance BR1, battery. The operator is thus told that the called subscriber is busy with an inside call and handles said call as she sees fit.

If the called subscriber does not answer, the operator handles the outside call as she see fit.

When the operator is connected to an inside subscriber, she can, is she so desires, turn to listen in on the outside system. To do so, she depresses "outside talking" key BCKR for an instant; relay BB$gh$, short-circuited, releases and transfer the operator again to the outside system over its back contacts BB$g$2 and BB$h$1.

If the operator attempts to transfer an outside call to a private station, she must be warned of it. For that purpose, all the outgoing wires of pyramid PYPD' corresponding to private stations are connected to wire NNU and thence to relay BB$m$. When the operator dials such a station, relay BB$m$ energizes. At BB$m$2, it completes the following holding circuit for itself: battery, relay BB$m$, front BB$m$2, back BC$n$2, BC$o$2, back BB$i$2 and BA$s$5 in parallel, side contact of jack J, ground; at BB$m$3, it controls the starting of ringing machine BMA; over its front BB$m$1, it causes the flashing of inside-dialing lamp LN. Relay BB$l$, having its circuit opened at BB$m$4, releases and causes the release of receiver U and of marker N.

If a calling subscriber has recalled the operator during an outside call and transferred it to her, the operator can ring some other inside subscriber as already described. However, in that case she does not have to operate double-call key BKDA to control relays BC$o$ and BC$n$. In effect, at the moment of transfer, these two relays are controlled automatically over the following circuit: wire E$i$ grounded, front BB4, back BA$r$6, front BB$h$2, back BC$h$1, front BC$m$3.

The case will now be discussed where the called subscriber has a plurality of lines grouped under one and the same number. Each "collective" number, that is, one belonging to a plurality of grouped lines, has an individual relay connected to one of the outputs of pyramid BYPD'. In order not to complicate the drawing, it has been assumed that the system comprises only three "collective" numbers, assigned to extensions, corresponding respectively to relays XA$d$, XA$e$ and XA$f$.

Relays XA$hi$, XA$jk$, XA$lm$ and XA$no$ are used to control the hunting for a free line among those grouped under one and the same number. These relays are used without distinction, regardless of the "collective" number involved. Four of these relays have been provided in the example described, this allowing hunting for a free line among four lines as a maximum; this quantity of four relays is not limitative. Only four of these relays have been shown in order not to complicate the drawing, but it is to be clearly understood that the quantity of these relays must be equal to the quantity of lines in the most-heavily loaded group.

It will be assumed that the "collective" number dialed by the operator belongs to relay XA$d$. As soon as this number has been registered in marker N, relay XA$d$ energizes over the following circuit: battery, relay XA$d$, wire 244, cable CLG, wire C (FIG. 17) corresponding to the number dialed and ground through the two contact-pyramids BYPD' and BYPU.

Figure 16:
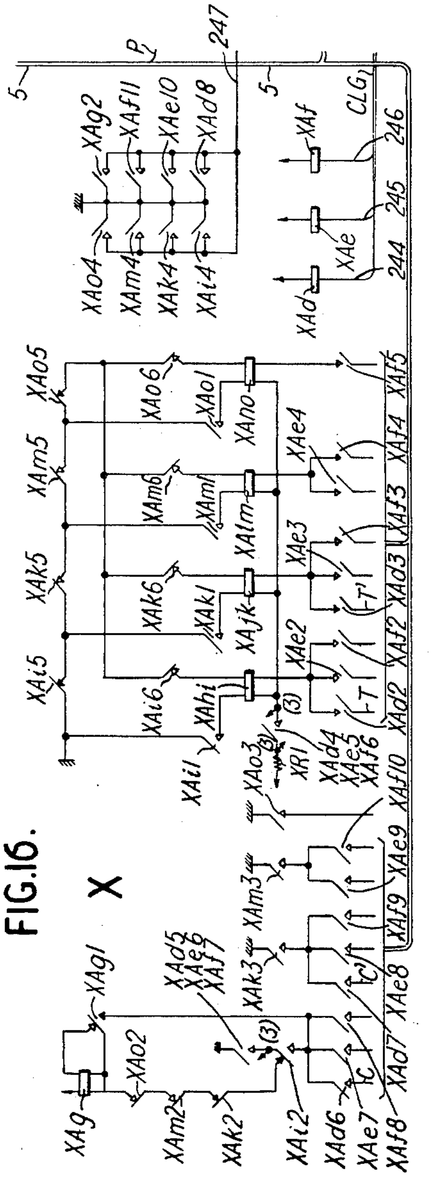
FIG. 16 is a circuit diagram of a PBX line selection equipment.

It will be assumed in the example described that the "collective" number dialed allows ringing two lines; in that case, the test wires of these two lines are connected respectively to the wires T shown in the lower portion of FIG. 16. If the first of these lines is free, wire T is connected to battery and the following circuit is completed: wire T to battery, front XA$o$2, right-hand winding of relay XA$hi$ energized, back XA$i$6, XA$o$5, XA$m$5, XA$k$5, XA$i$5, ground. Relay XA$hi$ by energizing shows that it is line 1 that must be chosen out of the two grouped lines.

The marking wires C of the two lines in the group are connected respectively to the wires C and C' shown in the lower portion of FIG. 16. Relay XA$d$ upon energizing prepares at XA$d$5 and XA$d$6 the marking on the banks of outside finder V of the line holding rank 1 in the group dialed. Finally, relay XA$d$ completes at XA$d$8 a holding circuit for the seizure relay NA*de* of director marker N.

Relay XA*hi* completes the following holding circuit for itself at XA*i*1: battery, resistance XR1, front contact XA*d*4, left-hand winding of relay XA*hi*, front contact XA*i*1, ground; over its front contact XA*i*2, it causes the grounding of the wire C corresponding to the line chosen, this over front XA*d*5, XA*i*2 and XA*d*6. This grounding will cause in the frame of outside finders CAD (FIG. 11) the various operations that will finally end in controlling the energization of the selection and switching magnets of the finder V giving access to the line chosen. At XA*i*4 (FIG. 16), relay XA*hi* completes another holding circuit for relay NA*de* of director marker N; at XA*i*5, it prevents the energization or the holding of relay XA*jk*.

The various operations involved in the connection of finder V to the line chosen and in the sending of the ringing current are identical with those already described.

When director marker N releases, the various contacts of pyramids BYPU and BYPD′ are open, this causing the release of relay XA*d*. Relay XA*hi* releases, having its circuit opened at XA*d*4.

Had the two lines in the group been free, the test wires T and T′ corresponding to said lines would both have been connected to battery and the two relays XA*hi* and XA*jk* would both have been energized, the circuit of relay XA*jk* being similar to that of relay XA*hi*. However, upon enregizing, relay XA*hi* would have opened at XA*i*5 the energizing and holding circuits of relay XA*jk*, which would have homed. Priority would therefore have been given to the first of the two lines.

In the diagrams shown it has been assumed that the group corresponding to relay XA*e* comprised three lines and that the one corresponding to relay XA*f* comprised four. In the case of the group comprising three lines, the three relays XA*hi*, XA*jk* and XA*lm* are switched in, by means of three front contacts XA*e*2, XA*e*3 and XA*e*4, for the free selection of one of these lines. In the case of the group comprising four lines, the four relays XA*hi*, XA*jk*, XA*lm* and XA*no* are switched in, by means of front contacts XA*f*2, XA*f*3, XA*f*4 and XA*f*5, for hunting these lines. It will be understood now that generally the number of relays such as XA*hi* must be equal to the number of lines in the most-heavily loaded group, each relay XA*d* individual to a group to comprise as many front contacts similar to XA*d*2 as there are lines in that group.

If all the lines in a group are busy, the four relays XA*hi*, XA*jk*, XA*lm* and XA*no* remain unoperated; then the following circuit is completed: battery, left-hand winding of relay XA*g*, back XA*o*2, XA*m*2, XA*k*2, XA*i*2, one of front contacts XA*d*5, XA*e*6, XA*f*7, ground. Relay XA*g*, made slow-acting by the short-circuiting of its right-hand winding at XA*g*1, energizes after a moment. This slowing down has moreover been provided to prevent its untimely energization in case there is a free line in the group. Over its back contact XA*g*1, relay XA*g* removes the short-circuit from its right-hand winding, this making it fast-releasing; at XA*g*2, it completes a holding circuit for relay NA*de* of director marker N.

To facilitate the explanations that will follow, it will be assumed that the "collective" number dialed by the operator belongs to relay XA*d*. That being so, the ground used to energize relay XA*g* is also applied, through front contact XA*d*6, to the wire C corresponding to the first line in the group, something that will cause the connection of outside finder V to said line and allow the operator to listen in if need be.

It will now be assumed that the subscriber to whom the operator wants to transfer an outside call is a party-line subscriber. As has been stated, two subscribers served by one and the same party-line have one and the same tens digit and one and the same units digit, only the hundreds digits being different. Subscribers holding rank 1 on a party-line are all connected to hundreds 2, those holding rank 2 being connected to hundreds 6. If the subscriber dialed by the operator holds rank 1 on the party-line, he belongs to hundreds 2 and the various operations involved are identical with those already described. However, if he holds rank 2, his hundreds digit is the digit 6, outgoing wire 226 of pyramid BPYC is grounded and relay NC6 energizes. At NC61, relay NC6 completes a holding circuit for relay NA*de*; at NC62, it controls the energization of the relay NC2 characterizing the hundreds 2; at NC63, it completes the following circuit: ground, front NC63, wire 120, front BB*d*6, wire 122, front BB7′, wire LP, cables 7, 5 and 7, wire LP, front TB*e*5, right-hand winding of relay TA*m* energized, battery.

Relay NC2 (FIG. 17) being energized, everything develops as if a subscriber belonging to hundreds 2 were being rung.

In outside equipment, T, relay TA*m* completes the following holding circuit for itself at TA*m*3: battery, left-hand winding of relay TA*m*, front TA*m*3, wire T2 over cable 203, front VV1/2, ground; through the action of its back-front contacts TA*m*1 and TA*m*2, it crosses the line wires A and B used for the ringing current, the circuit for this current being then as follows: ground, ringing generator GE, resistance TR3, front TA*m*1 and TA*q*1, wire A and called-subscriber's loop over a circuit already described, wire B, front TA*q*2 and TA*m*2, back TA*l*1, relay TB*xy*, battery. The ringing of the subscriber holding rank 2 on the party-line will then be caused in accordance with a known method.

Where the operator dials a non-existent hundreds number, that is, if she dials digit 1, 5, 7, 8, 9 or 0, one of wires 221, 225, 227, 228, 229 or 220 is grounded through pyramid BPYC, this causing the energization of BB*m* over wire NNU. Relay BB*m* causes as already described the flashing of lamp LN in order to tell the operator that she has dialed wrong. Receiver U and marker N release as already described.

Before starting to dial again, the operator must depress her double-call key BKDA for a moment, this causing the operation of relays BC*o*, BC*n*, BB*l* and BB*j* in accordance with a method already described. Relay BB*m*, which was used to detect wrong dialing, has its holding circuit opened by back contact BC*n*2 and releases. Some of the outgoing wires of pyramids BYPD′ correspond to non-existing combinations. These particular wires are all connected to wire NNU. When one of these combinations is dialed, the various operations develop as described for the case where the operator dials the number of a private station.

When the operator notices that she has dialed the wanted-party's number wrong, she depresses briefly her key BKDA, which then acts as a cancelling key. Relays BC*o* and BC*n* energize and then release in accordance with a method already described. Relay BC*o* upon energizing opens at BC*o*2 the circuit of relay BB*l*; contact BB*l*4 opens, this causing the release of receiver U and of director marker N. When relay BC*o* releases, it causes again the re-energization of relay BB*l* over its back contact BC*o*2. The operator can then start dialing again.

In the foregoing descriptions it has been assumed that the outside line was of the "automatic" type. Through slight wiring changes, outside equipment T can also be adapted to a central-battery (CB) line, to a local-battery (LB) line, to a rural line or to a trunk line to a distant private system.

The case will be described first of the operation of outside-line equipment T in connection with a CB line. When it is desired to use said equipment under these conditions, connections *x*, corresponding to an automatic outside-line, are eliminated and replaced with those shown by crossed lines, dash-lines or dotted lines. Connections *t*2, *t*3 and *t*5 are made and connections *t*1, *t*4 and *t*6 are eliminated. When a subscriber takes equipment T by direct seizure, relay TA$jk$ pulls up as described and the following circuit is completed: battery, right-hand winding of relay TB$i$, dotted-line connection, crossed-line connection, front TA$k$2, back TA$g$3, ground. Relay TB$i$ pulls up. At TB$i$3, it completes a holding circuit for itself; at TB$i$4, it causes the energization of relay TB$u$ over the following circuit: battery, right-hand winding of relay TB$u$, crossed-line connection, front contacts and TA$j$1, ground. From the foregoing explanations it follows that, upon seizure of outside equipment T, the outside line is immediately looped to self-inductance TA$xy$ over the following circuit: resistances TR9 and TR8, back contact TB$g$1, connection $t$2, self-inductance TA$xy$, back contact TB$l$4, front contact TB$u$1, back contact TB$t$6.

The outside line being looped, the operator of the distant CB exchange is alerted in accordance with a known method. Equipment T having no dialing pulse to send out, relay TA$hi$ does not operate and relay TB$t$ remains unoperated. Equipment T is immediately in talking position.

The call is immediately routed to the called subscriber by the operator of the distant CB exchange.

If he so desires, the calling subscriber can recall the operator of the distant CB exchange during the call. To do so, he dials the digit 1. Relays TA$hi$, TB$v$ and TB$w$ operate as already described and the following circuit is completed: battery, resistance TR10, crossed-line connection, relay TB$h$ energized, crossed-line connection, back TB$s$6, TA$w$7, TB$m$7, front TA$i$4, TB$v$4, TR$w$3, ground.

Relay TB$h$ prepares a holding circuit for itself at TB$h$2; over its front TB$h$1, it prepares the circuit of relay TB$g$.

When the subscriber has finished dialing the digit 1, relay TA$hi$ releases and the following circuit is completed: battery, relay TB$g$, dash-line connection, connection $t$3, crossed-line connection, front TB$hi$, back TA$i$4, TB$m$7, front TB$h$2, ground. Relay TB$g$ energizes; over its back TB$g$1, it makes a break in the outside line's loop, this causing in accordance with a known method the recall of the operator of the distant CB exchange; at TB$g$2 it short-circuits relay TB$h$, which releases slowly.

Relay TB$h$ upon releasing opens over its front TB$hi$ the circuit of relay TB$g$, which releases in turn; at TB$h$2, it opens its own holding circuit, this making its re-energization impossible even after the removal of its short-circuit at TB$g$2.

Relay TB$g$ again completes the outside line's loop at TB$g$1.

When the calling subscriber hangs up, equipment T releases in accordance with a method already described. The outside line's loop is opened at TA$o$3, in order to give the operator of the CB exchange the supervisory signal. Relay TB$u$ nevertheless holds over the following circuit: battery, right-hand winding of relay TB$u$, front TB$u$2, crossed-line connection, back TT$h$2 associated with thermal relay TT$h$2, ground. General holding relay TA$jk$ releases, completing the following circuit over its back TA$k$2: battery, left-hand winding of relay TB$i$, crossed-line connection, front TB$i$2, dash-line connection, back TA$k$2, TA$g$3, ground. The fluxes produced by the two windings of relay TB$i$ being equal and of opposite sign, said relay releases and over its back TB$i$4 completes the following circuit: battery, thermal relay TTH2, back TB$i$4, front TB$u$2, back TT$h$2 associated with thermal relay TTH2, ground.

Thermal relay TTH2 warms up and ends by operating after a predetermined period of time. In opening its back contact TT$h$2, it causes the release of relay TB$u$.

It will be noted that so long as relay TB$u$ remains operated, equipment T remains marked busy for a local operator over front contact TB$u$5 and, for direct seizure, through the opening of back contact TB$u$7. This arrangement is provided to prevent the seizure of the outside line at the outgoing end so long as the operator of the distant exchange has not pulled out her plug.

When a call from the distant CB exchange is received at equipment T, the various operations develop like in the case of an automatic line, with the sole difference that relay TB$i$ energizes upon reception of the call over: battery, right-hand winding of relay TB$i$, crossed-line connection, front TA$g$3, ground. Relay TB$i$ energizes, equipment T being then in the normal position in which it should be during a call.

When equipment T is used in connection with an LB type line, the crossed-line connections and the connections —$o$—$o$—$o$—$o$—$o$— are provided but neither the connections $x$, which are peculiar to automatic lines, nor the dotted-line connections, which are peculiar to CB lines. Connections $t$1, $t$4, $t$5 are made and connections $t$2, $t$3, $t$6 are eliminated.

When equipment T is seized at the outgoing end, general holding relay TA$jk$ energizes as has been described and the following circuit is completed: battery, relay TB$jk$, crossed-line connection, connection $t$4, back TB$h$1, crossed-line connection, connection $t$5, back TB$i$1, crossed-line connection, front TA$k$2, back TA$g$3, ground. Relay TB$jk$ energizes. At TB$j$6, relay TN$j$ causes the starting of ringing machine WMA; over its front TB$j$1 and TB$j$2, it causes the sending of an AC signal to the distant LB office, this causing in accordance with a known method the ringing of one of the operators at said office; at TB$j$4, it completes the following circuit: battery, right-hand winding of relay TB$i$ energized, front TB$j$4, crossed-line connection, front TA$k$2, back TA$g$3, ground.

Relay TB$i$ completes a holding circuit for itself at TB$i$3; over its back TB$i$1, it opens the circuit of relay TB$jk$, which releases slowly; over its front TB$i$1, it prepares a new energizing circuit for relay TB$jk$, which will be used in sending the supervisory signal; at TB$i$2, it prepares the circuit of its opposite winding; over its front TB$i$4, it causes the operations of relay TB$u$ like in the case of a CB line.

When relay TB$jk$ releases, it stops, over its front TB$j$1 and TB$j$2, the sending of the line signal to the distant LB exchange. It will be noted that this relay is slightly slow-releasing, so that the line signal will last sufficiently long. At TB$j$6, it eliminates the starting of ringing machine WMA.

Equipment T having no dialing pulse to send out, relay TA$hi$ does not operate and relay TB$t$ remains in normal position. Equipment T is immediately in talking position. The line is looped to self-inductance TA$xy$ but this is unimportant in the case of an LB line.

If he so desires, the calling subscriber can recall the operator of the distant LB exchange. To do so, he dials the digit 1. The various operations are identical with those already described in connection with a CB outside line, with the sole difference that it is relay TB$jk$ that operates, instead of relay TB$g$. Instead of opening the loop of the outside line, an AC pulse is sent for a short period to the distant exchange over front contacts TB$j$1 and TB$j$2. The sending of this pulse causes, in accordance with a known method, the recall of the operator of the distant LB exchange.

When the calling party hangs up, equipment T releases like already described with reference to an automatic outside-line, but relay TB$u$ holds like already described in connection with a CB line. Then the following circuit is completed: battery, relay TB$jk$ energized, crossed-line connection, connection $t$4, back TB$h$1, connection $t$5, crossed-line connection, front TB$i$1, connection —$o$—$o$—$o$—$o$—$o$—, back TA$k$2 and TA$g$3, ground. Over its front contacts TB$j$1 and TB$j$2, relay TB$jk$ causes the sending of the supervisory signal to the distant LB exchange; at TB*j*3, it completes the following circuit: battery, left-hand winding of relay TB*i*, crossed-line connection, front TB*i*2, TB*j*3, connection —o—o—o—o—o— back contacts TA*k*2 and TA*g*3, ground. The fluxes produced by the two windings of relay TB*i* being equal and of opposite sign, said relay releases.

Relay TB*i* upon releasing opens over its front TB*i*1 the circuit of relay TB*jk*, which releases in turn; over its back TB*i*4, it completes the circuit of thermal relay TTH2 like described in connection with a CB line. The release of equipment T is then held up under the same conditions and for the same reasons.

When a call from a distant LB exchange is received at equipment T, the various operations develop like already described with reference to an automatic line, but in addition relay TB*i* energizes over the crossed-line connection and front contact TA*g*3; the energization of relay TB*jk* and hence the untimely sending of AC to the distant LB exchange are prevented owing to the opening of back contact TB*i*1. The recall of the distant operator and the slow release take place like in the case where equipment T is seized from the outgoing end.

When equipment T is used in connection with a "rural" type line, the crossed-line and dash-line connections are provided. Connections *t*2, *t*3, *t*5, *t*7 are made and connections *t*1, *t*4, *t*6 are eliminated.

When equipment T is seized from the outgoing end, relay TB*jk* energizes for a moment as in the case of an LB line and over its front contacts TB*j*1 and TB*j*2 causes the sending of an AC line-signal to the distant rural automatic switchboard. It suffices to point out that the energizing circuit of TB*jk* passes through connection *t*7. That signal causes in said automatic switchboard the hunting for the calling line and the routing of the call to an operator of the toll center in accordance with a method well known in rural semi-automatic working. The outside line is then looped to self-inductance TA*xy* over back TB*g*1 and connection *t*2, in order to signal the toll-center operator that the calling party is on the line.

If the calling subscriber wants to recall the toll-center operator, he dials the digit 1, the effect of this being to cause the temporary energization of relay TB*g* and hence a brief breaking of the loop of the outside line at TB*g*1. This passing break brings about the recall of the toll-center operator in accordance with a known method.

When the calling subscriber hangs up, equipment T releases, this causing the opening of the loop of the line wires at the outside end at TA*o*3. This opening corresponds to the sending of the supervisory signal to the distant rural automatic switchboard. The release of equipment T is slowed down as in the cases previously described.

In the case of an incoming call, relay TB*i* energizes immediately over TA*g*3, preventing over its back TB*i*1 the untimely sending of a line signal. The equipment is then in normal talking position.

Trunk lines between distant exchanges can be handled like outside lines and be associated with an equipment such as T. In particular, where such a trunk line terminates at a distant switchboard, it suffices to include between equipment T and said trunk an equipment whose essential role consists in sending line and supervisory signals. Such an equipment can easily be designed by any one skilled in the art. In equipment T, the connections made will be the same as in the case of an automatic line; the only addition will be connection *t*6, short-circuiting contact TA*q*4. Thus, as soon as equipment T is seized from the outgoing end, relay TB*u* energizes over front contact TA*j*1, so as to cause the immediate switching of said equipment T into "outside talking" position.

Of course, the operator, like an inside subscriber, can ring the outside system. She uses this facility particularly when she is rung by an extension subscriber not entitled to make direct outside calls but nevertheless wanting an outside connection. To do so, she depresses for an instant her listening key BKE corresponding to the wanted outside line. That operation causes, in accordance with a method already described, the operation of the connection magnet BB individual to said outside line and hence the connection of director station B to the equipment T associated with said line.

In equipment T, relays TB*def*, TA*rs*, TA*de*, TA*no* and TA*jk* operate in accordance with a method already described. The operator then finds herself connected to the outside system.

To dial the outside system, she limits herself to operating her dial CD, without touching key BKDA; she thereby causes breaks that make supply relays TA*de* beat, the pulses being sent to the outside system over contact TA*e*2 as already described.

Once the connection has been established with the subscriber served by the outside system, the operator can, if need be, transfer said connection to any inside subscriber that may have asked for it. Such transfer is effected in accordance with a method already described. In this latter case, as soon as that subscriber's availability test has been made, relay TA*pq* energizes and over its contacts TA*q*4 and TA*q*5 brings about the immediate shifting of relays TB*u* and TB*t* into the position they must normally occupy during the talking period (TB*u* operated, TB*t* unoperated), without waiting for the passing of cams TCA1 and TCA2. In fact, it is sure at that moment that the equipment is in talking position, because the operator has already been connected to the outside subscriber.

When the operator is connected to any outside line, she can, if she so desires, connect herself to a second outside line, the first line being held. This arrangement is embodied as follows. When the operator is connected to the first outside line, relay BC*rs* is energized along with the connection relay BB associated with said line. In equipment T, the two relays TB*def* and TA*rs* are in operating position.

To connect herself to the second outside line, the operator depresses for a moment her listening key BKE corresponding to said line. When this key is in operated position, the seizure of the corresponding outside line is brought about in accordance with a method already described several times. Back contact BA*r*1 being open, the first line's relay TB*def* releases. Over its back contact TB*d*1 (FIG. 12), relay TB*def* upon releasing causes the blinking of the first line's listening lamp LE over the following circuit: ground, cam TCA7, back TB*d*1, front TA*r*2, wire L*e* and listening lamp Le over a circuit already described; over its front TB*f*1 and TB*f*5, it disconnects the operator's handset from the first outside line; over its back TB*f*5, it switches in holding resistance TR11 in order to allow the holding of supply relay TA*de* and thus prevent the release of equipment T.

When the operator releases her listening key BKE, relay BA*r* releases and allows over its back BA*r*1 the holding of the second outside line's relay TB*def* in series with the upper winding of relay BC*rs*. Thus, the first outside line is in "holding" position, while on the other hand the second is in "listening" position.

If she so desires, the operator can then operate the listening key of a third outside line. Said line then passes into "listening" position, while the second line remains held.

If the operator wants to be disconnected from a held line, she depresses for a moment holding-removal key BKRG; relay BB*i* energizes temporarily and causes over its front BB*i*1 the grounding of wire R*g*. Relay TA*rs* in equipment T is thereby short-circuited under conditions already described and opens at TA*s*5 the circuit of connection relay BB. Owing to this, the operator is disconnected from the outside line.

Arrangements have been provided to prevent crosses between outside lines in case the operator depressed two or more listening keys simultaneously. If the operator does so, the upper winding of relay BC*rs* is connected to a plurality of relays such as BA. Due to this, the flux produced by said upper winding is sufficient to cause the release of said relay BC*rs*, which opens at BC*r*1 the circuit of all the connection relays BA. The operator is then disconnected from all the outside lines to which she attempted to connect herself. Relay BC*rs* will not be able to energize again until after the closing of back contact BA*r*4, that is, until after the operator has released all the keys.

When the case was discussed of an incoming outside call routed by the operator to an inside subscriber, it was assumed that said operator, after having dialed said subscriber, waited for his answer before withdrawing from the line. If she so desires, she can also route a second call; the transfer of the outside connection is brought about automatically as soon as the called subscriber answers. This arrangement is embodied as follows. When the operator operates a listening key corresponding to an outside line, the first line passes into "held" position in accordance with a method already described.

When the subscriber answers, relay TB*xy* energizes and it short-circuits relay TA*rs* over front TB*x*4, TA*p*2 and back TB*f*2; relay TA*pq*, which held over TA*s*1 and back TB*e*2, releases as soon as contact TA*s*1 is opened. The called subscriber then finds himself connected to the outside system under conditions already described.

The operator can also, like an ordinary inside subscriber, connect herself to the local automatic switchboard in order to ring any inside subscriber in the system. For that purpose, she has available a service line Q such as that shown in FIG. 2. The various service-line wires L*o*, G*a*, R*g*, P*r*, M*a*, C*o*, E1, E2, L*e*, L*a*, S*o* and E*c* are connected over cables 44, 5 and 7 (FIG. 14) to contacts of relays BA and BB individual to said service line. For each service line, the operator has available one listening key BKE, one ringing lamp LA, one listening lamp LE and one busy lamp LO.

If the operator wants to be connected to the local automatic switchboard, she depresses for a moment her listening key BKE corresponding to one of her service lines. Her doing so causes, in accordance with a method already described, the grounding of wires P*r*, G*a* and the connection to battery of wire R*g*. Relay QB*fg* energizes as a result.

Relay QB*fg* prepares, over its front QB*f*1, the circuit of the listening lamp individual to the service line involved; over its front QB*g*1 and QB*g*4, it prepares the circuit of line wires A and B; over its front QB*f*2, it prepares a holding circuit for itself; over its front QB*g*3, it completes the following circuit: wire G*a* grounded, relay QB*hi* energized, front QB*g*3, wire R*g* connected to battery. At QB*g*2, it completes the following circuit: ground, front QB*g*2, wire E*c*, cables 44, 5 and 7 (FIG. 14), front BB8', wire 250, relay BB*k*, battery. Relay BB*k* energizes and over its back BB*k*2 switches out the smoothing circuit made up of rectifiers BQ1, BQ2 and electro-chemical condenser BC4.

When the operator is connected to an outside line, said smoothing circuit is used to absorb over-voltages; however, where the operator wants to be connected to a service line, it is preferable to eliminate said circuit, condenser BC4 running the risk of being deteriorated owing to the battery reversal given by the local automatic switchboard when the called subscriber answers.

Over its front QB*h*1 (FIG. 2), relay QB*hi* prepares the circuit of line wires A and B; over its front QB*h*2, it completes a holding circuit for itself; over its front QB*h*4, it grounds wire C*o*, this causing the operation of the connection relay BB individual to the service line involved; at QB*h*5, it prepares a holding circuit for relay QB*fg*; over its back QB*h*6 and QB*h*1, it switches out ringing relay QB*de*, which remains unused in the case under consideration; at QB*i*1, it connects wire L*o* to battery, in order to cause the steady lighting of the busy lamp LO individual to the service line involved; at QB*i*2, it connects wire L*e* to battery, in order to prepare the circuit of the listening lamp individual to said line.

Relay BB upon energizing (FIG. 14) establishes the continuity of the various connecting wires between director station B and the service line involved. Listening lamp LE then lights up steadily owing to the closing of contact BB5'.

When listening key BKE (FIG. 14) is restored to normal, contact BA*r*1 closes, wire M*a* is grounded through the upper winding of relay BC*rs* and relay QB*fg* (FIG. 2) holds over the following circuit: wire M*a* grounded, front QB*h*5 and QB*f*2, upper winding of relay QB*fg*, battery.

The continuity of the line wires over service line Q is established over front QB*g*1, QB*h*1 and QB*g*4. Line wires A and B are then looped through the operator's handset, this causing the seizure of the local selection-chain in accordance with a method already described. To dial said chain, the operator limits herself to operating her dial CD (FIG. 14), this causing breaks in the line. The selection of the called subscriber and the establishment of the connection are effected as already described with reference to the local selection-chain.

At the end of the call, the operator depresses for a moment her holding-removal key BKRG, this causing the temporary energization of relay BB*i* and the grounding of wire R*g*. The two wires G*a* and R*g* of service line Q are then grounded; relay QB*hi* is short-circuited and releases. Over its front contact QB*h*1, relay QB*hi* opens the loop of the line wires at the local selection-chain's end, this causing the release of said chain in accordance with a method that has already been described; at QB*h*4, it eliminates the grounding of wire C*o*, this causing the return to normal of the connection relay BB (FIG. 14) individual to the service line involved; at QB*h*5 (FIG. 2), it opens the holding circuit of relay QB*fg*, which releases in turn; at QB*i*1, it causes the turning off of the busy lamp; at QB*i*2, it causes the turning off of the listening lamp.

Service line Q is fully released.

As follows from the foregoing explanations, the various operations involved in the seizure of a service line are similar to those already described with reference to an outside line, relays KB*fg* and QB*hi* performing functions similar to those of relays TB*def* and TA*rs* of outside-line equipment T. Under these conditions, an operator already connected to a first service-line can connect herself to a second service-line or to an outside line, the first service-line being held. To disconnect herself from a held service-line, all she has to do is operate holding-removal key BKRG. The holding of a service line and the release of the holding are effected in accordance with a method identical with the one already described with reference to an outside line. As already indicated, differential relay BC*rs* prevents the simultaneous connection of the operator to a plurality of lines, be they service lines or outside lines.

The case will now be described of a call to the operator of the director station.

A subscriber desiring to call the operator of the director station removes his handset and dials the digit 0. This digit is received at the receiver as already described and, at the end of the sending of the ten-pulse train, causes the energization of relays RB*i* and RB*k* (FIG. 6).

Relays RB*i* and RB*k* upon energizing complete the following circuit: ground, back RB*h*1, front RB*i*1, RB*k*1, back RA*q*1, lower winding of relay RA*pq*, battery. Relay RA*pq* energizes.

Relay RA*pq* upon energizing completes a holding circuit for itself over its front RA*p*1: battery, lower winding of relay RA*pq*, front RA*p*1, general holding ground on wire 35. Over its front RA*q*1, it switches the ground used for its energization to wire 65, characteristic of the hundreds-digit 0. Over its front RA*p*4 and RA*q*4, it causes the seizure of one of the two markers M in a manner already described.

The connection of receiver R to marker M causes the energization of relay MA*k* by the ground applied to wire 65.

Relay MA*k* upon energizing completes over its front MA*k*1 the following holding circuit for relay MA*def*: ground, front MA*k*1, windings in series of relay MA*def*, battery. Over its front MA*k*2, it completes the following circuit: ground, back MA*m*5, back NB*e*4 of director marker N, front MA*k*2, wire 97, cable 3, wire 97, winding of relay LA*v*, battery. Relay LA*v* energizes. Over its front MA*k*3, it completes the following circuit: ground, back MA*m*1, front MA*k*3, back NB*e*1 of director marker N, wire 93, cable 3, wire 93, winding of relay L*ab*, back L14B1, L14H1, L1B1, L1H1 . . . L13B1, L13H1, resistance LR3, battery. Relay L*ab* energizes, thus showing that the service lines serving the director station are reached over the line group belonging to the first fifties of the first hundreds. That group comprises only two grouped lines and, in that case, wires *t*26 and *t*28 are not connected.

It will be assumed that the first group-line is free.

Relay LA*v* upon energizing completes over its front LA*v*2 the energizing circuit of relay LA*no*, which is energized by battery through relay J*b* of the service-line's connector, as previously described.

Relay LA*no* energizing, it marks the line on the selection magnet of the frame of final selectors L, over its front LA*o*3, the rest of the operation being similar to the general case previously described.

As soon as the calling-subscriber's feeding bridge A is connected metallically to the first service-line Q selected, the ringing AC is sent over the following circuit: ground, generator G*e* (FIG. 4), resistance AR4, back AA*g*2, AA*k*2, AB*g*4, wire B, front CVS4 (fifties selector), contact *sb*, wire B, contact *lb* (final selector L), wire B, cable 24, cable 5, cable 42 (FIG. 2), wire B, cable 56, cable 43, wire B, back QB*h*1, condenser QC1, upper winding of relay QB*de* for the negative alternations and rectifier QQ for the positive alternations, wire A, cable 43, cable 56, wire A, cable 42, cable 5, cable 24 (FIG. 10), wire A, contact *la*, wire A, contact *sa*, front SVC3, wire A, back AB*h*4, AA*k*3, AA*g*1, AB*f*6, winding of relay AA*jk*, battery. Relay AA*jk*, insensitive to AC, does not energize. Relay QB*de* energizes with a certain delay due to the short-circuiting of its lower winding. This short-circuiting is provided to prevent its untimely energization by the discharge of condenser QC1.

Relay QB*de* upon energizing removes the short-circuit from its lower winding, over its back QB*d*1, while over its front QB*d*1 it completes the following holding circuit for itself: battery, resistance QR3, lower winding of relay QB*de*, front QB*d*1, back QB*h*6, wire T, cable 43, cable 56, wire T and ground applied by the final selector for the energization of relays J*b* and J*a* of the service-line's connector. Over its front QB*d*2, it connects wire L*a* to battery so as to cause in director station B (FIG. 14) the lighting up of the ringing lamp LA individual to the service line involved. Over its front QB*e*1, it grounds wire S*o* so as to cause, if necessary, the operation of the director station's ringer SO.

The alterated operator then depresses her listening key BKE individual to the service line involved, this causing the same operations already described for the case of a call to the local automatic switchboard, with the sole difference that ringing relay QB*de* releases, having the circuit of its two windings opened at QB*h*1 and QB*h*6. Owing to this, the ringing lamp is turned off and the ringer stops.

The case will now be discussed where an extension subscriber not entitled to make direct outside calls dials one of the direct-seizure digits, digit 1, 8 or 9.

In the frame of call finders C (FIG. 3), connection *z* is made and connection *x* eliminated.

Upon energization of relay RA*de* of the receiver (FIG. 5), the following circuit is completed: ground, lower winding of relay C*w* (FIG. 3), connection *z*, front contacts of the selection and switching magnets that have energized, front C*u*10 or C*v*10, wire 19, front RA*e*3 (FIG. 6), left-hand winding of relay RA*f*, battery. Relay RA*f* energizes in this case.

Relay RA*f* holds over the following circuit: ground on wire 35, front RA*f*1, right-hand winding of relay RA*f*, battery. Over its back RA*f*2, it opens the energizing circuit of the director marker's connection relay RA*xy*, which will be unable to energize. Over its front RA*f*2, it prepares the energizing circuit of relay RA*pq*.

When one of the direct-seizure digits 1, 8 or 9 dialed by the calling subscriber is registered in receiver R as has been described, the energizing circuits of relay RB*de* is completed and this relay energizes.

Relay DB*de* holds over its front RB*e*1: ground on wire 35, front RB*e*1, winding of relay RB*de*, battery. Over its front RD*d*3, it completes the following circuit: ground, front RB*d*3, RA*f*2, back RA*y*1, lower winding of relay RA*pq*, battery. Relay RA*pq* energizes.

The pulling up of relay RA*pq* has the effect of causing in a manner already described the connection of receiver R to one of the markers M. In addition, over its front RA*q*1, relay RA*pq* applies a ground to wire 65, characteristic of the digit 0.

In that way, any extension subscriber not entitled to make direct outside calls that has dialed one of the director-seizure digits 1, 8 or 9 is automatically transferred to the operator's station, just as if he had dialed the digit 0. *The* rest of the operation is the same as in the case of a call to the director-station's operator, previously discussed.

The case will now be considered where a private-station subscriber dials one of the direct-seizure digits 1, 8 or 9.

In the frame of call finders C (FIG. 3), connection *x* is made and connection *z* eliminated. In that case and contrary to the preceding case, relay RA*f* of receiver R (FIG. 6) will be unable to energize, owing to the high resistance of the upper winding of relay C*w* and resistance CR1. Further, connection *y* (FIG. 11) is not made.

When private-station subscribers dial one of the direct-seizure digits 1, 8 or 9, the operation is identical with the one already described for a direct-seizure operation, up to the point where receiver R is connected to director marker N.

Depending upon the digit dialed, one of relays NB*e*, NB*f* or NB*g* energizes and causes the energization of relay NA*h*.

Owing to the absence of connection *y* (FIG. 11), there is no negative polarity on wire D*i* and relay NA*fg* cannot energize. Then the following circuit is completed: ground, back NA*h*2, front NA*h*3, wire O, cable 8, cable 5, cable 4 (FIG. 10), cable 3, cable 4 (FIG. 7), wire O, front RA*x*4, resistance RR2, wire 30, front AB*d*4, resistance AR1, winding of relay AA*jk*, battery. Relay AA*jk* energizes and causes as previously described the release of finder C and of feeding bridge A, the calling subscriber then receiving the busy signal.

In the foregoing description it has ben assumed that the system was served by only one operator. If traffic needs require it, a second operator's position can be provided, having an equipment B similar to that of FIG. 14. The various calls coming either from the outside system or from inside subscribers are received at both positions, the first operator answering handling the call. It is merely necessary to take precautions so that one and the same outside line will not be connected simultaneously to both operator positions. To that end, two connection relays BA and BB are provided for each outside line and for each operator and the circuit of the first operator's relay BA is made to pass through back contacts BA1 and BA2 of the relays BA and BB corresponding to one and the same outside line but allotted to the second operator. Under these conditions, for a given outside line, the relay BA allotted to the first operator will be unable to energize if one of the two contacts BA1 or BB1 is open, that is, if the second operator is already connected to the outside line involved.

A special operating method, called "reduced service" throughout what follows, has been provided for slack periods. Under this operating method, the attendance of an operator is useless; incoming outside calls are received at all stations entitled to make direct outside calls. In order to answer, a subscriber served by any of these stations must remove his handset and dial a special number, assumed in the example described to be the digt 0. Once this has been done, he finds himself connected to the outside system and can transfer the call to some other station of the inside system.

Where reduced-service working is desired, non-restoring key BKSR is depressed, this causing the energization of relay NB*ef*.

Figure 8:
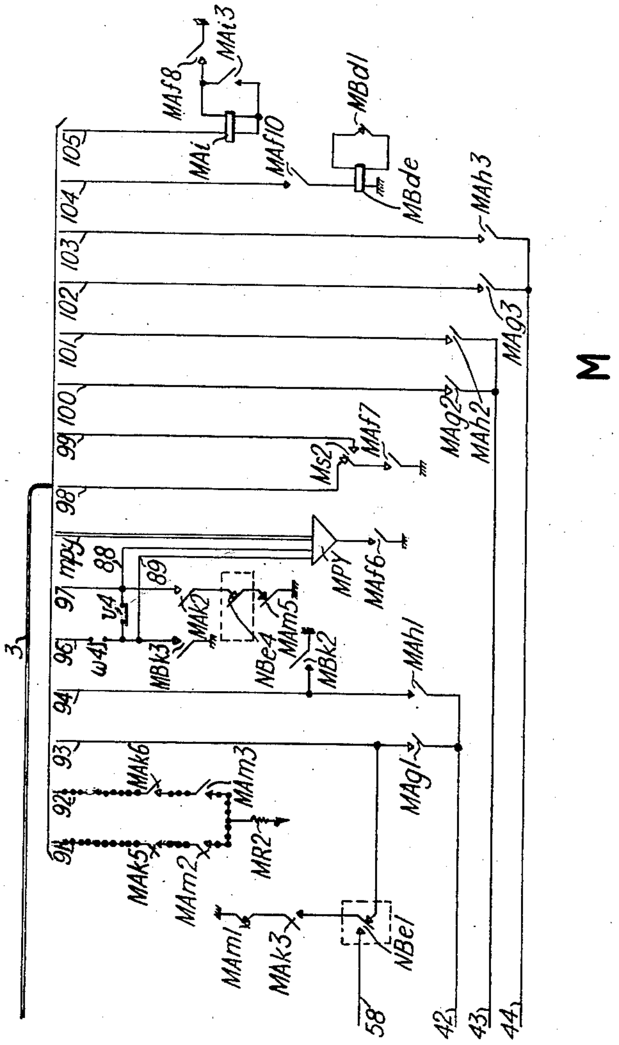

In order to simplify the diagrams, the contacts associated with some relays have not been shown in the same equipment as said relays. Thus, for example, relay NB*ef*, provided to control the various operations involved in reduced service and included in the marker, has a contact NB*f*1 in equipment W of FIG. 12 and contacts NB*e*3 and NB*e*4 in the local marker (FIGS. 7 and 8). To prevent any confusion, these contacts are enclosed in dash-line squares or rectangles. Likewise, relay NA*ijk* of director marker N of FIG. 17 has contacts NA*j*1 and NA*j*2 in FIG. 13.

When an incoming call is received at one of equipments T, relays TA*l*, TA*g*, TB*u* and WB*q* energize in accordance with a method already described. The ringing current from generator GE is then sent to a number of repeating ringers SP located at suitable points, the following circuit being completed: generator GE, front WB*q*3, NB*f*1 and ringer SP.

In order to answer, a subscriber served by any direct-seizure station in the system removes his handset and dials the digit 0. This operation causes in the local receiver the grounding of outgoing wire 65 of the hundreds pyramid corresponding to the number 0.

As already stated, relay MA*k* energizes.

At MA*k*3 (FIG. 8), relay MA*k* completes the following circuit: ground, back MA*m*1, front MA*k*3, front NB*e*1 associated with reduced-service relay NB*ef*, wire 58, front RA*r*3, back RB*e*2, relay RB*de* energized, battery. Relay RB*de* causes at RB*d*3 the seizure of director marker N in accordance with a method already described. The ground used to energize relay RB*de* is transferred over front RB*e*2 and RA*y*6 to wire SR and thence to director marker N. Owing to this, relay NB*d* (FIG. 17) energizes.

Relay NB*d* controls in director marker N operations similar to those already described for direct seizure of the outside system; more precisely, it causes the energization of relay NA*h* over its front NB*d*1 and at NB*d*4 grounds wire D*i* so as to start in frame CAD the various operations that will finally end in the energization of a selection magnet and of a switching magnet corresponding to the inside subscriber that has removed his handset. In addition, it completes the following circuit at NB*d*2: ground, front NB*d*2, relay NA*ijk* energized, wire 251, cable 5, wire 251 (FIG. 12), front WB*q*5, resistance WR9, battery.

Relay NA*ijk* energizes and controls the various operations for the seizure of the equipment T that has received the call. In effect, ground is applied to the starting wire TMM of the first equipment T associated with the first line in the first group over front NA*g*4 and NA*i*3. If that is the equipment T that has received the call, that ground causes the operation of starting relay TA*v* over the following circuit: wire TMM, cable 248, cable 5 across FIGS. 16, 14 and 13, cable 248, wire TMM, back TA*j*2, left-hand winding of relay TA*v*, contact TA*g*2 operated owing to the fact that the equipment T involved has received the outside call, wire 252 over cable 253, front NA*j*1 associated with relay NA*ijk*, battery. Relay TA*v* enegizes and releases the various operations that will end in connecting outside finder V to the subscriber and in connecting said subscriber to the outside system. The cycle of these operations is identical with the one already described with reference to direct seizure; it is to be noted only that the various relays in operated position after the reception of the call, namely, relays TA*l*, TA*g* and WB*q*, return to normal. In effect, when the subscriber is connected to equipment T through outside finder V, relay TA*jk* is in operated position, as has been indicated, opening at TA*k*1 and TA*j*1 the circuits of relays TA*l* and TA*g*. Relay WB*q* releases, having its circuit opened at TA*g*6; relay TB*u*, which was in operated position when the call was received, remains in that position; equipment T is immediately in "outside talking" position without having to wait for the passing of cams TCA1 and TCA2. The inside subscriber can then transfer the outside call to some other inside station, on condition, of course, that said station be an extension.

If it is not the first line in the first group that is in ringing position, starting relay TA*v* of the corresponding equipment cannot pull up, because contact TA*g*2 is in unoperated position and contact NA*j*1 in operated position. The starting ground is then transferred through rectifier TQ1 and back TA*v*1 to the starting wire TMD of the equipment T′ associated with the second line in the first group. If that is the line that has received the call, the starting relay TA*v* of the corresponding equipment T pulls up and the subscriber finds himself connected to that line under the conditions previously described. Of course, as many contacts such as NA*j*2 are provided as there are outside equipments T in addition to the first.

If the second line in the first group is not the one in ringing position, the starting ground is transferred to the equipment T of the third line and so on.

Where the outside line in ringing position is not comprised in the first group, arrangements must be provided to transfer the starting ground to the equipment T2 corresponding to the first line in the second group. Accordingly, wire TMD*n* (FIG. 13) of the equipment T of the last line in the first group is connected over cables 248 and 5 to wire TMD*n* in FIG. 17. Thus, the starting ground is transferred, over wire TMD*n* and front contact NA*i*2, to wire TMM2 of the equipment T2 corresponding to the first outside line in the second group.

The various lines in the second and third groups are immediately tested in accordance with the same method until the one that has received the outside call is found. Of course, if a plurality of outside lines are in ringing position, it is the first of such lines that is seized by the subscriber, the other calls being handled next in accordance with the same method. Since there is only one director marker N and it is busied upon its seizure by a local receiver, only one call is handled at a time, this preventing crosses between the selection-magnet circuits and hence faulty connections.

If one of the inside subscribers removes his handset and dials 0 without a call being on hand, relay NB*d* energizes under the conditions already described but relay NA*ijk* remains unoperated, contact WB*q*5 being open. Wire O will be grounded over the following circuit: ground, back NA*i*4, front NB*d*3, NA*g*2 and NA*h*3. The local selection-chain is released and the subscriber receives the busy signal.

In the case of reduced service, if an extension not entitled to direct seizure attempts to answer an outside call by dialling 0, wire 58 (FIG. 6) is grounded as already described; but owing to the closing of front RA*f*3, and after the energization of relay RB*de*, that ground is transferred to relay AA*jk*, which brings about the release of the various equipments seized and the sending of the busy signal to the subscriber.

If a private-station subscriber makes the above attempt, he receives the busy signal as explained for the case where he attempted to establish an outside connection by direct seizure.

For night service, a station, called "transfer station," intended to receive all outside calls, is set aside. This station, PH (FIG. 2), is associated with an equipment H such as shown in FIG. 2. Non-restoring key HRN is depressed for night service. When an outside call is received, contact WB*q*5 of equipment T closes and the following circuit is completed: battery, resistance WR9, front WB*q*5, wire 254, cable 5 up to FIG. 2, wire 254, back NB*f*2, relay HA*m* energized, back HA*l*1, contact of key HRN, ground.

At HA*m*4, relay HA*m* applies a ground to the starting wire of ringing machine JMA; over its front HA*m*1 and HA*m*2, it controls the sending of ringing current to the transfer station over the following circuit: ground, generator GE, resistance HR1, back HA*o*2, front HA*m*2, wire B, condensed ringer of transfer station PH, wire A, front HA*m*1, relay HA*no*, battery. Relay HA*no* being slow-acting, it cannot be energized by the ringing A.C. Relay HA*m* opens, at HA*m*3 (FIG. 12), the circuit of the director station's ringer.

Upon removing the transfer-station's handset, line wires A and B are looped metallically and relay HA*no* is energized by the D.C. superimposed on the ringing-generator's current. At HA*o*1, relay HA*no* completes a holding circuit for itself; at HA*o*2, it stops the sending of ringing current.

Relay HA*p* and the associated circuits are connected to director marker N under the same conditions as RA*xy* of FIG. 6. When contact HAo3 closes, relay HA*p* energizes and director marker N is seized in accordance with a method already described.

Wires P, O, D*i'* and SR are connected to the corresponding wires of director marker N over cables 5 and 9. Wires P, D*i'* and SR are grounded by contacts HA*p*5, HA*p*6 and HA*p*3. These three wires being grounded, relays NA*de*, NA*fg* and NB*d* of director marker N pull up. Wire C, used to mark the transfer station on the banks of outside finders V, is grounded through front contact HA*p*4.

In director marker N, relay NA*h* energizes over front NB*d*1. The various relays of director marker N, except for NB*ef*, are in the same conditions as in the case of reduced service when an inside subscriber has removed his handset and dialed 0. Under these conditions, said director marker will cause, in accordance with the same method, the energization of the starting relay TA*v* of the equipment T associated with the calling outside line; the finder V associated with said equipment will be connected to the transfer station and the latter will find itself connected to the outside line.

Outside finder V being connected to the transfer-station's connector, said station's test wire T is grounded as already described and relay HA*l* (FIG. 2) energizes. At H*l*1, relay HA*l* opens the circuit of relay HA*m*, which releases.

Relay HA*m* opens over its back contacts HA*m*1 and HA*m*2 the circuit of relay HA*no*, which releases in turn; over its front contacts HA*m*1 and HA*m*2, it establishes the continuity of line wires A and B through the connector, such as J, of equipment H; at HA*m*4, it eliminates the starting of the ringing machine.

Relay HA*no* upon releasing opens at HA*o*3 the circuit of relay HA*p*, which releases in turn.

Relay HA*p* makes a break in wires C, D*i'* and SR over its various front contacts HA*p*5, HA*p*6, HA*p*3, this causing the release of relays NA*de* and NB*d* in the director marker. Relays NA*h* and NA*fg* release, having their circuits opened at NB*d*1. Director marker N is fully released.

The transfer-station's subscriber can either hang up at the end of a call or transfer said call to an extension in the system in accordance with a method already described. In either case, outside finder V is disconnected from equipment H and relay HA*l* releases. Equipment H is fully released.

In normal service, night-transfer key HRN is unoperated, relay HA*m* cannot energize and back contacts MA*m*1 and HA*m*2 remain closed. The transfer station operates then like an ordinary station.

Arrangements have been provided to release director marker N in all cases where its normal functions have not been performed after a predetermined period of time. This can happen, for example, when the director marker is seized by the operator and the latter is slow in dialing; it can also happen when said marker is seized by the local selection-chain for a direct outside call, for reduced service or for night service. In this latter case, if trouble affected said local selection-chain, the outside-line equipment would block the marker indefinitely.

When the director marker is seized, its wire P is grounded as has been described and the following circuit is completed: battery, right-hand winding of relay NA*m*, back NA*l*1, wire P grounded. Relay NA*m* energizes. Over its front NA*m*1, it completes a holding circuit for itself; over its contacts NA*m*2 and NA*m*3, it prepares the circuit of cams NCA1 and NCA2; at NA*m*4, it controls the starting of ringing machine NMA.

When cam NCA1 closes its contact, the following circuit is completed: ground, cam NCA1, front NA*m*2, right-hand winding of relay NA*l*, battery. Relay NA*l* energizes. Over its front NA*l*1, it completes a holding circuit for itself over wire P and ground; over its front NA*l*2, it prepares the circuit of cam NCA2; at NA*l*3, it prepares a circuit intended to control the various operations involved in the release of the marker; at NA*l*4, it prepares the grounding of wire O.

If the marker's function is not over when cam NCA2 closes its contact, the following circuit is completed: ground, cam NCA2, front contacts NA*l*2 and NA*m*3, left-hand winding of relay NA*m*, battery. The fluxes produced by the two windings of relay NA*m* being equal and of opposite sign, said relay releases. At NA*m*2, NA*m*3, it opens the circuit of the two cams NCA1 and NCA2; at NA*m*4, it eliminates the starting of the ringing machine.

Where director marker N is seized by an operator, relay BB*m* (FIG. 14) energizes over the following circuit: battery, relay BB*m*, wire NNU, front BB*d*5, wire 249, front NA*l*3, back NA*m*1, wire P grounded. Relay BB*m* causes, in accordance with a method already described, the release of receiver U and of the director marker. A signal is given to the operator by the blinking of lamp LN.

Where director marker N is seized by a subscriber, wire O is grounded over the following circuit: ground, back NA*m*5, front NA*l*4, front contacts NA*g*2 and NA*h*3. That grounding causes, in accordance with a method already described, the release of the local selection-chain and hence of the director marker.

Where director marker N is seized by the night-transfer station, the ground on wire O energizes relay HA*q* over front HA*p*7. Relay HA*q* completes a holding circuit for itself over contacts HA*q*1 and HA*o*3; at HA*q*2, it causes the release of relay HA*p* and hence of director marker N; at HA*q*3, it causes the sending of the busy tone to transfer-station PH over the following circuit: ringing machine JMA, condenser HC1, front contacts HA*q*3 and HA*m*1, station PH, front contacts HA*m*2 and HA*o*1, ground.

When the transfer station hangs up, relay HA*no* releases, opening at HA*o*3 the circuit of relay HA*q*, which releases in turn.

The case will now be discussed where, the system not comprising means for direct seizure of the outside network, the ringing of the operator by some stations is signaled specially and individually to the operator's position. In that case, the equipments shown in FIGS. 11 to 18 are eliminated, except for lamp LAD of FIG. 11, and the circuits represented schematically by the lines —*o*—*o*—*o*—*o*—*o*— in feeding bridge A, marker M, the frame of fifties selectors S and FIG. 11 are provided for each subscriber line entitled to have its calls identified individually. Connections *r*2 and *m*2 are provided also, while connections *r*1 and *m*1 are eliminated, respectively in receiver R and marker M.

It will be assumed that an extension having the privilege explained above and termed "individual call" dials the operator.

After removing his handset, the calling subscriber dials 0. As already described, the ground applied by receiver R to wire 65, characteristic of the dialing of hundreds-digit 0, causes the energization of relay MA*k* in marker M, upon the connection of these two equipments.

Simultaneously, the energizing circuit of relay MA*lm* is completed as follows: ground, winding of relay MA*lm*, connection *m*2, front MA*d*2, wire 48, front RA*t*2, connection *r*2, wire 29, front AB*d*1, wire C, front contact CVA6, contact *cc*, wire C, cable 42, cable 5, wire C (FIG. 11), connection *y* characteristic of an extension, lamp LAD individual to the calling subscriber's line, battery. Relay MA*lm* energizes, but lamp LAD cannot light up, owing to the resistance of the winding of relay MA*lm*.

Over its back contacts MA*m*1 and MA*m*5, respectively, relay MA*lm* opens the energizing circuits of relays L*ab* and L*av*, normally used for calling the operator over service lines. Over its front MA*m*2, it completes the following circuit: battery, resistance MR2, front MA*m*2, MA*k*5, wire 91, cable 3, wire 91 in the frame of fifties selectors S (FIG. 9) of the 100's comprising the calling subscriber, the first 100's for example, winding of relay S*ab*, back S14H1, S14B1, S14H1, S13B1, S12H1, S12B1 . . . S9H1, S9B1, S8H1, S8B1 . . . S5H1, S5B1, S4H1, S4B1 . . . S1H1, S1B1, wire 36, front RA*t*9 (or RA*w*9), ground. Relay S*ab* energizes. Over its front MA*m*3, relay MA*lm* prepares the energizing circuit of magnet S13B of the frame of fifties selectors S, while over its front MA*m*4 it prepares the energizing circuit of magnet SVS.

In the frame of fifties selectors S, relay S*ab* uopn energizing completes the following circuit over its front S*b*6; battery, resistance MR2 (FIG. 8), front MA*m*3, MA*k*6, wire 92, cable 3, wire 92, winding of magnet S13B, front S*b*6, back S12H1 and circuit already described for the energization of relay S*ab*. Selection magnet S13B energizes. Over its front S*a*6, relay S*ab* completes a holding circuit for itself.

Selection magnet S13B upon energizing completes the energizing circuit of magnet S14B: ground, front S13B, winding of magnet S14B, battery. Magnet S14B energizes. Over its front S13B4, magnet S13B prepares the energizing circuit for connection magnet SVS.

Upon energizing, magnet S14B opens over its back S14B1 the holding circuit of relay S*ab*, which releases. The following circuit is then completed over its front S14B2: ground, front contacts S13B4, S14B2, back S*a*1, S*c*1, S*e*1, wire 38, front MA*m*4 (FIG. 7), back MB*k*1, wire 50, front RA*t*4, wire 28, front AB*d*3, back AA*k*7, wire 39, upper winding of connection magnet SVS, battery. Magnet SVS energizes.

Magnet SVS holds via its front SVS1 over a circuit already described. Over its front SVS2, it short-circuits the right-hand winding of relay AB*def*, which releases, this causing the release of receiver R and of marker M as previously described. Over its front SVS6, it completes the following circuit: ground, contact *sc*, front SVS6, wire C, back AB*i*2, AB*h*1 and AB*d*1, wire C, front CVA6, contact *cc*, wire C, cable 42, cable 5, wire C (FIG. 11), connection *y*, lamp LAD, battery.

Lamp LAD lights up, thus informing the operator of the call and of the calling-subscriber's identity. Further, over its front SVS5, magnet SVS completes the energizing circuit of relay S*g*: ground, front SVS5, contact *st*, winding of relay S*g*, battery. Relay S*g* pulls up and over its front S*g*1 completes the following circuit: ground, front S*g*1, wire S*o*, cables 5 and 7 (FIG. 14), wire S*o*, side contact of jack J, ringer SO, battery. The calling-subscriber's call is thus signaled to the operator two ways: lamp signal and audible signal.

The director-station's operator is connected to the calling subscriber by any known means (operation of a key, plugging in), this disconnecting the calling subscriber from the local automatic switchboard in order to connect him to the director station. Supply relay AA*de* (FIG. 4) releases, this causing the release of the whole local selection-chain used.

It is quite obvious that the foregoing descriptions have been given only as nonlimitative examples and that numerous modifications can be made without departing from the scope of the invention. Said descriptions involve the case of a system using crossbar switches, but a certain number of the arrangements discussed could be applied to other telephone systems, such as those comprising rotary switches. It would also be possible to arrange the subscribers otherwise than in groups of 50, to provide crossbar switches comprising selection magnets differently arranged or of different capacity and to use other codes to control operations such as double-ringing and return to the outside system. In particular, all the numerical data, which depend essentially upon the traffic, have been given only as an example to facilitate an understanding of the operation and they could be revised without departing from the scope of the invention.

What is claimed is:

1. A telephone system comprising a plurality of subscribers' lines arranged in groups, a plurality of inside equipments, means for allocating to each group a particular one of said inside equipments each of said equipments comprising a finder stage having a plurality of call finders to serve calls coming from the subscribers' lines in said group, a final selector stage having a plurality of final selectors in said inside equipments, a group selection stage having a plurality of group selectors designed to select the group comprising the called subscribers' line and giving access to a final selector in the inside equipment serving said called subscriber's line, at least one digit receiver in each inside equipment common to a plurality of call finders, means for temporarily connecting said digit receiver with one of said call finders in order successively to receive the various digits dialed by the calling subscriber, and a marker common to a plurality of digit receivers, means responsive to a call on a line for temporarily connecting said marker with one of said digit receivers, means in said digit receiver responsive to the dialled digits received thereby to transmit selective signal combinations substantially instantaneously, means in said marker to receive said selective signal combinations coming from said digit receiver and to control the positioning of all the successive selection stages, whereby the addition of new groups of subscribers' lines in the exchange may be effected in simple fashion by installing additional inside equipments corresponding to these groups.

2. A telephone system, as defined in claim 1, in which there are two markers, placed in one of the inside equipments and common to the digit receivers of the whole system, means for causing only one of said markers to become operative at a particular moment, whereby all risk of wrong connections that would arise from the simultaneous routing of two calls is eliminated while avoiding tying up the system if one of the markers breaks down.

3. A telephone system, as defined in claim 1, further comprising means in the receiver for marking a calling subscriber's line on the banks of all the line finders serving said line, a plurality of feeding bridges for each digit receiver, means in said digit receiver for directing the call to all the available digit receivers and feeding bridges having access to that subscriber's line, and circuit arrangements to select, from among these calling digit receivers and feeding bridges, first a digit receiver and then a feeding bridge served by said digit receiver, and then finally to connect the finder associated with the selected feeding bridge to the calling subscriber's line, whereby said subscriber's line is connected to said digit receiver through a finder and a feeding bridge without the marker having been switched in.

4. A telephone system, as defined in claim 1, further comprising means in the marker responsive to the receipt from the digit receiver of the various selective signal combinations that allow reaching the called subscriber's line, for setting the line corresponding to the digits dialed in the calling position, as well as the final selectors serving that line, control members associated with the selectors of the first stage for selecting one of said final selectors, means in the marker responsive to the selection of a final selector for testing the called subscriber's line and, if said line is free, for controlling the establishment of the connection thereto through the selector of the line finder and the final selector.

5. A telephone system, as defined in claim 1, in which subscribers served by the same party line are assigned numbers taken from the general numbering scheme of the subscriber stations and differing only in one digit of a particular rank, further comprising ringing current sending circuits, and means in said circuits responsive to the reception of said digit for controlling the required modifications in the ringing-current sending circuits and thus allowing the called subscriber to be selected from among all those connected to the same party line.

6. A telephone system, as defined in claim 1, further comprising a network equipment capable of routing calls to and from the outside of said system, said equipment comprising outside lines each associated with one or more finders giving access to at least a part of the extensions in the system, at least one double-call line associated with each outside line, at least one director set having an operator's position and having access to all said outside lines, a digit receiver associated with each director set in order successively to receive the various digits from the operator's position dialed by the operator in order to reach an extension, and a director marker capable of being reached both by the local digit receivers and by those of the director set and controlling all the operations required for the routing of calls established either by direct seizure or through an operator.

7. A telephone system, as defined in claim 6, further comprising means in each local digit receiver responsive to the digits of a number dialed from a line associated therewith and corresponding to the direct seizure of a particular group of outside lines for sending said digits from said local receiver to the director marker, means in said director marker for selecting and seizing a free outside line in the group dialed and placing the calling line in ringing position on the banks of the outside finders serving it, and means for then connecting the outside line seized to the calling line through one of the finders associated therewith.

8. A telephone system, as defined in claim 7, further comprising means in the network equipment responsive to the digits of a predetermined number dialed from an inside line connected to the outside system for disconnecting said network equipment from the outside line and connecting it to a double-call line having access to the local selectors, the calling line thus being able to reach another inside line through said local selectors.

9. A telephone system, as defined in claim 8, further comprising means responsive to the dialing of the digits of the full number of the inside line reached by way of double call for sending the outside line equipment an "end of dialing" signal, means in said equipment responsive to the reception of said signal for making said equipment responsive to another predetermined number dialed over the calling line for disconnecting said equipment from the double-ringing line and connecting it anew to the outside line.

10. A telephone system, as defined in claim 8, further comprising means responsive to a long pulse produced over a calling line by the calling subscriber who, while engaged in reaching another line by double call, has dialed the wrong number and has hung up his receiver for a moment, for causing the local selectors to release and for causing the outside-line equipment to connect said calling line again, so that, when the subscriber again removes his receiver, his line is connected to the outside system and can begin again his double-call operation.

11. A telephone system, as defined in claim 10, further comprising a time device, means for initiating the operation of said time device when the local selectors are released because the subscriber has hung up, and means responsive to the operation of said time device for routing the outside call to the director station.

12. A telephone system, as defined in claim 8, further comprising means responsive to the opening of the calling line by the calling subscriber hanging up for disconnecting the outside-line equipment from the calling line and sending, through the local selectors, an electrical characteristic over a wire individual to the other line engaged in the double call connection to mark said line calling on the banks of the finders of the outside-line equipment, and means for causing said equipment to be connected to said last-mentioned line through one of the finders associated therewith, and means for holding the director marker throughout the transfer period to prevent it from controlling another finder, whereby the risk of a faulty connection is minimized.

13. A telephone system, as defined in claim 6, further comprising means in the line equipment responsive to the digits of a predetermined number dialed over a line connected to the outside system and characterizing the operator's position for causing the operation at the operator's position of a ringing signal individual to the outside line involved, thus enabling the operator's position to be connected to said outside line and thence to the line dialing said predetermined number, and means under control of the operator's position for disconnecting the outside line.

14. A telephone system, as defined in claim 13, further comprising means in the director operative when a line has been connected to the local operator's position and responsive to the dialing of the same number as for an ordinary double call, for causing said director to be disconnected from the outside line equipment and the subscriber's line to be connected to the outside system.

15. A telephone system, as defined in claim 13, further comprising means in the director operative when a local line previously connected to an outside line is connected to the local operator and responsive to a long pulse received from said local line by the subscriber hanging up without doing anything else, for causing the director to control the disconnection of the local line from the outside system finder, the operator's position alone remaining connected to the outside line equipment.

16. A telephone system, as defined in claim 13, further comprising means controllable at the operator's position for use when the operator wants to transfer an outside call to another local line after it has been connected to a first local line for connecting the operator's position to the digit receiver assigned to said other local line, means in said digit receiver responsive to the receipt of the succession of various digits of the called subscriber's number for sending them in a practically instantaneous manner to the director marker, means in the director marker responsive to the receipt of said digits for marking the called line as "calling" on the banks of the line finders of the outside equipment and for marking the outside line equipment seized by the operator's position being connected to the line as "calling" through one of the finders associated therewith and for sending the ringing current to the other local line, the transfer being effected after the subscriber answers and the operator's position is disconnected.

17. A telephone system, as defined in claim 13, further comprising a special device connected to all the marking wires outgoing from the director marker and corresponding either to private lines or to nonexistent numbers, and means in said special device responsive to the dialing of the digits one of said numbers for operating said device to cause the release of the digit receiver and of the director marker and to a suitable signal to the operator's position, and service lines connected to said director for ringing private lines.

18. A telephone system, as defined in claim 8, further comprising means for use during slack periods when there is no operator for receiving incoming calls at repeating ringers of local lines, and means responsive to the digits of a predetermined number dialed by one of those subscribers entitled to make direct outside calls for connecting said subscriber's line to the calling outside line.

19. A telephone system, as defined in claim 18, in which the means for connecting the subscriber's line to the calling line comprises means in the local digit receiver for sending the predetermined number to the director marker, means in said director marker for hunting for the calling outside line and placing the local line in ringing position on the banks of the outside finders, and means for connecting the calling outside line to said subscriber's line through the finder or finders associated therewith.

20. A telephone system, as defined in claim 6, further comprising night service equipment, means for connecting one for the local lines as a transfer station to receive incoming outside calls, means in said night service equipment responsive to the removal of the digit receiver at said transfer station to answer an outside call for causing the seizure of the director marker and the marking of the transfer station on the banks of the outside finders, and means for causing said director marker thereupon to hunt for the calling outside line and to connect said line to the transfer station through the finder associated therewith.

References Cited in the file of this patent

UNITED STATES PATENTS

| | | |
|---|---|---|
| 2,184,540 | Wright et al. | Dec. 26, 1939 |
| 2,585,904 | Busch | Feb. 19, 1952 |

FOREIGN PATENTS

| | | |
|---|---|---|
| 757,025 | Great Britain | Sept. 12, 1956 |